US012763623B2

(12) United States Patent
Mizutani

(10) Patent No.: US 12,763,623 B2
(45) Date of Patent: Oct. 13, 2026

(54) ELECTRICAL ENERGY-MECHANICAL ENERGY CONVERTER AND ELECTRICAL ENERGY-MECHANICAL ENERGY CONVERTER SYSTEM

(71) Applicant: ELEMEC Co., Ltd., Kawasaki (JP)

(72) Inventor: Yuta Mizutani, Kawasaki (JP)

(73) Assignee: ELEMEC Co., Ltd., Kawasaki (JP)

( * ) Notice: Subject to any disclaimer, the term of this patent is extended or adjusted under 35 U.S.C. 154(b) by 217 days.

(21) Appl. No.: 18/834,622

(22) PCT Filed: Feb. 13, 2023

(86) PCT No.: PCT/JP2023/004857
§ 371 (c)(1),
(2) Date: Jul. 31, 2024

(87) PCT Pub. No.: WO2023/162760
PCT Pub. Date: Aug. 31, 2023

(65) Prior Publication Data

US 2025/0373103 A1 Dec. 4, 2025

(30) Foreign Application Priority Data

Feb. 24, 2022 (JP) ................................ 2022-027272

(51) Int. Cl.
*H02K 3/28* (2006.01)
*H02K 1/14* (2006.01)
(Continued)

(52) U.S. Cl.
CPC ............... *H02K 3/28* (2013.01); *H02K 1/146* (2013.01); *H02K 3/22* (2013.01); *H02K 9/18* (2013.01); *H02K 9/193* (2013.01)

(58) Field of Classification Search
CPC .. H02K 3/28; H02K 3/04; H02K 3/00; H02K 1/146; H02K 1/14; H02K 3/22; H02K 9/18; H02K 9/14; H02K 1/193; H02K 9/19
See application file for complete search history.

(56) References Cited

U.S. PATENT DOCUMENTS 2,897,382 A * 7/1959 Hamill .................... H02K 3/22 310/64
9,515,530 B2 * 12/2016 Ho ........................ H02K 9/227
(Continued)

FOREIGN PATENT DOCUMENTS

JP H7-231591 A 8/1995
JP 2004135386 A * 4/2004
(Continued)

OTHER PUBLICATIONS

Machine Translation of JP 2004135386 A (Year: 2004).*
(Continued)

*Primary Examiner* — Alexander A Singh
*Assistant Examiner* — Charlie Frank Mann, Jr.
(74) *Attorney, Agent, or Firm* — Yokoi & Co., U.S.A.; Toshiyuki Yokoi

(57) ABSTRACT

The electrical energy-mechanical energy converter has: the heat carrier inlet pipe 121; the heat carrier outlet pipe 122; the connection conductor wire 120 configured to connect the heat carrier inlet pipe 121 and the heat carrier outlet pipe 122 so as to be communicable; the stator core 21; the U phase heat carrier inlet coil 231 formed of the hollow conductor wire, through which the heat carrier can flow through; the U phase heat carrier outlet coil 234 formed of the hollow conductor wire; the V phase heat carrier inlet coil 232 formed of the hollow conductor wire; the V phase heat carrier outlet coil 235 formed of the hollow conductor wire; the W phase heat carrier inlet coil 233 formed of the hollow
(Continued)

conductor wire; the W phase heat carrier outlet coil 236 formed of the hollow conductor wire; the U phase line 11U connected between the U phase heat carrier inlet coil 231 and the U phase heat carrier outlet coil 234; the V phase line 11V connected between the V phase heat carrier inlet coil 232 and the V phase heat carrier outlet coil 235; and the W phase line 11W connected between the W phase heat carrier inlet coil 233 and the W phase heat carrier outlet coil 236.

20 Claims, 41 Drawing Sheets

(51) Int. Cl.

| | |
|---|---|
| ***H02K 3/22*** | (2006.01) |
| ***H02K 9/18*** | (2006.01) |
| ***H02K 9/193*** | (2006.01) |

(56) References Cited

U.S. PATENT DOCUMENTS

| | | | | |
|---|---|---|---|---|
| 2017/0126084 | A1* | 5/2017 | Schweinert | H02K 9/193 |
| 2021/0013757 | A1* | 1/2021 | Petrov | H02K 3/24 |
| 2022/0021260 | A1* | 1/2022 | Naderer | H02K 9/193 |

FOREIGN PATENT DOCUMENTS

| | | | | |
|---|---|---|---|---|
| WO | WO-2017055246 A2 * | 4/2017 | | H02K 9/197 |
| WO | WO-2018167294 A1 * | 9/2018 | | H02K 9/197 |

OTHER PUBLICATIONS

Machine Tranlsation of WO 2017055246 A2 (Year: 2017).*
Machine Translation of WO 2018167294 A1 (Year: 2018).*
International Search Report for PCT/JP2023/004857 dated May 9, 2023.
PCT written opinion dated May 9, 2023.

* cited by examiner

ELECTRICAL ENERGY-MECHANICAL ENERGY CONVERTER AND ELECTRICAL ENERGY-MECHANICAL ENERGY CONVERTER SYSTEM

TECHNICAL FIELD

The invention relates to a converter for converting electrical energy to mechanical energy or mechanical energy to electrical energy, and a system using the converter.

BACKGROUND OF THE INVENTION

A converter for converting electrical energy to mechanical energy or mechanical energy to electrical energy includes a rotating electrical machine that functions as an electric motor or an electric generator, a linear motor, and so forth. In such a converter, it is important to suppress temperature increase.

JP2004-135386A discloses an electric machine in which a stator coil is formed by winding a single hollow conductor wire, which has been doubled by folding it at an intermediate position, around a stator core and in which temperature increase is suppressed by allowing a heat carrier to flow through the hollow conductor wire.

SUMMARY OF THE INVENTION

However, in the conventional electric machine described above, because the stator coil is formed by winding the single hollow conductor wire, which has been doubled by folding it at an intermediate position, in the stator core, a special hollow conductor wire manufacturing device and winding device are required, and productivity was deteriorated. In addition, even in a case in which a plurality of hollow conductor wires are wound in a bundle, in order to secure both flow paths for forward and return flows, it was necessary to perform the winding by using a pair of hollow conductor wires.

Furthermore, when Bernoulli theorem is used to calculate the required pressure of the cooling water, if the calculation is performed by assuming the constant length and the cross-sectional area of the hollow conductor wire of the coil, in a case of JP2004-135386A, because the forward and return passages (two passages) of the cooling water are required for a single conductor wire or a single slot, for the hollow conductor wire having the same length and the same cross-sectional area, compared with the hollow conductor wire with a single passage, the inner diameter of each piping of the forward and return passages results in half or less of the passage cross-sectional area, and thus, at the same cooling water flow rate, the required pressure of the pump becomes five times or higher, that is, the required pressure is proportional to 2.3 power of the value obtained by division of the cross-sectional area. In a case in which the same cooling water pressure is used, the flow rate of the cooling water becomes one-third, and then, the amount of heat removed for the heat generated from the coil also becomes one-third, and so, the pump motive force required for the cooling becomes five times or more, which is not desirable from the perspective of power loss. In addition, if the cooling system with the same upper pressure limit and the same upper temperature limit is used, the output that can be obtained from the rotating electrical machine becomes approximately half or less. In other words, in order to achieve the same cooling capacity, it is necessary to double the cross-sectional area of the hollow conductor wire, as a result, the volume and weight of the rotating electrical machine, etc. are increased.

The present invention has been made in view of such conventional problems. An object of the present invention is to provide an electrical energy-mechanical energy converter and an electrical energy-mechanical energy converter system that has high cooling performance and excellent productivity.

The present invention provides the following solutions to solve the above-mentioned problems to be solved. In the following, although the reference signs corresponding to those used in embodiments of the present invention are given in parentheses for ease of understanding, there is no limitation thereto. In addition, the configurations described with the reference signs may be replaced or modified appropriately.

One aspect is an electrical energy-mechanical energy converter having:

- a heat carrier inlet pipe (121) having an electrically conductive property, the heat carrier inlet pipe (121) being configured such that a heat carrier flows in from a tip-end side;
- a stator core (21) having a plurality of slots;
- a U phase heat carrier inlet coil (231) connected to the heat carrier inlet pipe (121), the U phase heat carrier inlet coil (231) being formed by winding a hollow conductor wire, through which a heat carrier that has flown the heat carrier inlet pipe (121) flows, in the stator core (21);
- a U phase heat carrier outlet coil (234, 2310) formed by winding the hollow conductor wire, through which the heat carrier that has flown the U phase heat carrier inlet coil (231) flows, in the stator core (21);
- a V phase heat carrier inlet coil (232) connected to the heat carrier inlet pipe (121), the V phase heat carrier inlet coil (232) being formed by winding the hollow conductor wire, through which the heat carrier that has flown the heat carrier inlet pipe (121) flows, in the stator core (21);
- a V phase heat carrier outlet coil (235, 2311) formed by winding the hollow conductor wire, through which the heat carrier that has flown the V phase heat carrier inlet coil (232) flows, in the stator core (21);
- a W phase heat carrier inlet coil (233) connected to the heat carrier inlet pipe (121), the W phase heat carrier inlet coil (233) being formed by winding the hollow conductor wire, through which the heat carrier that has flown the heat carrier inlet pipe (121) flows, in the stator core (21);
- a W phase heat carrier outlet coil (236, 2312) formed by winding the hollow conductor wire, through which the heat carrier that has flown the W phase heat carrier inlet coil (233) flows, in the stator core (21);
- a heat carrier outlet pipe (122) having an electrically conductive property connected to the U phase heat carrier outlet coil (234, 2310), the V phase heat carrier outlet coil (235, 2311), and the W phase heat carrier outlet coil (236, 2312), the heat carrier outlet pipe (122) being configured such that the heat carrier that has flown the U phase heat carrier outlet coil (234, 2310), the heat carrier that has flown the V phase heat carrier outlet coil (235, 2311), and the heat carrier that has flown the W phase heat carrier outlet coil (236, 2312) flows therethrough and flows out to the tip-end side;

- a connection conductor wire (120) configured to connect the heat carrier inlet pipe (121) and the heat carrier outlet pipe (122) so as to be communicable;
- a U phase line (11U) connected between the U phase heat carrier inlet coil (231) and the U phase heat carrier outlet coil (234, 2310);
- a V phase line (11V) connected between the V phase heat carrier inlet coil (232) and the V phase heat carrier outlet coil (235, 2311); and
- a W phase line (11W) connected between the W phase heat carrier inlet coil (233) and the W phase heat carrier outlet coil (236, 2312).

Another aspect is an electrical energy-mechanical energy converter system having:

- the electrical energy-mechanical energy converter;
- a heat dissipation portion (6, 631), into which the heat carrier that has flown out from the heat carrier outlet pipe (122) flows in, the heat dissipation portion (6, 631) being configured to promote heat dissipation of the heat carrier;
- a circulation pump (5), into which the heat carrier that has flown out from the heat dissipation portion (6, 631) flows in, the circulation pump (5) being configured to discharge the heat carrier and deliver the heat carrier to the heat carrier inlet pipe (121); and
- a controller (7) configured to control an operation of at least one of the heat dissipation portion (6, 631) and the circulation pump (5).

DETAILED DESCRIPTION OF THE INVENTION

Embodiments of the present invention and advantages of the present invention will be described below in detail with reference to the attached drawings.

First Embodiment

Figure 1:
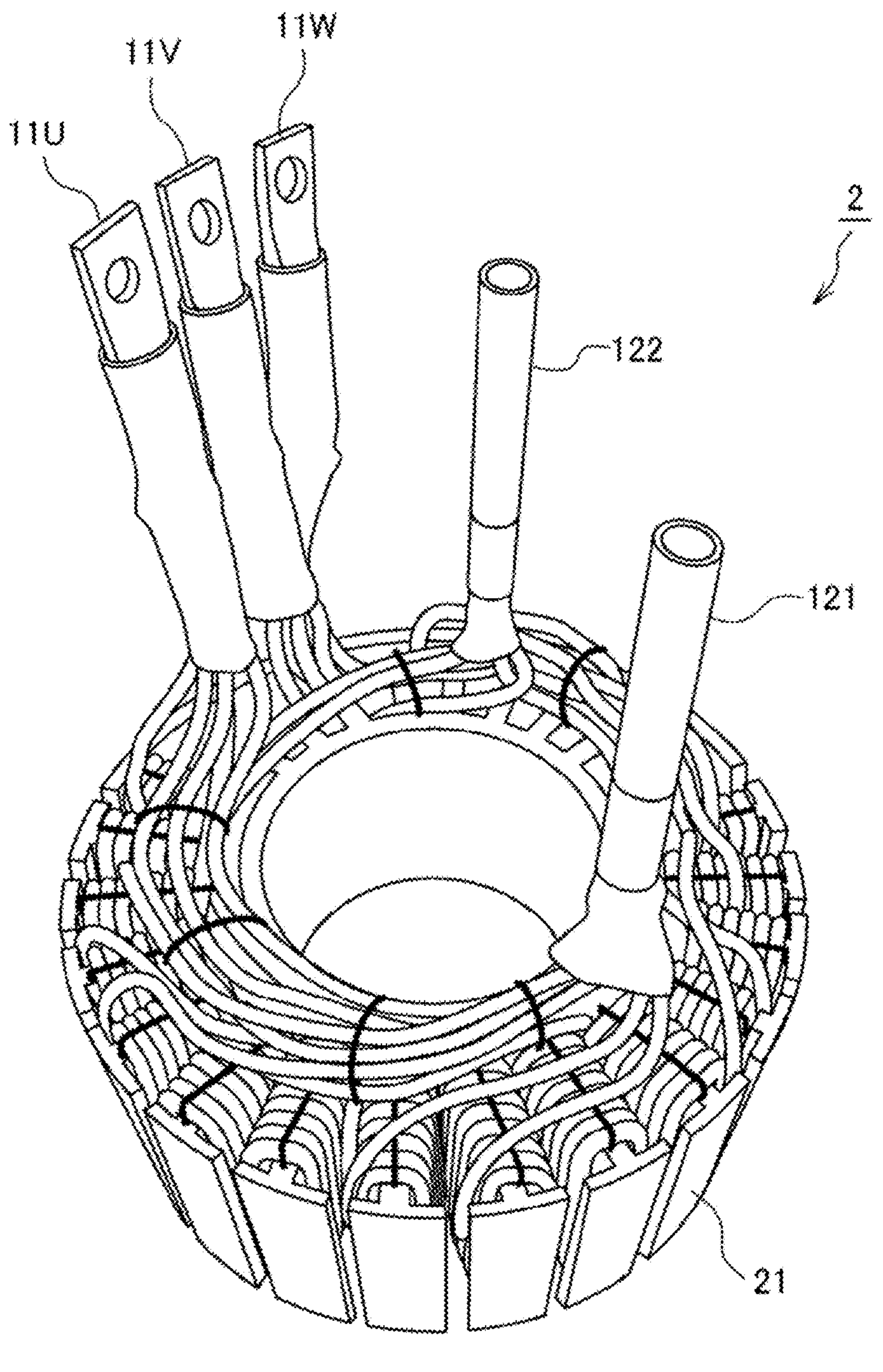
FIG. 1 is a diagram showing a stator of an electrical energy-mechanical energy converter prototyped in this invention.

FIG. 1 is a diagram showing a stator of an electrical energy-mechanical energy converter. In the following description, unless otherwise specified, a rotating electrical machine that functions as an electric motor or an electric generator will be described as the electrical energy-mechanical energy converter.

FIG. 1 shows a stator that is a characteristic component of the rotating electrical machine of this embodiment. As shown in FIG. 1, a stator 2 is configured by forming coils by winding a conductor wire in a stator core 21. As described below, this conductor wire is a hollow conductor wire. These coils can be roughly divided into U phase coils forming a U phase, V phase coils forming a V phase, and W phase coils forming a W phase. The hollow conductor wire forming the U phase coil is connected to a U phase line 11U. The hollow conductor wire forming the V phase coil is connected to a V phase line 11V. The hollow conductor wire forming the W phase coil is connected to a W phase line 11W.

Figure 2:
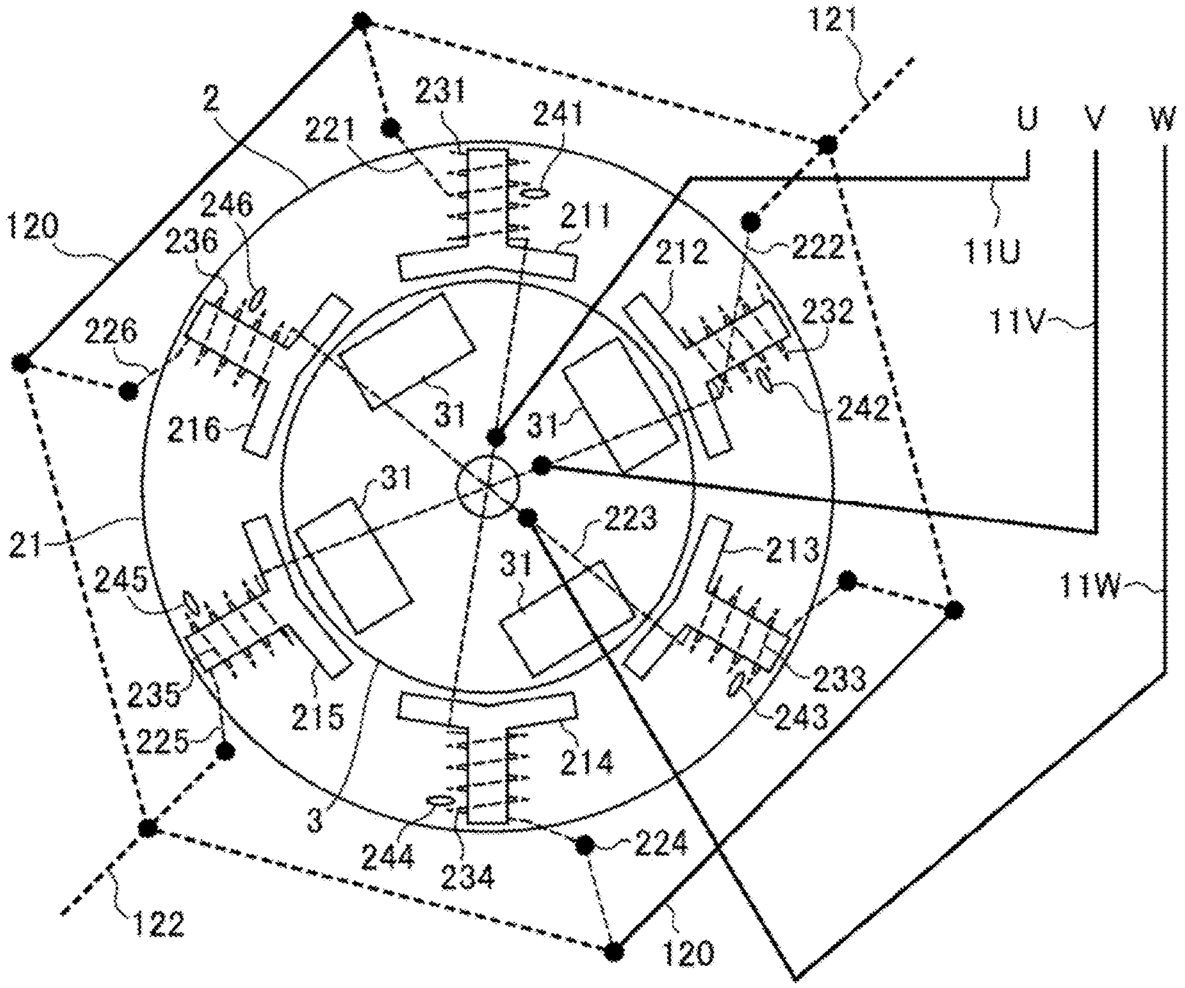
FIG. 2 is a diagram for explaining a wiring outline of a stator coil of a rotating electrical machine 1.

FIG. 2 is a diagram for explaining a wiring outline of the stator coils of a rotating electrical machine 1.

The rotating electrical machine 1 shown in FIG. 2 is an example of the present invention, and is the rotating electrical machine of an inner rotor type with six slots and four poles (6N4P) in which the stator 2 including six slots is arranged on the outer circumferential side and a rotor 3 including four permanent magnets 31 is arranged on the inner circumferential side. In addition, the coil is of a concentrated winding type.

The stator core 21 of the stator 2 is formed with six slots. Specifically, the stator core 21 is formed with a first slot 211, a second slot 212, a third slot 213, a fourth slot 214, a fifth slot 215, and a sixth slot 216. The second slot 212 is positioned next to the first slot 211. The third slot 213 is positioned next to the second slot 212. The fourth slot 214 is positioned next to the third slot 213. The fifth slot 215 is positioned next to the fourth slot 214. The sixth slot 216 is positioned next to the fifth slot 215. The first slot 211 is positioned next to the sixth slot 216.

A first coil 231 is formed by winding a first hollow conductor wire 221 in the first slot 211. As described above, because the coil is formed by winding a single hollow conductor wire in the slot, it is possible to use a conventional manufacturing device, and so, an excellent productivity is achieved. The size of the first hollow conductor wire 221 is, for example, about 1 to 6 mm in the outer diameter and 0.5 mm or more in the inner diameter, and thereby, a liquid heat carrier is allowed to flow therethrough. However, because the size of the hollow conductor wire depends on the size of the rotating electrical machine, an appropriate size should be selected in accordance with the size of the rotating electrical machine. The same applies to following hollow conductor wire. In addition, as an insulating material for the hollow conductor wire, an insulating varnish can be mentioned, for example. However, a high-grade varnish is not required, and so, it is possible to suppress the cost. In addition, a shrinkable tube may also be used. An insulating material using the shrinkable tube of an ultra-thin type may also be used, and in such a case, the shrinkage is performed in a state in which several conductor wires are bundled together. In a case in which the hollow conductor wire is used, because the inside of the conductor wire is directly cooled, there is no need to consider the inhibition of the heat dissipation from the surface of the conductor wire by an insulating coating film, and so, it is easy to further increase the voltage as the thickness of the insulating coating film can be increased.

In addition, the first coil 231 is provided with a temperature sensor 241 that detects the coil temperature. One end (the liquid heat carrier inlet) of the first hollow conductor wire 221 is connected to a liquid heat carrier inlet pipe 121. The liquid heat carrier inlet pipe 121 has an electrically conductive property and allows the flow of the electricity. The liquid heat carrier inlet pipe 121 is branched into three paths on the downstream side in the liquid heat carrier flow direction, and the one end (the liquid heat carrier inlet) of the first hollow conductor wire 221 communicates with one of them. The other end (the liquid heat carrier outlet) of the first hollow conductor wire 221 is connected to the U phase connection 110U, as described below.

A second coil 232 is formed by winding a second hollow conductor wire 222 in the second slot 212. The second hollow conductor wire 222 has the same configuration as the first hollow conductor wire 221, and is formed to have a hollow shape through which the liquid heat carrier can flow. The second coil 232 is provided with a temperature sensor 242 that detects the coil temperature. One end (the liquid heat carrier inlet) of the second hollow conductor wire 222 is connected to the liquid heat carrier inlet pipe 121. Other end (the liquid heat carrier outlet) of the second hollow conductor wire 222 is connected to a V phase connection 110V, as described below.

A third coil 233 is formed by winding a third hollow conductor wire 223 in the third slot 213. The third hollow conductor wire 223 has the same configuration as the first hollow conductor wire 221, and is formed to have the hollow shape through which the liquid heat carrier can flow. The third coil 233 is provided with a temperature sensor 243 that detects the coil temperature. One end (the liquid heat carrier inlet) of the third hollow conductor wire 223 is connected to the liquid heat carrier inlet pipe 121. Other end (the liquid heat carrier outlet) of the third hollow conductor wire 223 is connected to a W phase connection 110W, as described below.

A fourth coil 234 is formed by winding a fourth hollow conductor wire 224 in the fourth slot 214. The fourth hollow conductor wire 224 has the same configuration as the first hollow conductor wire 221, and is formed to have the hollow shape through which the liquid heat carrier can flow. The fourth coil 234 is provided with a temperature sensor 244 that detects the coil temperature. One end (the liquid heat carrier inlet) of the fourth hollow conductor wire 224 is communicated with the U phase connection 110U, as described below. Other end (the liquid heat carrier outlet) of the fourth hollow conductor wire 224 is connected to a liquid heat carrier outlet pipe 122. The liquid heat carrier outlet pipe 122 has an electrically conductive property and allows the flow of the electricity. The liquid heat carrier outlet pipe 122 is branched into three paths on the upstream side in the liquid heat carrier flow direction, and the other end (the liquid heat carrier outlet) of the fourth hollow conductor wire 224 is communicated with one of them.

A fifth coil 235 is formed by winding a fifth hollow conductor wire 225 in the fifth slot 215. The fifth hollow conductor wire 225 has the same configuration as the first hollow conductor wire 221, and is formed to have the hollow shape through which the liquid heat carrier can flow. The fifth coil 235 is provided with a temperature sensor 245 that detects the coil temperature. One end (the liquid heat carrier inlet) of the fifth hollow conductor wire 225 is connected to the V phase connection 110V, as described below. Other end (the liquid heat carrier outlet) of the fifth hollow conductor wire 225 is connected to the liquid heat carrier outlet pipe 122.

A sixth coil 236 is formed by winding a sixth hollow conductor wire 226 in the sixth slot 216. The sixth hollow conductor wire 226 has the same configuration as the first hollow conductor wire 221, and is formed to have the hollow shape through which the liquid heat carrier can flow. The sixth coil 236 is provided with a temperature sensor 246 that detects the coil temperature. One end (the liquid heat carrier inlet) of the sixth hollow conductor wire 226 is connected to the W phase connection 110W, as described below. Other end (the liquid heat carrier outlet) of the sixth hollow conductor wire 226 is connected to the liquid heat carrier outlet pipe 122.

The liquid heat carrier inlet pipe 121 and the liquid heat carrier outlet pipe 122 are formed to have, as described above, the hollow shape through which the liquid heat carrier can flow. The liquid heat carrier inlet pipe 121 and the liquid heat carrier outlet pipe 122 are electrically connected via the solid connection conductor wire 120.

Figure 3A:
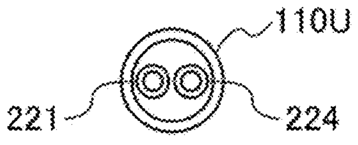
FIG. 3 is a planar cross-sectional view of a U phase connection 110U for explaining a U phase connection.
FIG. 3B is a simplified diagram of the vicinity of the U phase connection.
Figure 3B:
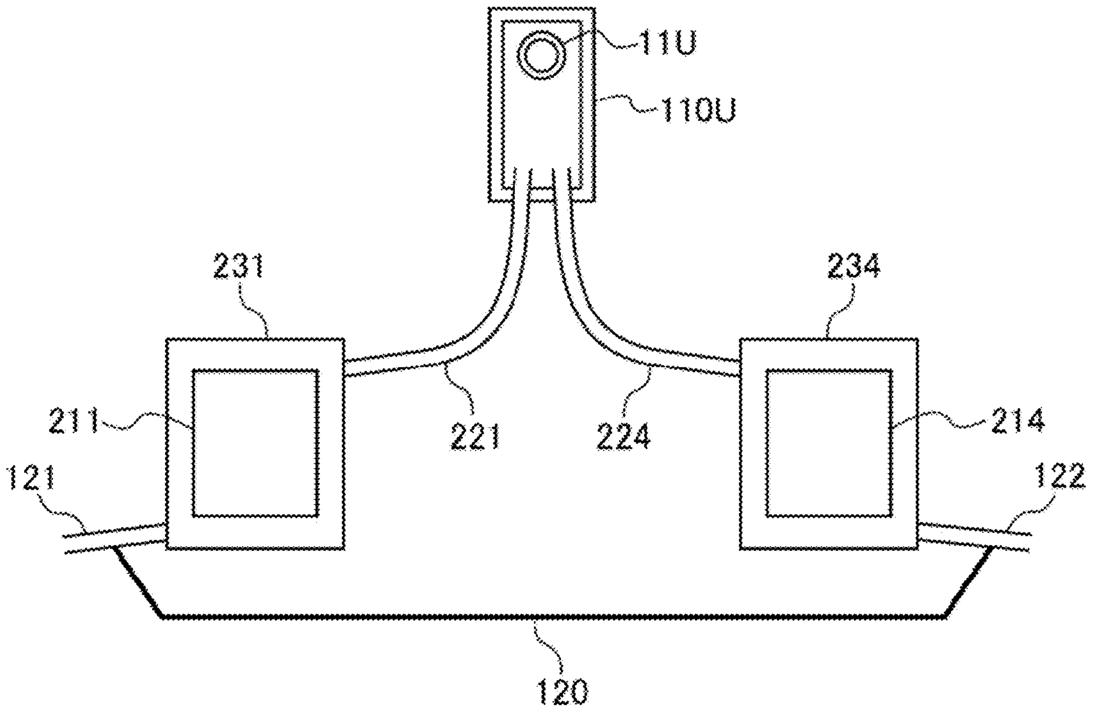

FIGS. 3A and 3B are each a diagram for explaining the U phase connection. Here, FIG. 3A is a planar cross-sectional view of the U phase connection 110U, and FIG. 3B is a diagram for explaining the vicinity of the U phase connection in a simplified manner.

As described above, the other end (the liquid heat carrier outlet) of the first hollow conductor wire 221 of the first coil 231 formed in the first slot 211 is connected to the U phase connection 110U. In addition, the one end (the liquid heat carrier inlet) of the fourth hollow conductor wire 224 of the fourth coil 234 formed in the fourth slot 214 is also connected to the U phase connection 110U. The U phase connection 110U is formed to have the tubular shape and has the liquid-tight structure in which the liquid heat carrier that has flown through the first hollow conductor wire 221 flows into the fourth hollow conductor wire 224 without causing the leakage. The U phase line 11U is connected to this U phase connection 110U. The electrical distance from the U phase connection 110U to the first coil 231 and the electrical distance from the U phase connection 110U to the fourth coil 234 are set to be equal or substantially equal. In the above, the electrical distance refers to the distance of the path through which electricity flows.

In addition, as described above, the one end (the liquid heat carrier inlet) of the first hollow conductor wire 221 communicates with the liquid heat carrier inlet pipe 121, and the other end (the liquid heat carrier outlet) of the fourth hollow conductor wire 224 is connected to the liquid heat carrier outlet pipe 122. The liquid heat carrier inlet pipe 121 and the liquid heat carrier outlet pipe 122 are electrically connected via the solid connection conductor wire 120.

Although FIGS. 3A and 3B illustrate the U phase connection, because the V phase connection 110V and the W phase connection 110W have the same configurations, the description thereof will be omitted.

Figure 4:
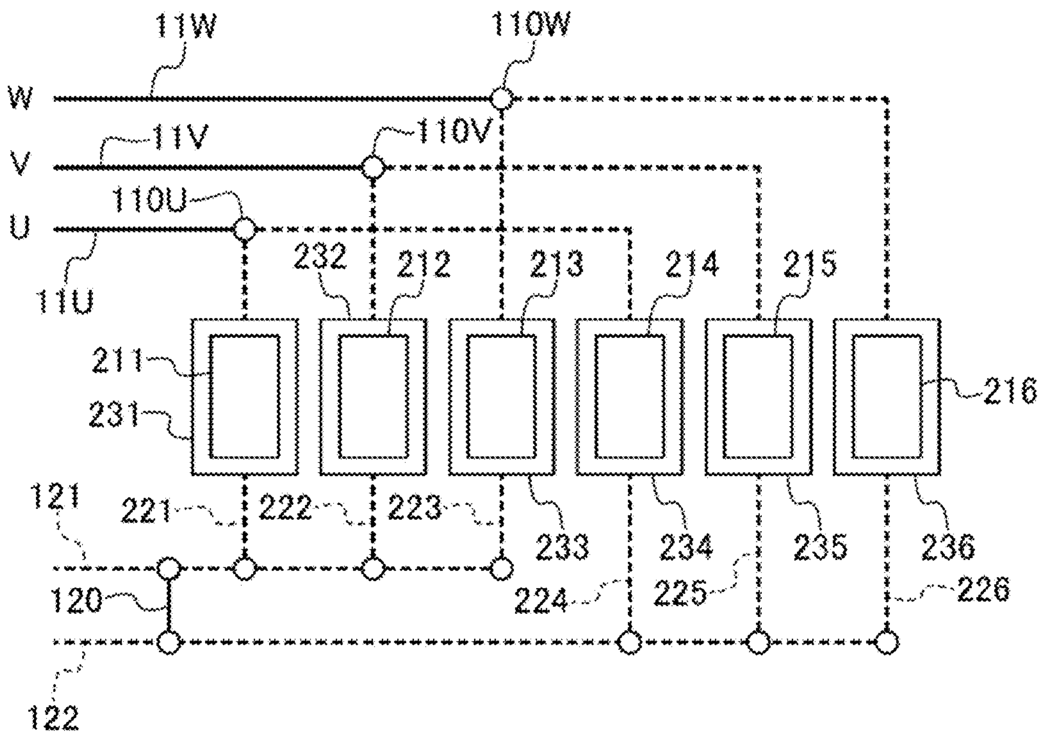
FIG. 4 is a diagram showing a simplified configuration of the coil in FIG. 2.

FIG. 4 is a diagram showing the simplified configuration of the coil shown in FIG. 2.

In this FIG. 4, in order to avoid complexity in the drawings, the U phase connection 110U, the V phase connection 110V, and the W phase connection 110W are omitted.

Figure 5:
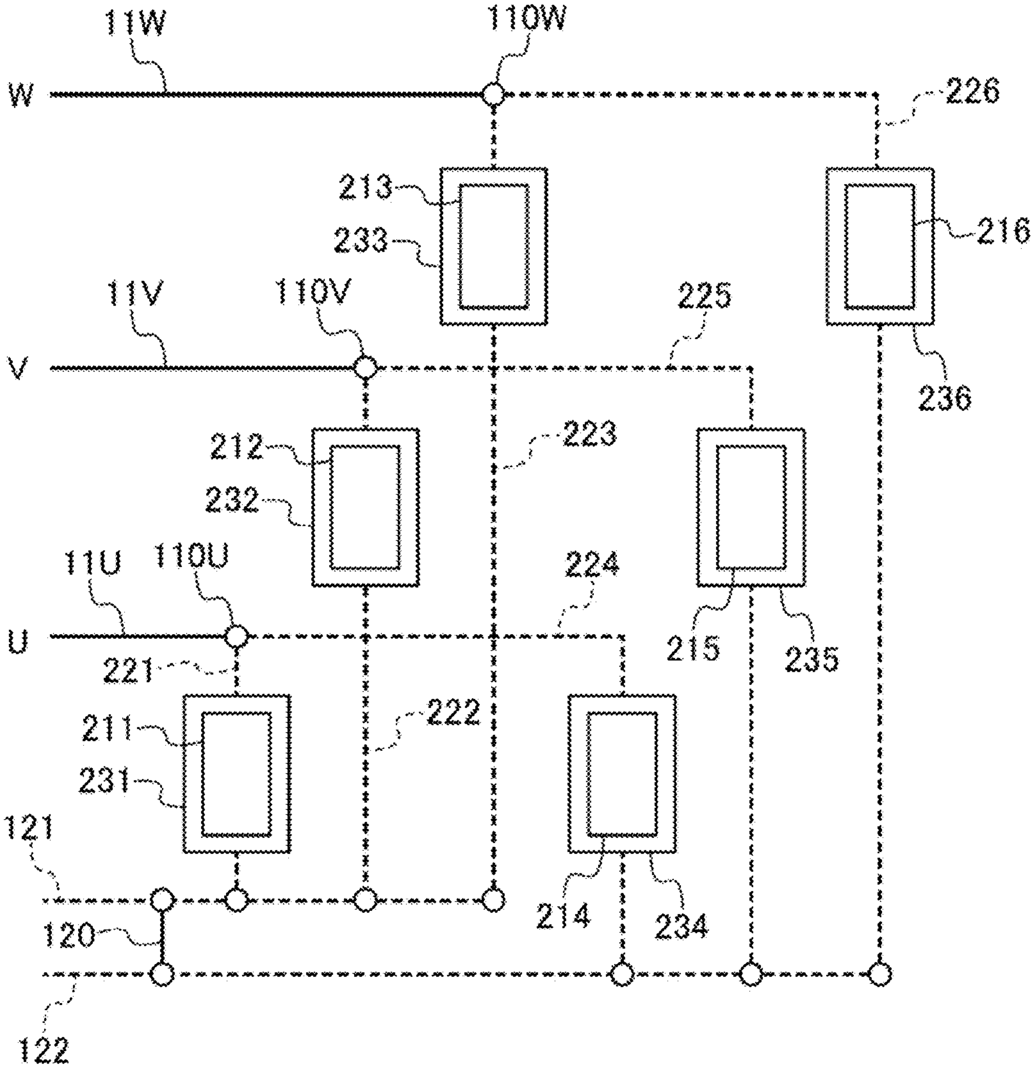
FIG. 5 is a diagram showing, for ease of understanding FIG. 4, the configuration diagram of FIG. 4 divided vertically into a U phase, a V phase, and a W phase.

In addition, FIG. 5 is a diagram showing, for ease of understanding FIG. 4, the configuration diagram of FIG. 4 divided vertically into the U phase, the V phase, and the W phase.

The one end (the liquid heat carrier inlet) of the first hollow conductor wire 221 of the first coil 231 formed in the first slot 211 communicates with the liquid heat carrier inlet pipe 121, and the other end (the liquid heat carrier outlet) thereof communicates with the one end (the liquid heat carrier inlet) of the fourth hollow conductor wire 224 of the fourth coil 234 formed in the fourth slot 214. The other end (the liquid heat carrier outlet) of the fourth hollow conductor wire 224 is connected to the liquid heat carrier outlet pipe 122. The U phase line 11U is connected to the first hollow conductor wire 221 and the fourth hollow conductor wire 224.

The one end (the liquid heat carrier inlet) of the second hollow conductor wire 222 of the second coil 232 formed in the second slot 212 communicates with the liquid heat carrier inlet pipe 121, and the other end (the liquid heat carrier outlet) thereof communicates with the one end (the liquid heat carrier inlet) of the fifth hollow conductor wire 225 of the fifth coil 235 formed in the fifth slot 215. The other end (the liquid heat carrier outlet) of the fifth hollow conductor wire 225 is connected to the liquid heat carrier outlet pipe 122. In addition, the V phase line 11V is connected to the second hollow conductor wire 222 and the fifth hollow conductor wire 225.

The one end (the liquid heat carrier inlet) of the third hollow conductor wire 223 of the third coil 233 formed in the third slot 213 communicates with the liquid heat carrier inlet pipe 121, and the other end (the liquid heat carrier outlet) thereof communicates with the one end (the liquid heat carrier inlet) of the sixth hollow conductor wire 226 of the sixth coil 236 formed in the sixth slot 216. The other end (the liquid heat carrier outlet) of the sixth hollow conductor wire 226 is connected to the liquid heat carrier outlet pipe 122. In addition, the W phase line 11W is connected to the third hollow conductor wire 223 and the sixth hollow conductor wire 226.

The liquid heat carrier inlet pipe 121 and the liquid heat carrier outlet pipe 122 are electrically connected via the solid connection conductor wire 120. The connection conductor wire 120 forms the neutral point.

Next, the flow of the liquid heat carrier will be described.

Figure 6:
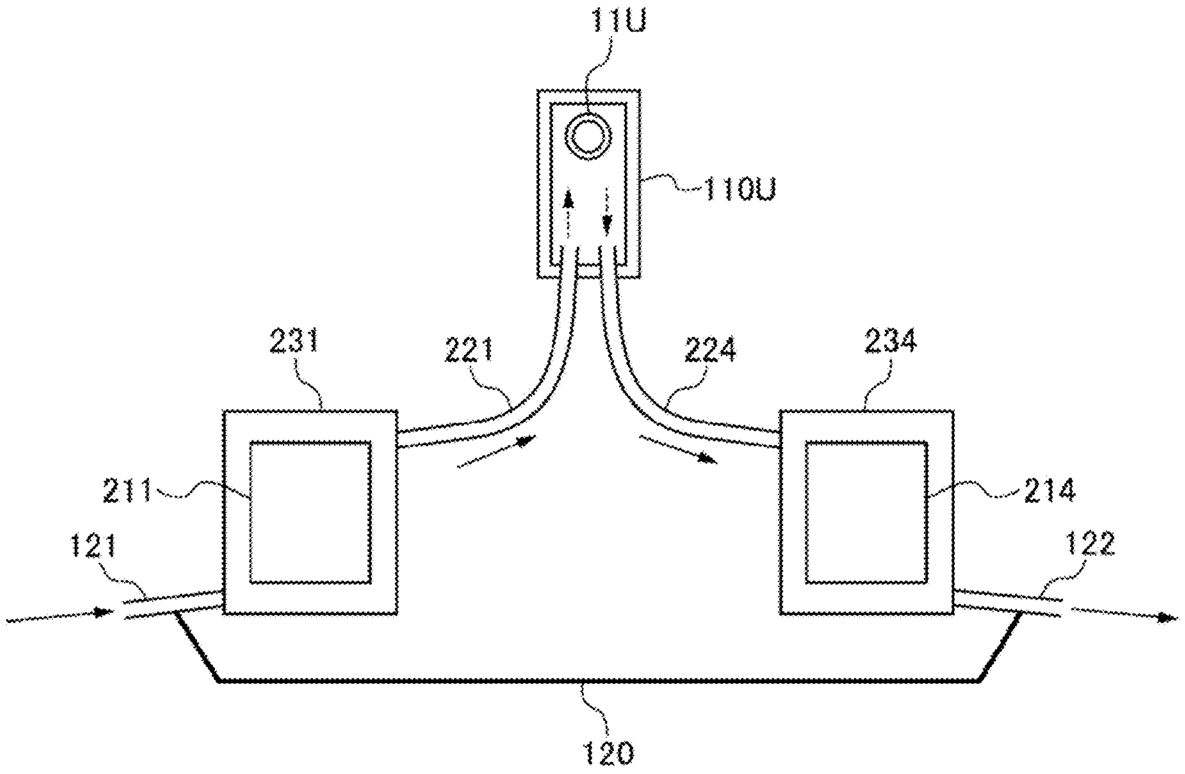
FIG. 6 is a diagram for explaining a flow of a liquid heat carrier liquid heat carrier in FIG. 3B.

FIG. 6 is a diagram for explaining the flow of the liquid heat carrier in FIG. 3B. Here, the arrows indicate the flow direction of the liquid heat carrier.

As shown by the arrows, the liquid heat carrier that has flown through the liquid heat carrier inlet pipe 121 flows through the first hollow conductor wire 221 of the first coil 231, passes through the U phase connection 110U, and flows into the liquid heat carrier outlet pipe 122 via the fourth hollow conductor wire 224 of the fourth coil 234.

Figure 7:
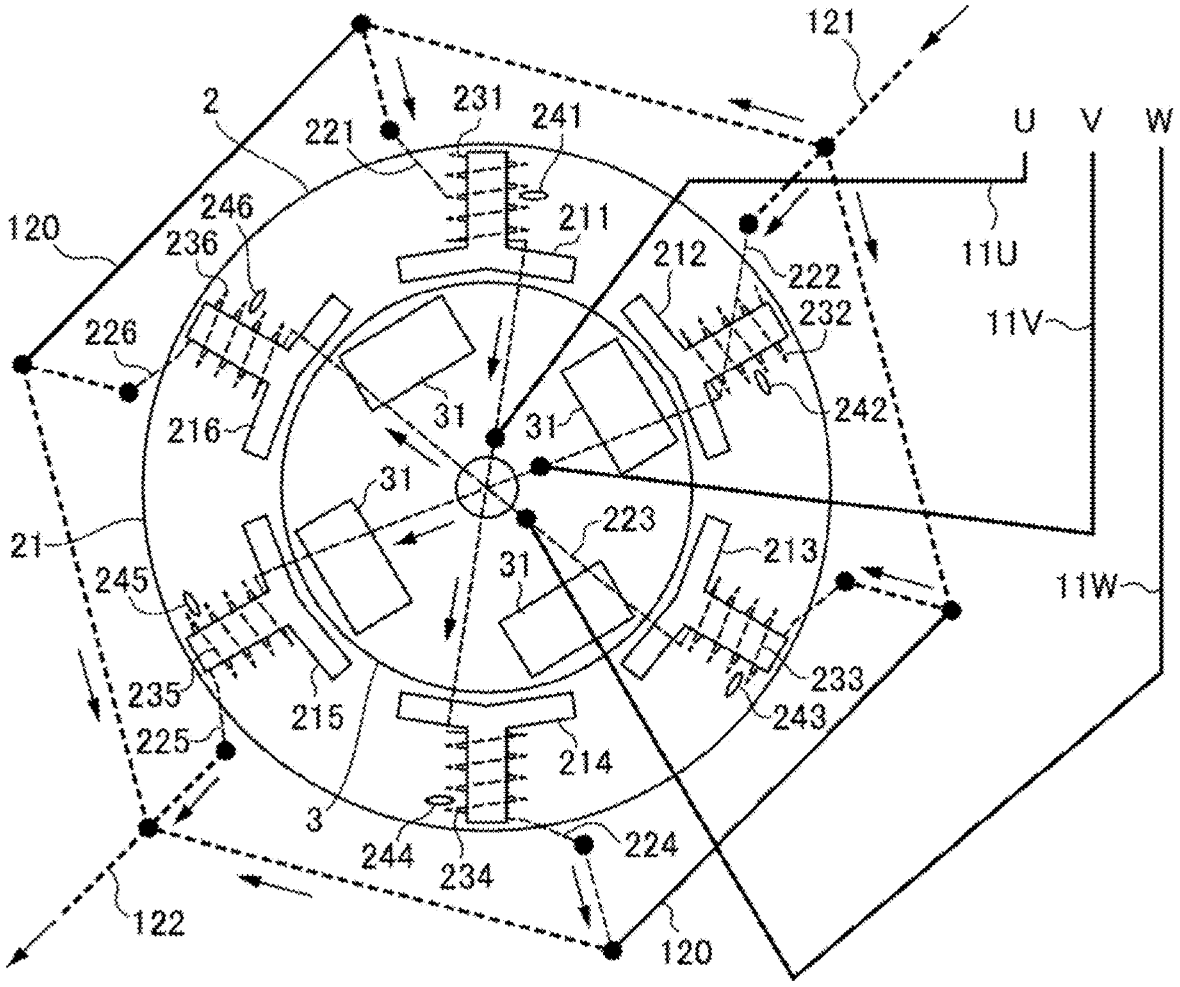
FIG. 7 is a diagram for explaining the flow of the liquid heat carrier in FIG. 2.

FIG. 7 is a diagram for explaining the flow of the liquid heat carrier in FIG. 2. Here, the arrows indicate the flow direction of the liquid heat carrier.

The liquid heat carrier that has flown through the liquid heat carrier inlet pipe 121 is branched into three flows.

The first flow flows through the first hollow conductor wire 221 of the first coil 231, passes through the U phase connection 110U, and flows into the liquid heat carrier outlet pipe 122 via the fourth hollow conductor wire 224 of the fourth coil 234.

The second flow flows through the second hollow conductor wire 222 of the second coil 232, passes through the V phase connection 110V, and flows into the liquid heat carrier outlet pipe 122 via the fifth hollow conductor wire 225 of the fifth coil 235.

The third flow flows through the third hollow conductor wire 223 of the third coil 233, passes through the W phase connection 110W, and flows into the liquid heat carrier outlet pipe 122 via the sixth hollow conductor wire 226 in the sixth slot 216.

The flow of the liquid heat carrier will be described using an exploded diagram as follows.

Figure 8:
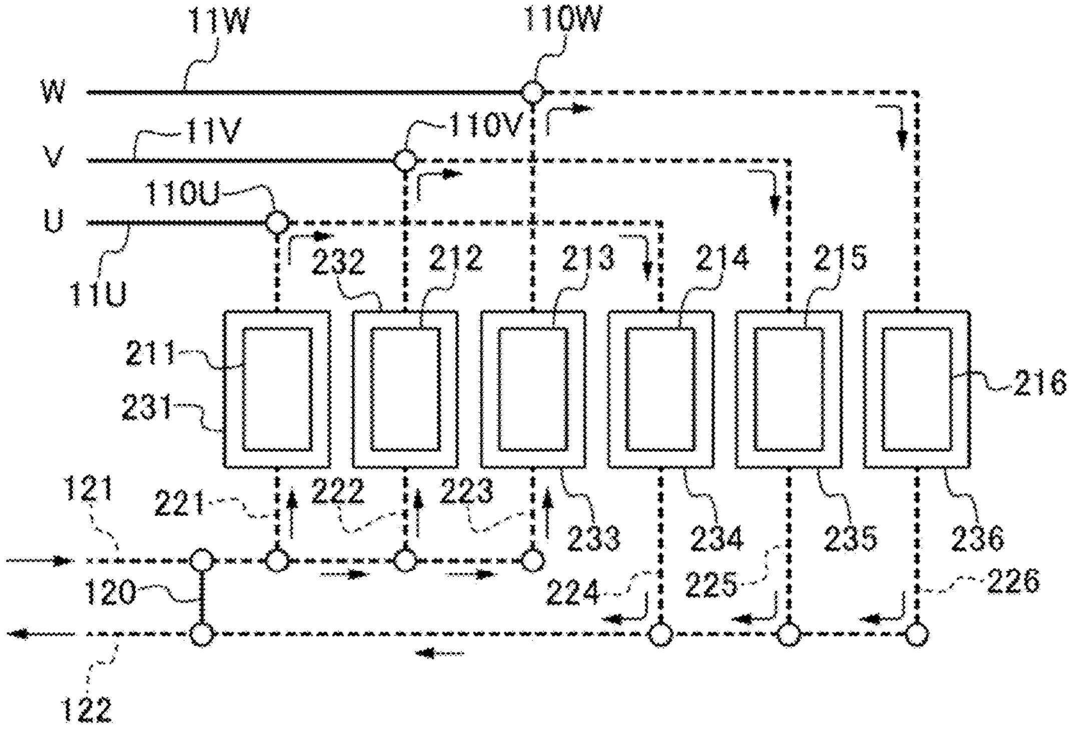
FIG. 8 is a diagram for explaining the flow of the liquid heat carrier using the exploded diagram shown in FIG. 4.

FIG. 8 is a diagram for explaining the flow of the liquid heat carrier using the exploded diagram shown in FIG. 4. Here, the arrows indicate the flow direction of the liquid heat carrier.

The liquid heat carrier that has flown through the liquid heat carrier inlet pipe 121 is branched into three flows.

The first flow flows through the first hollow conductor wire 221 of the first coil 231, and flows into the liquid heat carrier outlet pipe 122 via the fourth hollow conductor wire 224 of the fourth coil 234.

The second flow flows through the second hollow conductor wire 222 of the second coil 232, and flows into the liquid heat carrier outlet pipe 122 via the fifth hollow conductor wire 225 of the fifth coil 235.

The third flow flows through the third hollow conductor wire 223 of the third coil 233, and flows into the liquid heat carrier outlet pipe 122 via the sixth hollow conductor wire 226 in the sixth slot 216.

Next, the flow of the current will be described.

Figure 9:
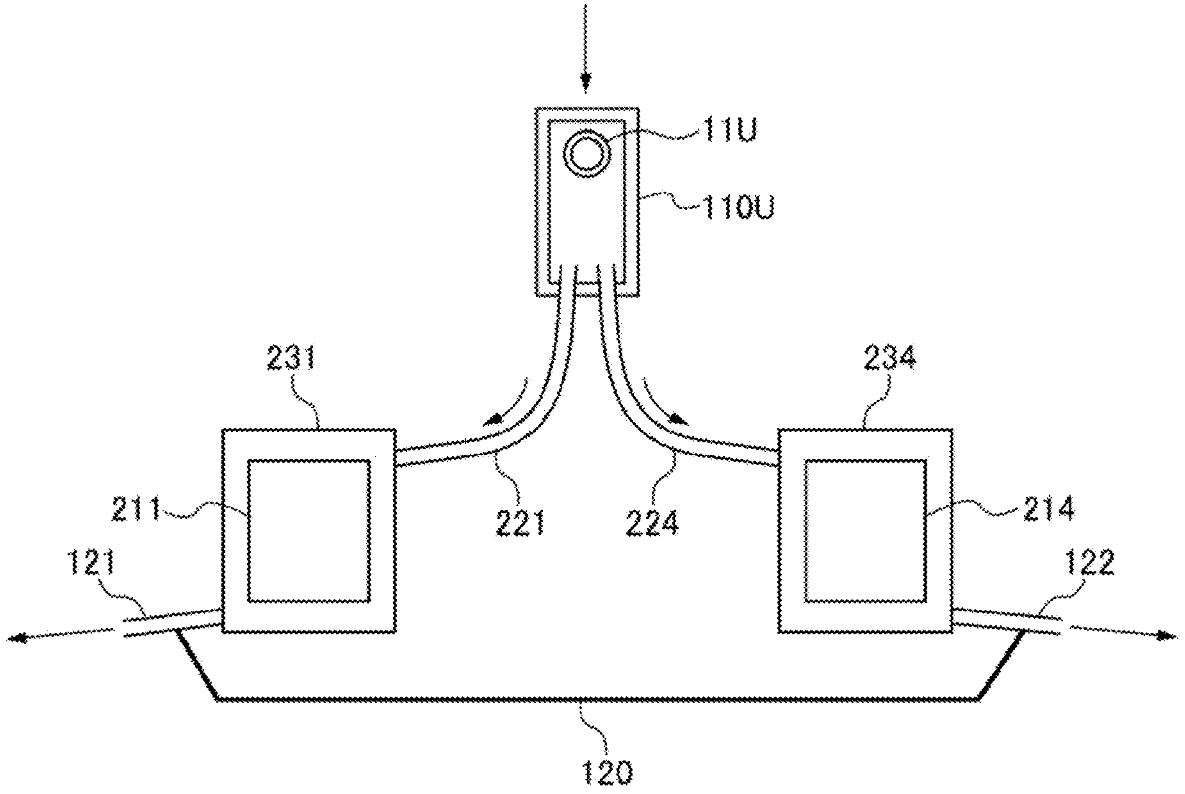
FIG. 9 is a diagram for explaining a flow of current in FIG. 3B.

FIG. 9 is a diagram for explaining the flow of the current in FIG. 3B. Here, the arrows indicate the flow direction of the current.

As one stream, the current that has flown the U phase line 11U flows through the first hollow conductor wire 221 and reaches the liquid heat carrier inlet pipe 121. The flow of the current after reaching the liquid heat carrier inlet pipe 121 will be described later. In addition, another stream of the current that has flown the U phase line 11U flows through the fourth hollow conductor wire 224 and reaches the liquid heat carrier outlet pipe 122. The flow of the current after reaching the liquid heat carrier outlet pipe 122 will be described later.

Figure 10:
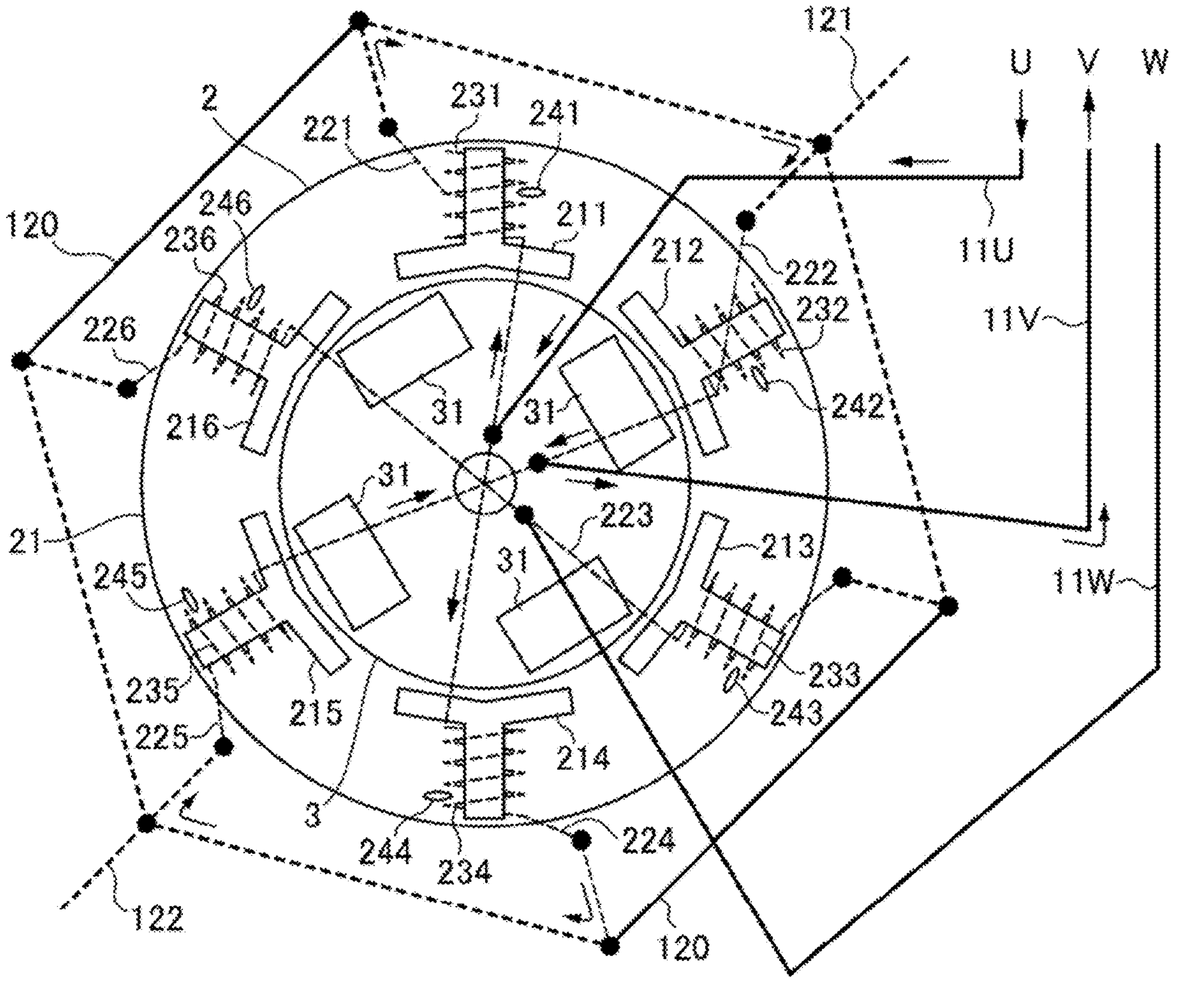
FIG. 10 is a diagram for explaining how the current flows from a U phase line 11U to a V phase line 11V in FIG. 2.

FIG. 10 is a diagram for explaining how the current flows from the U phase line 11U to the V phase line 11V in FIG. 2. Here, the arrows indicate the flow direction of the current.

As one stream, the current that has been input from the U phase line 11U flows through the first hollow conductor wire 221, passes through the liquid heat carrier inlet pipe 121, flows through the second hollow conductor wire 222, and reaches the V phase line 11V. In addition, another stream of the current that has been input from the U phase line 11U flows through the fourth hollow conductor wire 224, passes through the liquid heat carrier outlet pipe 122, flows through the fifth hollow conductor wire 225, and reaches the V phase line 11V.

The flow of the current will be described with reference to an exploded diagram as follows.

Figure 11:
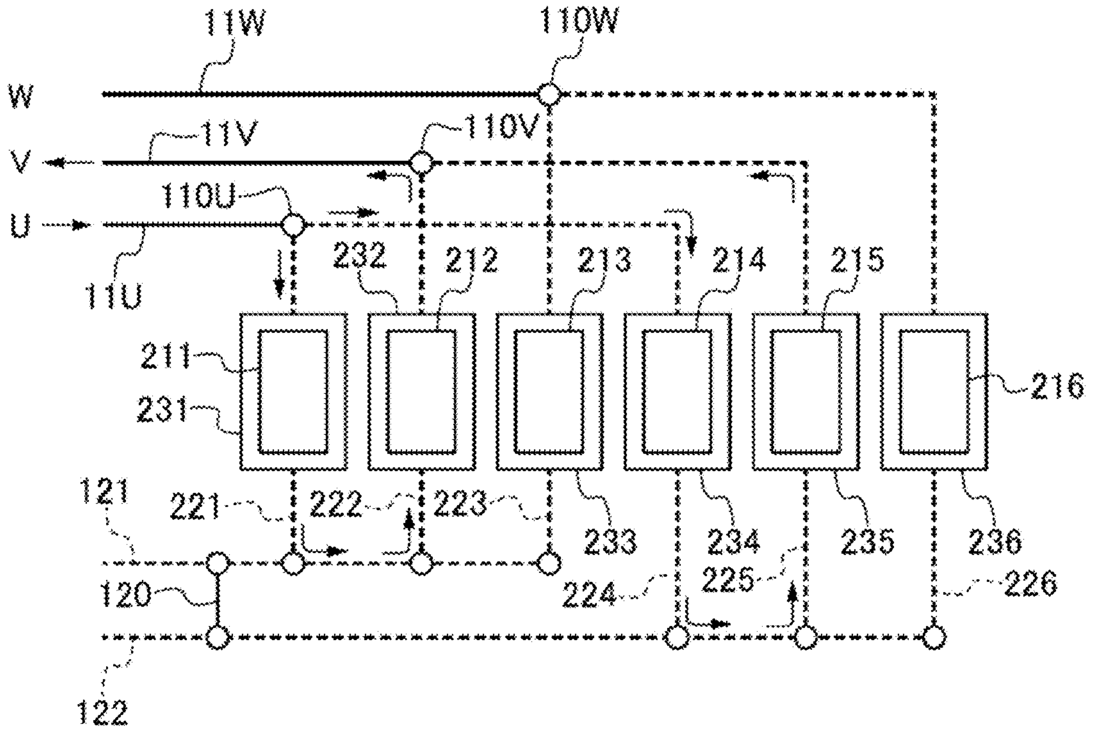
FIG. 11 is a diagram for explaining how the current flows from the U phase line 11U to the V phase line 11V with reference to the exploded diagram shown in FIG. 4.

FIG. 11 is a diagram for explaining how the current flows from the U phase line 11U to the V phase line 11V with reference to the exploded diagram shown in FIG. 4. Here, the arrows indicate the flow direction of the current.

As one stream, the current that has been input from the U phase line 11U flows through the first hollow conductor wire 221, passes through the liquid heat carrier inlet pipe 121, flows through the second hollow conductor wire 222, and reaches the V phase line 11V. In addition, another stream of the current that has been input from the U phase line 11U flows through the fourth hollow conductor wire 224, passes through the liquid heat carrier outlet pipe 122, flows through the fifth hollow conductor wire 225, and reaches the V phase line 11V.

Because the liquid heat carrier inlet pipe 121 and the liquid heat carrier outlet pipe 122 are electrically connected by the solid connection conductor wire 120, the connection conductor wire 120 forms the neutral point. The liquid heat carrier inlet pipe 121 and the liquid heat carrier outlet pipe 122 are at the same electric potential with no potential difference, and so, the current does not flow through the connection conductor wire 120.

In addition, because the electrical distance from the U phase connection 110U to the first coil 231 and the electrical distance from the U phase connection 110U to the fourth coil 234 are set to be equal or substantially equal, even if the connection conductor wire 120 is not provided, the liquid heat carrier inlet pipe 121 and the liquid heat carrier outlet pipe 122 are essentially at the same electric potential with no potential difference. However, if the connection conductor wire 120 is not provided and the liquid heat carrier inlet pipe 121 and the liquid heat carrier outlet pipe 122 are not electrically connected, there is a risk in that a large electric potential difference is caused to cause a short circuit between the liquid heat carrier inlet pipe 121 and the liquid heat carrier outlet pipe 122 in a case of an abnormality such as a disconnection of the first coil 231 or the fourth coil 234. In contrast, in this embodiment, because the liquid heat carrier inlet pipe 121 and the liquid heat carrier outlet pipe 122 are electrically connected by the connection conductor wire 120, it is possible to avoid such a situation.

Each of the coils is formed by winding the hollow conductor wire in each slot. The liquid heat carrier (the heat carrier) flows through the inside of the hollow conductor wire. As described below, the liquid heat carrier (the heat carrier) that has flown out from the rotating electrical machine is delivered back to the rotating electrical machine after being cooled by a radiator. Because of such a configuration, an excellent cooling performance is achieved for the rotating electrical machine. Therefore, the magnets used in the rotor 3 do not need to have high heat resistance specifications, and it is possible to keep the cost required for the magnet low. In addition, it becomes possible to use magnets with high magnetic force but low heat resistance, and so, it becomes possible to achieve further size reduction and weight reduction in the rotating electrical machine.

First Embodiment of Electrical Energy-Mechanical Energy Converter System

Figure 12:
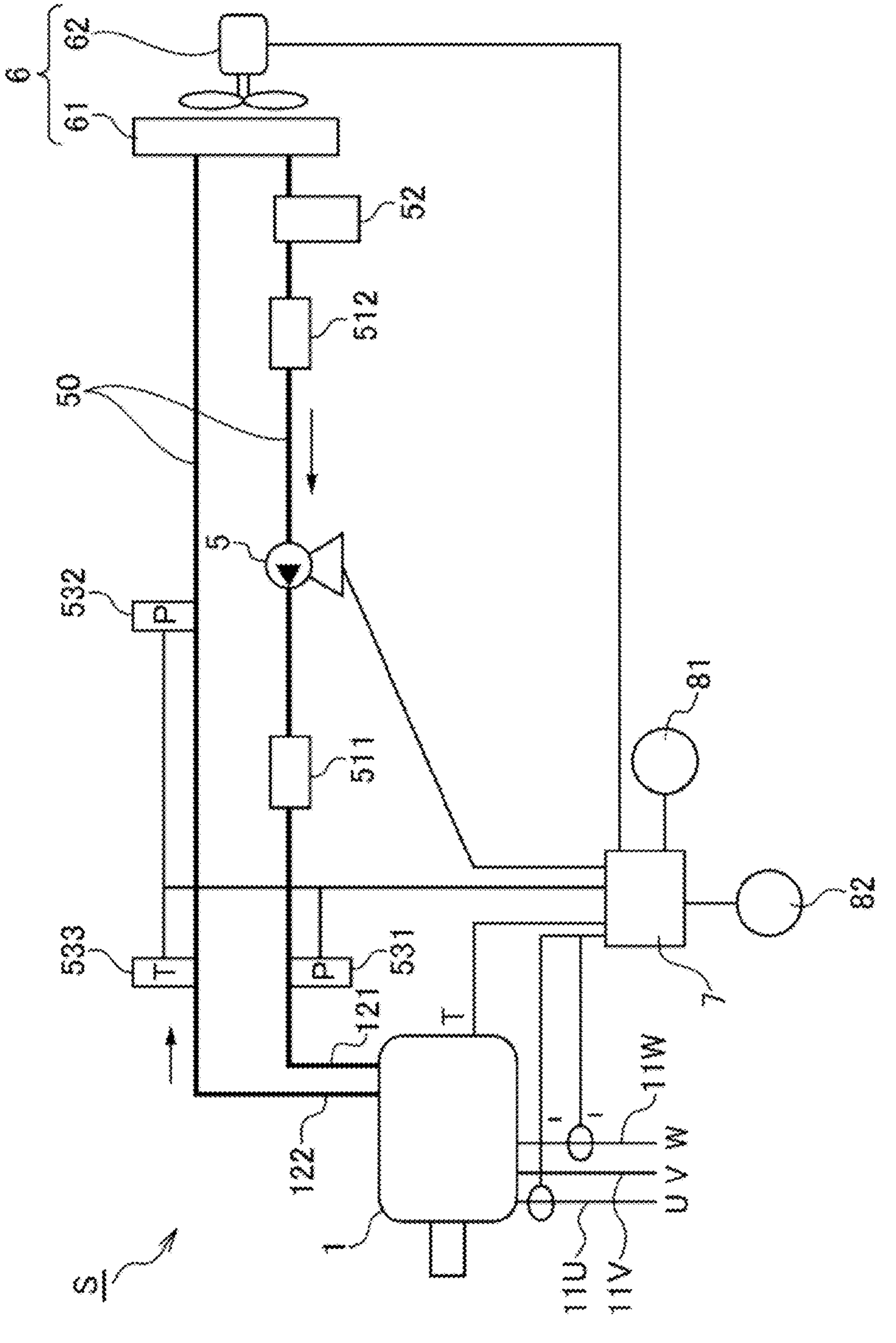
FIG. 12 is a diagram for explaining an electrical energy-mechanical energy converter system.

FIG. 12 is a diagram for explaining an electrical energy-mechanical energy converter system.

In the following description, unless otherwise specified, the rotating electrical machine that functions as the electric motor or electric generator will be described as the electrical energy-mechanical energy converter. Thus, the electrical energy-mechanical energy converter system will also be referred to as a rotating electrical machine system, as appropriate.

Next, a specific system utilizing the above-described rotating electrical machine (the electrical energy-mechanical energy converter) will be described.

The rotating electrical machine system (the electrical energy-mechanical energy converter system) S is provided with the electrical energy-mechanical energy converter (the rotating electrical machine) 1, a circulation pump 5, a heat exchange unit 6, and a controller 7.

The U phase line 11U, the V phase line 11V, the W phase line 11W, the liquid heat carrier inlet pipe 121, the liquid heat carrier outlet pipe 122, and so forth are provided so as to extend out from the rotating electrical machine 1. A current sensor 111U is provided on the U phase line 11U. A current sensor 111W is provided on the W phase line 11W. The liquid heat carrier inlet pipe 121 and the liquid heat carrier outlet pipe 122 are connected to a liquid heat carrier circulation path 50. Signals from the current sensor 111U and the current sensor 111W are sent to the controller 7 and used for control of the circulation pump 5 and a cooling fan 62. In addition, the temperature sensors 241-246 that detect the temperature of the coils are respectively attached to the coils each of which is formed by winding the hollow conductor wire for each of the slots of the stator core of the rotating electrical machine 1. The signals from the temperature sensors 241-246 are sent to the controller 7 and used for control of a warning lamp 81.

The circulation pump 5 delivers the heat carrier (the liquid heat carrier) to the rotating electrical machine 1. The circulation pump 5 is provided on the liquid heat carrier circulation path 50. Specifically, the circulation pump 5 is provided on the upstream side of the rotating electrical machine 1 in the liquid heat carrier flow direction in the liquid heat carrier circulation path 50.

In the above, as the circulation pump 5, for example, a diaphragm pump can be used. The diaphragm pump is a medium-pressure pump that pumps a liquid by volume change caused by a piston motion of a rubber diaphragm. The discharge pressure is about 0.1-1 MPa.

In addition, as the circulation pump 5, a plunger pump may be used. The plunger pump is a high-pressure pump that pumps a liquid by volume change caused by a piston motion of a metal piston. The discharge pressure can be 0.1-20 MPa or more.

Furthermore, as the circulation pump 5, a vane pump may be used. The vane pump is the medium-pressure pump that pumps a liquid by volume change caused by a rotational motion of self-lubricating vanes. The discharge pressure is about 0.1-1.8 MPa.

Furthermore, as the circulation pump 5, a gear pump may be used. The gear pump is the medium-pressure pump that pumps a liquid by volume change caused by rotational motions of meshing gears. The discharge pressure can be 0.1-20 MPa or more. In a case in which the gear pump is used, the liquid is limited to a liquid having a lubricating property.

In addition, as the circulation pump 5, a volute pump may be used. The volute pump is widely used in general automobiles and is a non-positive displacement pump of a turbine rotation type that pumps a liquid by a centrifugal force. It is suitable for low pressure and high flow rate applications and cannot apply high pressure. The discharge pressure is about 0.1 MPa.

As described above, as the circulation pump 5, it is possible to use various pumps.

In the system shown in FIG. 12, the heat exchange unit 6 is provided with a radiator 61 and the cooling fan 62. The radiator 61 is provided on the liquid heat carrier circulation path 50. Specifically, the radiator 61 is provided on the downstream side of the rotating electrical machine 1 in the liquid heat carrier flow direction in the liquid heat carrier circulation path 50 and provided on the upstream side of the circulation pump 5 in the liquid heat carrier flow direction in the liquid heat carrier circulation path 50. The cooling fan 62 sends wind to the radiator 61 and promotes decrease in the temperature of the liquid heat carrier flowing through the radiator 61.

With such a configuration, the liquid heat carrier discharged from the circulation pump 5 flows into the liquid heat carrier inlet pipe 121, flows through the inside of the rotating electrical machine 1, flows out from the liquid heat carrier outlet pipe 122, is cooled in the radiator 61, then returns to the circulation pump 5, and is delivered again to the rotating electrical machine 1.

Here, the specifications for the liquid heat carrier are as follows.

The viscosity of the liquid heat carrier is preferably low. The stator of the electrical energy-mechanical energy converter is formed by forming the coils by winding the hollow conductor wire in the stator core. Because the heat carrier (the liquid heat carrier) flows through the hollow conductor wire, the lower viscosity is preferable for easier flow.

It is preferable that the specific heat capacity of the liquid heat carrier be high. Because the liquid heat carrier flows through the hollow conductor wire to cool the electrical energy-mechanical energy converter, it is preferable that the liquid heat carrier have a higher specific heat capacity.

Although the liquid heat carrier is corrosive, it is preferable that aggressiveness towards the metal be low. Because the liquid heat carrier flows through the inside of the metallic hollow conductor wire, it is desirable that the aggressiveness towards the metal is low.

Furthermore, if the liquid heat carrier has an insulating property, it is even more preferable as it further improves safety.

Next, a further detailed configuration of the liquid heat carrier circulation path 50 will be described.

The liquid heat carrier circulation path 50 arranged between the circulation pump 5 and the rotating electrical machine 1 is provided with a filter 511. For the filter 511, mesh size, etc. are selected appropriately considering the inner diameter size of the hollow conductor wire to be used and the flow rate. The filter used in the rotating electrical machine prototyped in this embodiment is a 200-mesh line filter. The filter 511 filters the liquid heat carrier flowing into the rotating electrical machine 1.

The liquid heat carrier circulation path 50 arranged between the radiator 61 and the circulation pump 5 is provided with a buffer tank 52 and a filter 512. More specifically, the filter 512 is provided in the liquid heat carrier circulation path 50 that is arranged between the buffer tank 52 and the circulation pump 5. The buffer tank 52 is a tank that temporarily stores the liquid heat carrier. The filter 512 is, for example, a line filter with about 200 mesh. The filter 512 filters the liquid heat carrier flowing into the circulation pump 5.

In addition, the liquid heat carrier circulation path 50 arranged between the filter 511 and the rotating electrical machine 1 is provided with a pressure sensor 531. The pressure sensor 531 detects the pressure of the liquid heat carrier flowing into the liquid heat carrier inlet pipe 121. A signal from the pressure sensor 531 is sent to the controller 7 and used for controls of the circulation pump 5 and the cooling fan 62.

The liquid heat carrier circulation path 50 arranged between the rotating electrical machine 1 and the radiator 61 is provided with a pressure sensor 532. The pressure sensor 532 detects the pressure of the liquid heat carrier that has flown out from the liquid heat carrier outlet pipe 122 and that is flowing into the radiator 61. A signal from the pressure sensor 532 is sent to the controller 7 and used for controls of the circulation pump 5 and the cooling fan 62.

The liquid heat carrier circulation path 50 arranged between the rotating electrical machine 1 and the pressure sensor 532 is provided with a liquid-temperature sensor 533. The liquid-temperature sensor 533 detects the temperature of the liquid heat carrier flowing out from the liquid heat carrier outlet pipe 122. A signal from the liquid-temperature sensor 533 is sent to the controller 7 and used for controls of the circulation pump 5 and the cooling fan 62.

The controller 7 receives inputs of an operation amount signal from an accelerator operation amount sensor 82, a temperature signal from the liquid-temperature sensor 533, a current signal from the current sensor 111U, a current signal from the current sensor 111W, a pressure signal from the pressure sensor 531, and a pressure signal from the pressure sensor 532 and controls the operation of the circulation pump 5 and the cooling fan 62 according to these signals.

In addition, the controller 7 receives inputs of the signals from the temperature sensors 241-246 and controls display of the warning lamp 81 according to these signals.

Next, the specific contents of the control performed by the controller 7 will be described.

In this description, a case in which the electrical energy-mechanical energy converter system is mounted on a machine whose output is adjusted will be described. The machine whose output is adjusted refers to, for example, vehicles whose speed is controlled by adjustment of the output, and includes automobiles (not limited to general vehicles, and racing vehicles, trucks, buses, heavy industrial machines (construction machines), agricultural vehicles, special vehicles, and so forth are also included), ATVs (All Terrain Vehicles: four-wheeled buggies), trikes, motorcycles, snowmobiles, snow vehicles, and so forth. Furthermore, ships, jet skis, airplanes, trains, trolleys, and so forth are also included. In addition, as for drones, although there are those of a large type that can carry people and those of a small type that cannot carry people, they are all included as they are machines whose speed is controlled by the adjustment of the output.

First Control Method

The controller 7 receives input of an output request signal. In a case of the automobiles, the output request signal is, for example, an accelerator pedal depression amount signal. In addition, alternatively, the output request signal may be a signal for a measurement value obtained by measuring a current value to be passed to the rotating electrical machine, which is determined on the basis of the accelerator pedal depression amount signal, using a CT sensor (Current Transformer Sensor), etc. In addition, in a case of crane, etc., the output request signal is a lever signal for operating the output of a winding device, a signal for the current value to be passed to the rotating electrical machine, which is determined on the basis of the lever signal, and so forth.

The controller 7 adjusts the discharge amount of the circulation pump 5 on the basis of the output request signal that is input. Specifically, the larger the requested output is, the larger the discharge amount of the circulation pump 5 is set.

The larger the output requested by the rotating electrical machine is, the larger the value of the current flowing through the rotating electrical machine becomes, and the higher the temperature of the rotating electrical machine is expected to be. Thus, by performing the control as in this first control method, in a case when the temperature increase is expected, by increasing the discharge amount of the circulation pump 5, it is possible to improve the cooling performance and to suppress the temperature increase in the rotating electrical machine. On the other hand, in a case when the temperature increase is not expected, by reducing the discharge amount of the circulation pump 5, it is possible to avoid unnecessary energy consumption.

In addition, the controller 7 receives input of the signals from the temperature sensors 241-246, and when any one of them exceeds the allowable temperature, the warning lamp 81 is displayed. In this way, it is possible to detect an abnormality in the system at an early stage.

Second Control Method

The controller 7 adjusts the discharge amount of the circulation pump 5 on the basis of the signal from the liquid-temperature sensor 533. Specifically, the higher the temperature detected by the liquid-temperature sensor 533 is, the larger the discharge amount of the circulation pump 5 is set.

In this way, the higher the temperature of the liquid heat carrier that has flown out from the rotating electrical machine 1 is, the larger the discharge amount of the circulation pump 5 can be set, and thereby, it is possible to improve the cooling performance and to suppress the temperature increase in the rotating electrical machine 1. On the other hand, if the temperature of the liquid heat carrier is not high, by reducing the discharge amount of the circulation pump 5, it is possible to avoid unnecessary energy consumption.

Third Control Method

The controller 7 adjusts the discharge amount of the circulation pump 5 on the basis of the signal from the liquid-temperature sensor 533 and the output request signals. Specifically, as the temperature detected by the liquid-temperature sensor 533 is increased, the output of the circulation pump 5 is increased, and at the same time, the discharge amount of the circulation pump 5 is corrected on the basis of the output request signal.

In this way, the higher the temperature of the liquid heat carrier that has flown out from the rotating electrical machine 1 is, the higher the discharge amount of the circulation pump 5 can be set, and thereby, it is possible to improve the cooling performance and to suppress the temperature increase in the rotating electrical machine 1. In addition, the higher the requested output is, the larger the value of the current flowing through the rotating electrical machine becomes, and thereby, the higher the temperature of the rotating electrical machine is expected to be. Thus, by increasing the discharge amount of the circulation pump 5 in advance before the liquid temperature is actually increased, it is possible to suppress the temperature increase in the rotating electrical machine. On the other hand, if the temperature of the liquid heat carrier is not high, by reducing the discharge amount of the circulation pump 5, it is possible to avoid unnecessary energy consumption.

Fourth Control Method

The controller 7 adjusts the airflow rate of the cooling fan 62 on the basis of the input output request signal. Specifically, the higher the requested output is, the higher the airflow rate of the cooling fan 62 is set.

The higher the requested output for the rotating electrical machine is, the larger the value of the current flowing through the rotating electrical machine becomes, and thereby, the higher the temperature of the rotating electrical machine is expected to be. Thus, by performing the control as in this fourth control method, in a case when the temperature increase is expected, by increasing the airflow rate of the cooling fan 62, it is possible to improve the cooling performance and to suppress the temperature increase in the rotating electrical machine. On the other hand, in a case when the temperature increase is not expected, by reducing the airflow rate of the cooling fan 62, it is possible to avoid unnecessary energy consumption.

Fifth Control Method

The controller 7 adjusts the airflow rate of the cooling fan 62 on the basis of the signal from the liquid-temperature sensor 533. Specifically, the higher the temperature detected by the liquid-temperature sensor 533 is, the higher the airflow rate of the cooling fan 62 is set.

In this way, the higher the temperature of the liquid heat carrier that has flown out from the rotating electrical machine 1 is, the higher the airflow rate of the cooling fan 62 can be set, and thereby, it is possible to improve the cooling performance and to suppress the temperature increase in the rotating electrical machine 1. On the other hand, if the temperature of the liquid heat carrier is not high, by reducing the airflow rate of the cooling fan 62, it is possible to avoid unnecessary energy consumption.

Second Embodiment

Figure 13:
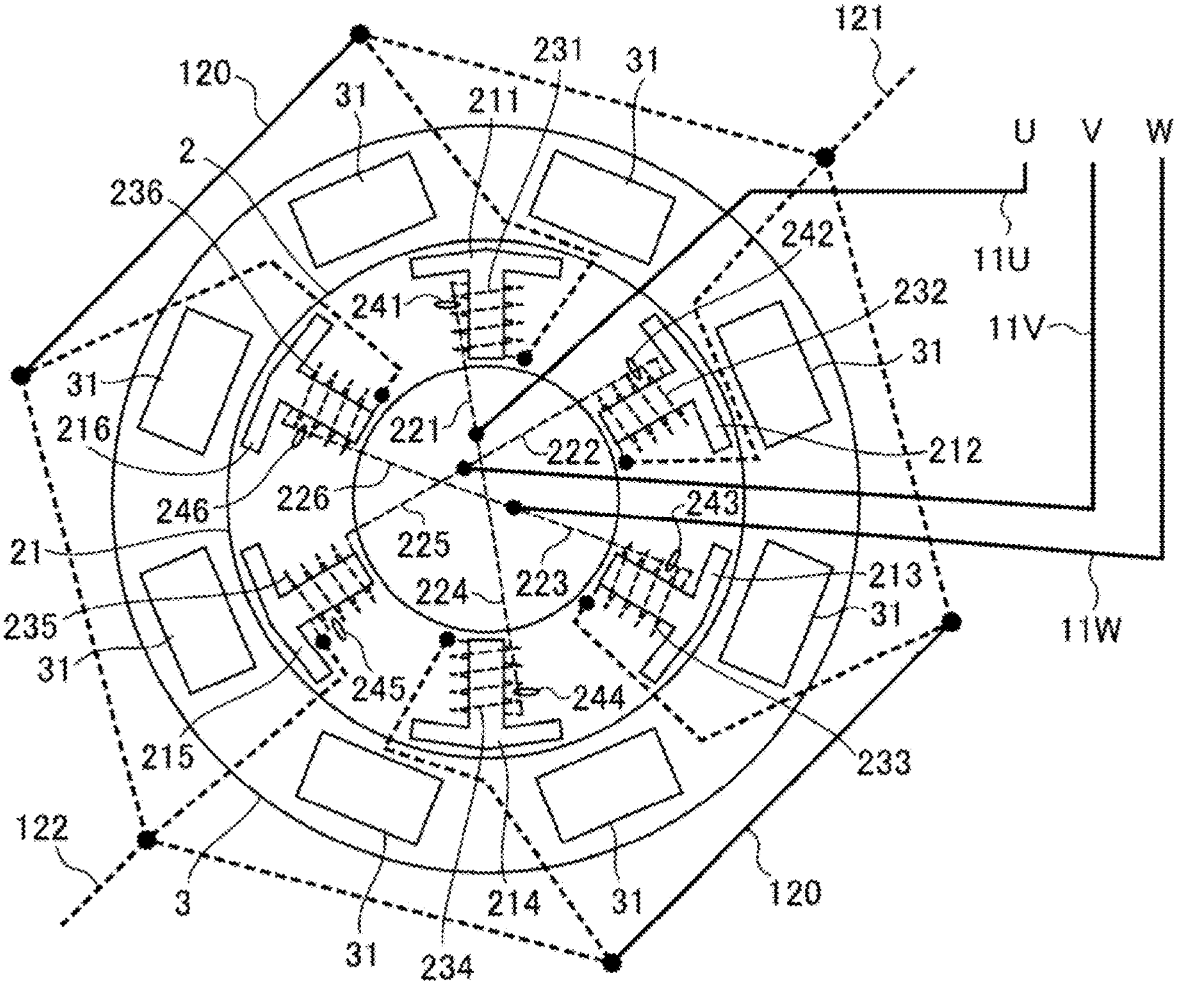
FIG. 13 is a diagram showing a second embodiment of the rotating electrical machine.

FIG. 13 is a diagram showing a second embodiment of the rotating electrical machine. In the following, components that achieve the same functions as those described above are assigned the same reference numerals, and duplicate explanations are omitted as appropriate.

The rotating electrical machine of the first embodiment is that of the inner rotor type with six slots and four poles (6N4P) in which the stator 2 including six slots is arranged on the outer circumferential side and the rotor 3 including the four permanent magnets 31 is arranged on the inner circumferential side.

The rotating electrical machine of the second embodiment shown in FIG. 13 is of the outer rotor type with six slots and eight poles (6N8P) in which the rotor 3 including eight permanent magnets 31 is arranged on the outer circumferential side and the stator 2 including six slots is arranged on the inner circumferential side.

The stator core 21 of the stator 2 is formed with six slots. Specifically, the stator core 21 is formed with the first slot 211, the second slot 212, the third slot 213, the fourth slot 214, the fifth slot 215, and the sixth slot 216. The second slot 212 is positioned next to the first slot 211. The third slot 213 is positioned next to the second slot 212. The fourth slot 214 is positioned next to the third slot 213. The fifth slot 215 is positioned next to the fourth slot 214. The sixth slot 216 is positioned next to the fifth slot 215. The first slot 211 is positioned next to the sixth slot 216.

The configuration of each slot is essentially the same as that in a first embodiment. Thus, here, the first slot 211 and the fourth slot 214 are specifically described.

The first coil 231 is formed by winding the first hollow conductor wire 221 in the first slot 211. The first hollow conductor wire 221 is formed to have the hollow shape through which the liquid heat carrier can flow. The one end (the liquid heat carrier inlet) of the first hollow conductor wire 221 is connected to the liquid heat carrier inlet pipe 121. The other end (the liquid heat carrier outlet) of the first hollow conductor wire 221 is connected to the U phase connection 110U.

The fourth coil 234 is formed by winding the fourth hollow conductor wire 224 in the fourth slot 214. The fourth hollow conductor wire 224 is formed to have the hollow shape through which the liquid heat carrier can flow. The one end (the liquid heat carrier inlet) of the fourth hollow conductor wire 224 is connected to the U phase connection 110U. The other end (the liquid heat carrier outlet) of the fourth hollow conductor wire 224 is connected to the liquid heat carrier outlet pipe 122.

As described above, the configurations of the first slot 211 and the fourth slot 214 are same as those in the first embodiment. Because other slots are also same as those in the first embodiment, a detailed description thereof will be omitted.

The liquid heat carrier inlet pipe 121 and the liquid heat carrier outlet pipe 122, which are formed to have the hollow shape through which the liquid heat carrier can flow, are electrically connected by the solid connection conductor wire 120.

Even with such a rotating electrical machine of the outer rotor type, it is possible to achieve the operational advantages same as those for the first embodiment. In other words, because the liquid heat carrier (the heat carrier) flows through the inside of the hollow conductor wire and the liquid heat carrier (the heat carrier) is cooled by the radiator 61, excellent cooling performance is achieved for the electrical energy-mechanical energy converter.

In addition, because the liquid heat carrier inlet pipe 121 and the liquid heat carrier outlet pipe 122 are electrically connected by the solid connection conductor wire 120, the connection conductor wire 120 forms the neutral point, and so, it is possible to achieve high safety performance.

Third Embodiment

Figure 14:
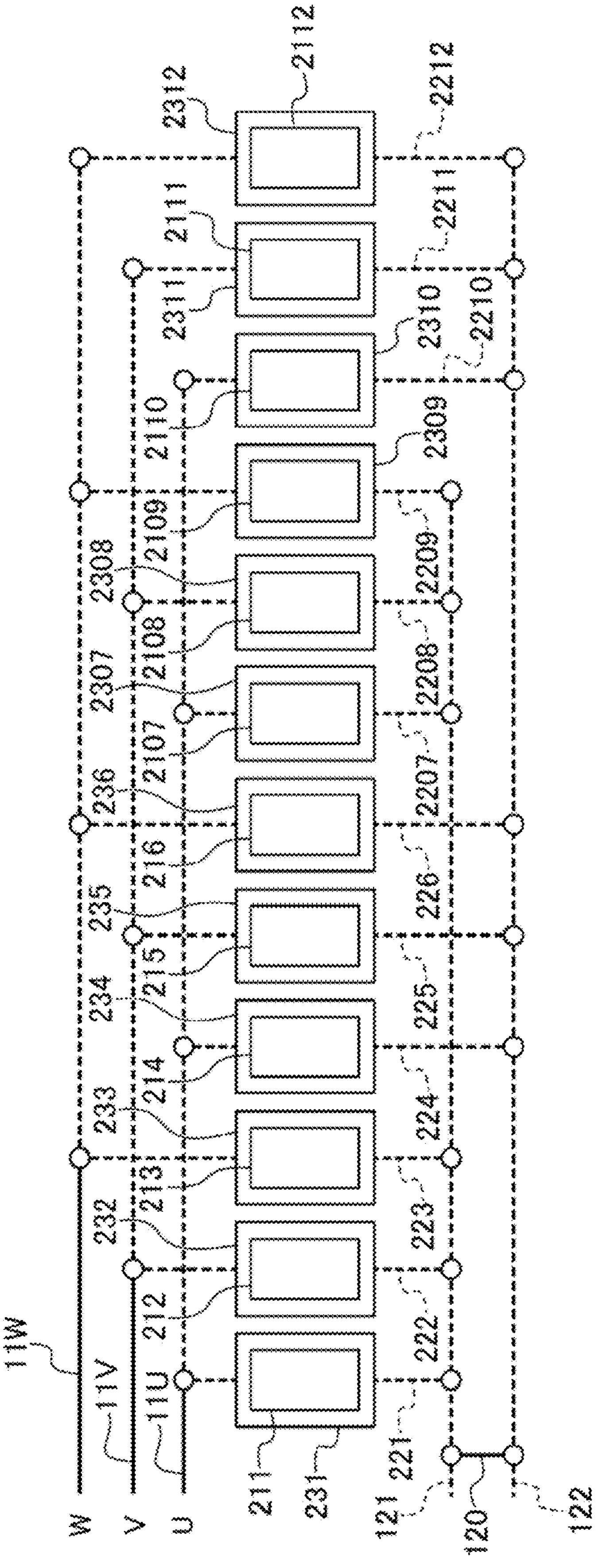
FIG. 14 is a diagram showing the simplified configuration of the coil of the rotating electrical machine of a third embodiment.
Figure 15:
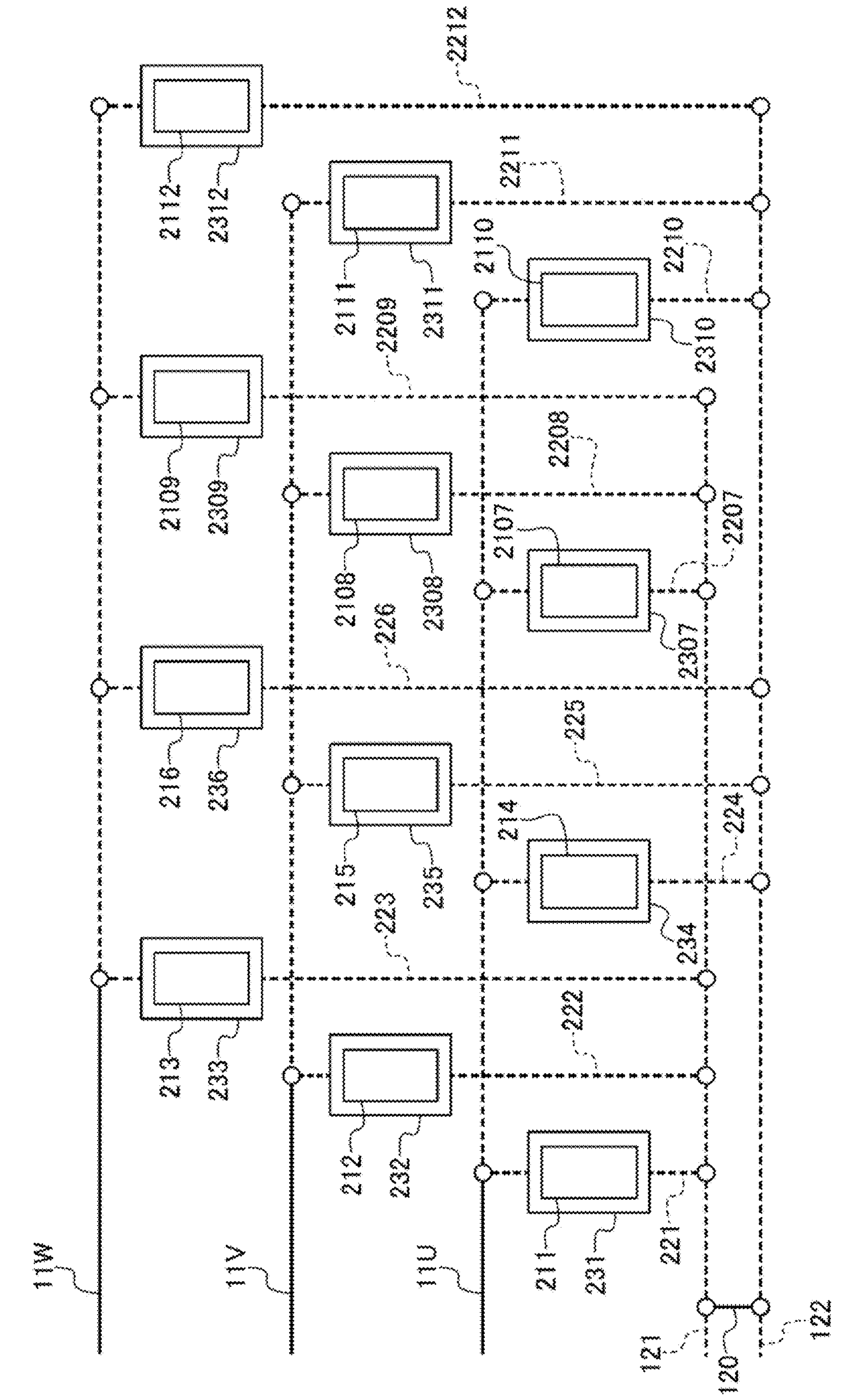
FIG. 15 is a diagram showing, for ease of understanding FIG. 14, the configuration diagram of FIG. 14 divided vertically into the U phase, the V phase, and the W phase.

FIG. 14 is a diagram showing the simplified configuration of the coil of the rotating electrical machine of a third embodiment. FIG. 15 is a diagram showing, for ease of understanding FIG. 14, the configuration diagram of FIG. 14 divided vertically into the U phase, the V phase, and the W phase.

In the first embodiment, although the rotating electrical machine is of a type in which the stator 2 including six slots is arranged, the number of slots may be higher. For example, as shown in FIG. 14, the rotating electrical machine may be of a type including twelve slots. In this case, twelve slots are: the first slot 211, the second slot 212, the third slot 213, the fourth slot 214, the fifth slot 215, the sixth slot 216, a seventh slot 2107, a eighth slot 2108, a ninth slot 2109, a tenth slot 2110, a eleventh slot 2111, and a twelfth slot 2112.

The configurations of the first slot 211, the second slot 212, the third slot 213, the fourth slot 214, the fifth slot 215, and the sixth slot 216 are essentially the same as those in the first embodiment. Thus, here, the first slot 211 and the fourth slot 214 are specifically described.

The first coil 231 is formed by winding the first hollow conductor wire 221 in the first slot 211. The first hollow conductor wire 221 is formed to have the hollow shape through which the liquid heat carrier can flow. The one end (the liquid heat carrier inlet) of the first hollow conductor wire 221 is connected to the liquid heat carrier inlet pipe 121. The other end (the liquid heat carrier outlet) of the first hollow conductor wire 221 is connected to the U phase connection 110U.

The fourth coil 234 is formed by winding the fourth hollow conductor wire 224 in the fourth slot 214. The fourth hollow conductor wire 224 is formed to have the hollow shape through which the liquid heat carrier can flow. The one end (the liquid heat carrier inlet) of the fourth hollow conductor wire 224 is connected to the U phase connection 110U. The other end (the liquid heat carrier outlet) of the fourth hollow conductor wire 224 is connected to the liquid heat carrier outlet pipe 122.

As described above, the configurations of the first slot 211 and the fourth slot 214 are essentially the same as those in the first embodiment. The configurations of other slots, specifically the second slot 212, the third slot 213, the fifth slot 215, and the sixth slot 216 are also the same as those in the first embodiment, and so, a detailed description thereof will be omitted.

In addition, the seventh slot 2107 is the same as the first slot 211. In other words, a seventh coil 2307 is formed by winding a seventh hollow conductor wire 2207 in the seventh slot 2107. The seventh hollow conductor wire 2207 is formed to have the hollow shape through which the liquid heat carrier can flow. One end (the liquid heat carrier inlet) of the seventh hollow conductor wire 2207 is connected to the liquid heat carrier inlet pipe 121. Other end (the liquid heat carrier outlet) of the seventh hollow conductor wire 2207 is connected to the U phase connection 110U.

The eighth slot 2108 is the same as the second slot 212. In other words, a eighth coil 2308 is formed by winding an eighth hollow conductor wire 2208 in the eighth slot 2108. The eighth hollow conductor wire 2208 is formed to have the hollow shape through which the liquid heat carrier can flow. One end (the liquid heat carrier inlet) of the eighth hollow conductor wire 2208 is connected to the liquid heat carrier inlet pipe 121. Other end (the liquid heat carrier outlet) of the eighth hollow conductor wire 2208 is connected to the V phase connection 110V.

The ninth slot 2109 is the same as the third slot 213. In other words, a ninth coil 2309 is formed by winding a ninth hollow conductor wire 2209 in the ninth slot 2109. The ninth hollow conductor wire 2209 is formed to have the hollow shape through which the liquid heat carrier can flow. One end (the liquid heat carrier inlet) of the ninth hollow conductor wire 2209 is connected to the liquid heat carrier inlet pipe 121. Other end (the liquid heat carrier outlet) of the ninth hollow conductor wire 2209 is connected to the W phase connection 110W.

The tenth slot 2110 is the same as the fourth slot 214. In other words, a tenth coil 2310 is formed by winding a tenth hollow conductor wire 2210 in the tenth slot 2110. The tenth hollow conductor wire 2210 is formed to have the hollow shape through which the liquid heat carrier can flow. One end (the liquid heat carrier inlet) of the tenth hollow conductor wire 2210 is connected to the U phase connection 110U. Other end (the liquid heat carrier outlet) of the tenth hollow conductor wire 2210 is connected to the liquid heat carrier outlet pipe 122.

The eleventh slot 2111 is the same as the fifth slot 215. In other words, a eleventh coil 2311 is formed by winding an eleventh hollow conductor wire 2211 in the eleventh slot 2111. The eleventh hollow conductor wire 2211 is formed to have the hollow shape through which the liquid heat carrier can flow. One end (the liquid heat carrier inlet) of the eleventh hollow conductor wire 2211 is connected to the V phase connection 110V. Other end (the liquid heat carrier outlet) of the eleventh hollow conductor wire 2211 is connected to the liquid heat carrier outlet pipe 122.

The twelfth slot 2112 is the same as the sixth slot 216. In other words, a twelfth coil 2312 is formed by winding a twelfth hollow conductor wire 2212 in the twelfth slot 2112. The twelfth hollow conductor wire 2212 is formed to have the hollow shape through which the liquid heat carrier can flow. One end (the liquid heat carrier inlet) of the twelfth hollow conductor wire 2212 is connected to the W phase connection 110W. Other end (the liquid heat carrier outlet) of the twelfth hollow conductor wire 2212 is connected to the liquid heat carrier outlet pipe 122.

As apparent from the comparison between FIG. 15 and FIG. 5, in the configuration shown in FIG. 15, two pairs of the configuration shown in FIG. 5 are essentially prepared and connected in parallel.

Figure 16A:
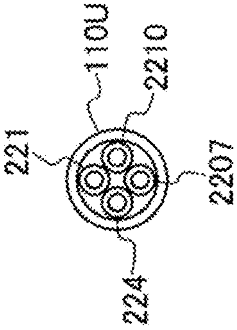
FIG. 16A is a planar cross-sectional view of the U phase connection 110U for explaining the U phase connection.
Figure 16B:
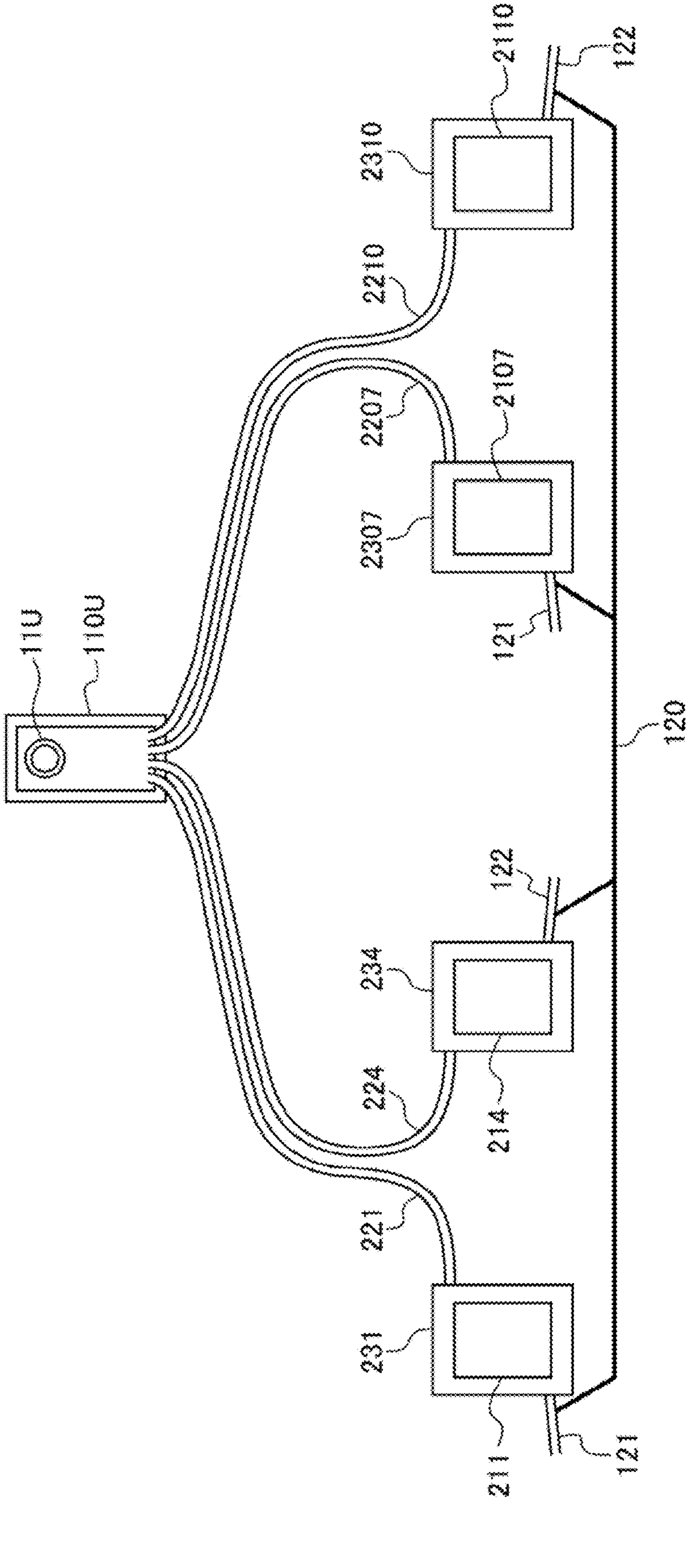
FIG. 16B is a simplified diagram of the vicinity of the U phase connection.

FIGS. 16A and 16B are each a diagram for explaining the U phase connection. Here, FIG. 16A is a planar cross-sectional view of the U phase connection 110U, and FIG. 16B is a diagram for explaining the vicinity of the U phase connection in a simplified manner.

As described above, the other end (the liquid heat carrier outlet) of the first hollow conductor wire 221 of the first coil 231 is connected to the U phase connection 110U. In addition, the one end (the liquid heat carrier inlet) of the fourth hollow conductor wire 224 of the fourth coil 234 is also connected to the U phase connection 110U. Furthermore, the other end (the liquid heat carrier outlet) of the seventh hollow conductor wire 2207 of the seventh coil 2307 is also connected to the U phase connection 110U. Furthermore, the one end (the liquid heat carrier inlet) of the tenth hollow conductor wire 2210 of the tenth coil 2310 is also connected to the U phase connection 110U.

In FIG. 16B, although two liquid heat carrier inlet pipes 121 and two liquid heat carrier outlet pipes 122 are shown in order to avoid complexity in the drawings, in reality, there is only one of each.

The U phase connection 110U is formed to have the tubular shape and has the liquid-tight structure in which the liquid heat carrier that has flown through the first hollow conductor wire 221 or the seventh hollow conductor wire 2207 flows into the fourth hollow conductor wire 224 or the tenth hollow conductor wire 2210 without causing the leakage. The U phase line 11U is connected to this U phase connection 110U. The electrical distance from the U phase connection 110U to the first coil 231, the electrical distance from the U phase connection 110U to the fourth coil 234, the electrical distance from the U phase connection 110U to the seventh coil 2307, and the electrical distance from the U phase connection 110U to the tenth coil 2310 are set to be equal or substantially equal.

Although FIGS. 16A and 16B illustrate the U phase connection, because the V phase connection 110V and the W phase connection 110W have the same configurations, the description thereof will be omitted.

As apparent from the comparison between FIG. 16B and FIG. 3B, in the configuration shown in FIG. 16B, two pairs of the configuration shown in FIG. 3B are essentially prepared and connected in parallel.

Figure 17B:
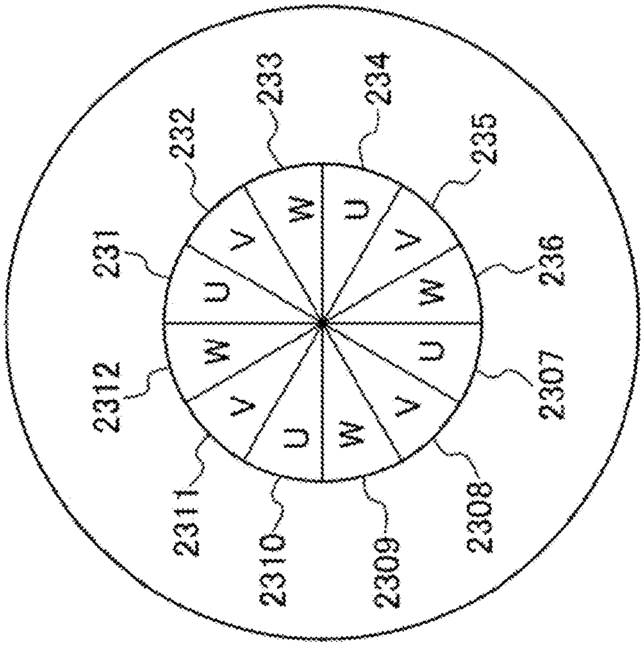
FIG. 17B is a diagram showing an example of the arrangement of each coil in the rotating electrical machine of an outer rotor type with twelve slots and eight poles (12N8P).
Figure 17A:
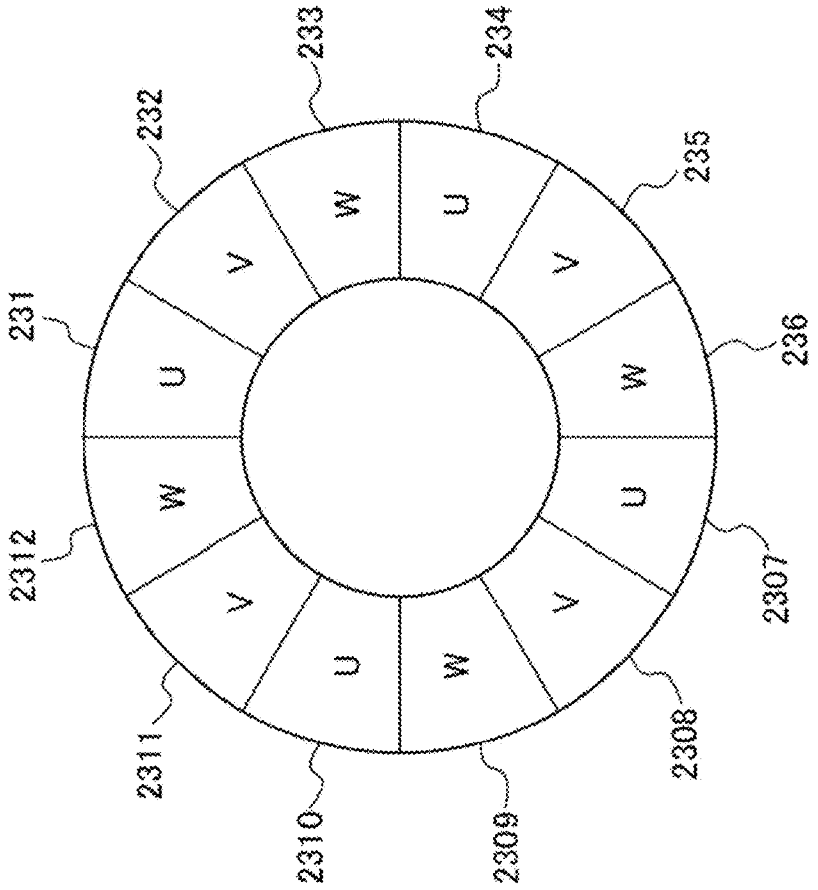
FIG. 17A is a diagram showing an example of the arrangement of each coil in the rotating electrical machine of an inner rotor type with twelve slots and eight poles (12N8P)

FIGS. 17A and 17B are each a diagram showing an example of the arrangement of each coil.

Although the respective coils are shown exploded and arranged in a single row in FIG. 14 in order to show the simplified configuration, for the rotating electrical machine of the inner rotor type with twelve slots and eight poles (12N8P), the respective coils are arranged in the order as shown in FIG. 17A. In other words, the second coil 232, which is the V phase coil, is positioned next to the first coil 231, which is the U phase coil, in the clockwise direction. The third coil 233, which is the W phase coil, is positioned next to the second coil 232. The fourth coil 234, which is the U phase coil, is positioned next to the third coil 233. The fifth coil 235, which is the V phase coil, is positioned next to the fourth coil 234. The sixth coil 236, which is the W phase coil, is positioned next to the fifth coil 235. The seventh coil 2307, which is the U phase coil, is positioned next to the sixth coil 236. The eighth coil 2308, which is the V phase coil, is positioned next to the seventh coil 2307. The ninth coil 2309, which is the W phase coil, is positioned next to the eighth coil 2308. The tenth coil 2310, which is the U phase coil, is positioned next to the ninth coil 2309. The eleventh coil 2311, which is the V phase coil, is positioned next to the tenth coil 2310. The twelfth coil 2312, which is the W phase coil, is positioned next to the eleventh coil 2311.

In addition, even for the rotating electrical machine of the outer rotor type with twelve slots and eight poles (12N8P), as shown in FIG. 17B, the respective slots are arranged in the same order as shown in FIG. 17A.

Figure 18B:
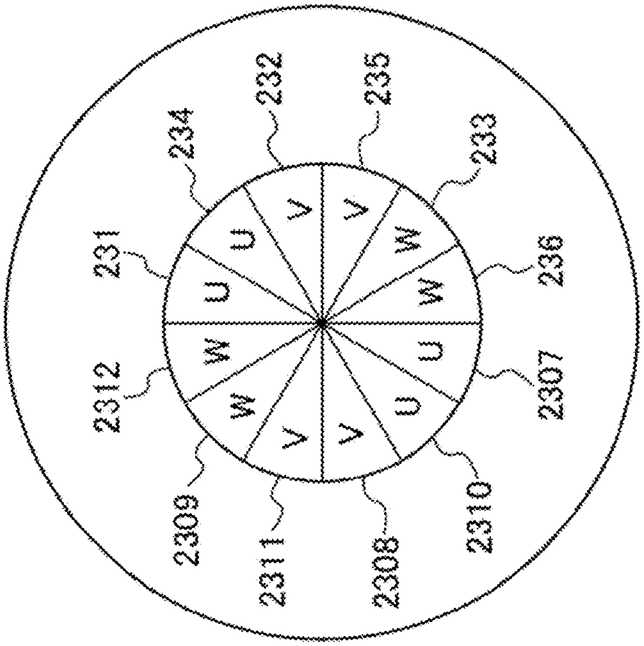
FIG. 18B is a diagram showing another example of the arrangement of each coil in the rotating electrical machine of the outer rotor type with twelve slots and fourteen poles (12N14P).
Figure 18A:
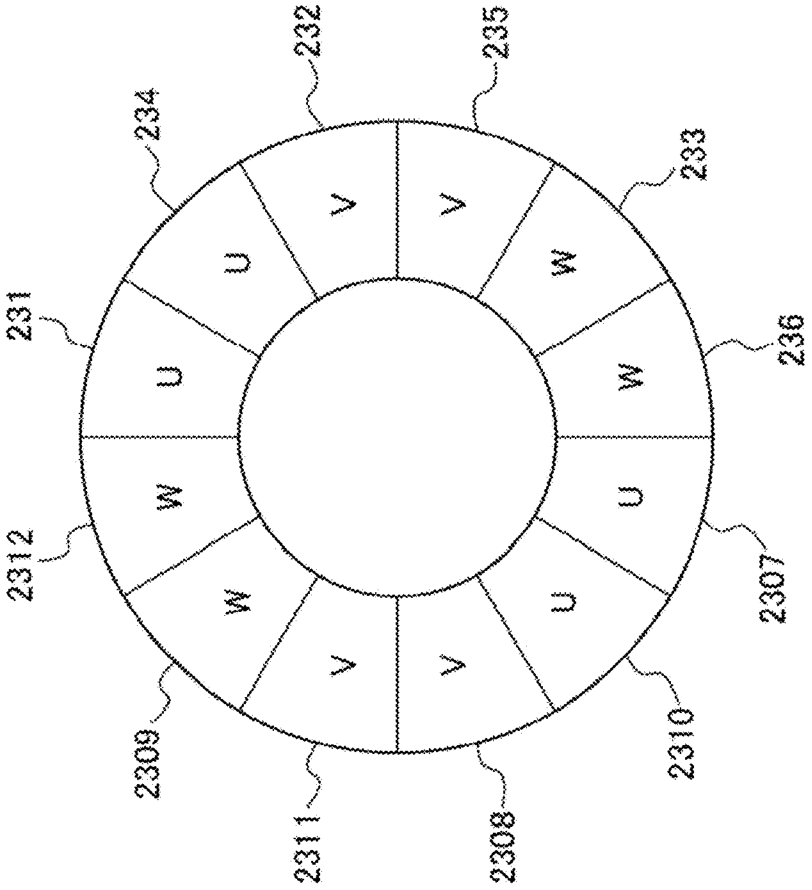
FIG. 18A is a diagram showing another example of the arrangement of each coil in the rotating electrical machine of the inner rotor type with twelve slots and fourteen poles (12N14P)

FIGS. 18A and 18B are each a diagram showing another example of the arrangement of the respective coils.

For the rotating electrical machine of the inner rotor type with twelve slots and fourteen poles (12N14P), the respective coils are arranged in the same order as shown in FIG. 18A. In other words, the fourth coil 234, which is the U phase coil, is positioned next to the first coil 231, which is the U phase coil, in the clockwise direction. The second coil 232, which is the V phase coil, is positioned next to the fourth coil 234. The fifth coil 235, which is the V phase coil, is positioned next to the second coil 232. The third coil 233, which is the W phase coil, is positioned next to the fifth coil 235. The sixth coil 236, which is the W phase coil, is positioned next to the third coil 233. The seventh coil 2307, which is the U phase coil, is positioned next to the sixth coil 236. The tenth coil 2310, which is the U phase coil, is positioned next to the seventh coil 2307. The eighth coil 2308, which is the V phase coil, is positioned next to the tenth coil 2310. The eleventh coil 2311, which is the V phase coil, is positioned next to the eighth coil 2308. The ninth coil 2309, which is the W phase coil, is positioned next to the eleventh coil 2311. The twelfth coil 2312, which is the W phase coil, is positioned next to the ninth coil 2309.

In addition, even for the rotating electrical machine of the outer rotor type with twelve slots and fourteen poles (12N14P), as shown in FIG. 18B, the respective coils are arranged in the same order as shown in FIG. 18A.

Figure 19:
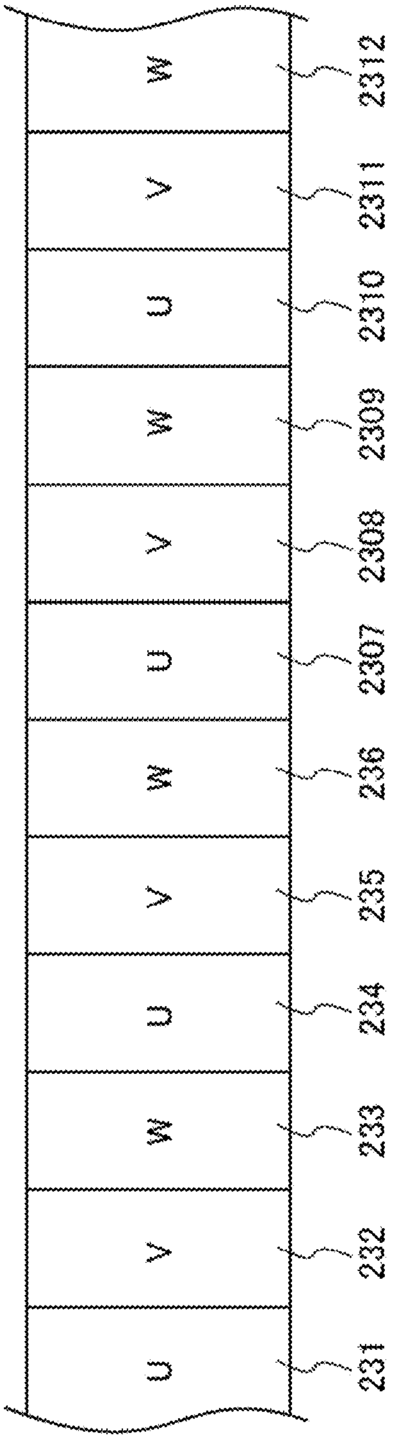
FIG. 19 is a diagram showing yet another example of the arrangement of each coil.

FIG. 19 is a diagram showing yet another example of the arrangement of each coil.

In a case in which the electrical energy-mechanical energy converter is a linear motor, the respective coils are arranged in the same order as shown in FIG. 19. In other words, the second coil 232, which is the V phase coil, is positioned next to the first coil 231, which is the U phase coil. The third coil 233, which is the W phase coil, is positioned next to the second coil 232. The fourth coil 234, which is the U phase coil, is positioned next to the third coil 233. The fifth coil 235, which is the V phase coil, is positioned next to the fourth coil 234. The sixth coil 236, which is the W phase coil, is positioned next to the fifth coil 235. The seventh coil 2307, which is the U phase coil, is positioned next to the sixth coil 236. The eighth coil 2308, which is the V phase coil, is positioned next to the seventh coil 2307. The ninth coil 2309, which is the W phase coil, is positioned next to the eighth coil 2308. The tenth coil 2310, which is the U phase coil, is positioned next to the ninth coil 2309. The eleventh coil 2311, which is the V phase coil, is positioned next to the tenth coil 2310. The twelfth coil 2312, which is the W phase coil, is positioned next to the eleventh coil 2311.

Figure 20:
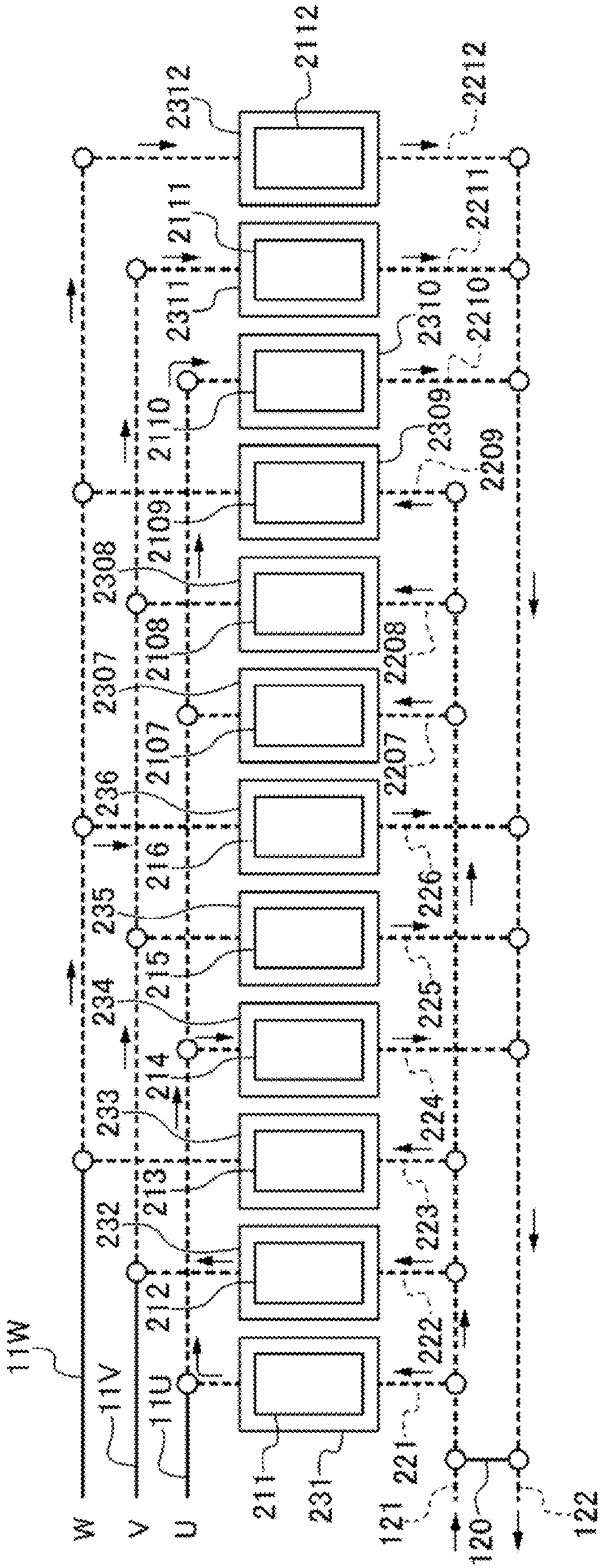
FIG. 20 is a diagram for explaining the flow of the liquid heat carrier in FIG. 14.

FIG. 20 is a diagram for explaining the flow of the liquid heat carrier in FIG. 14. Here, the arrows indicate the flow direction of the liquid heat carrier.

The flow of the liquid heat carrier that has flown through the liquid heat carrier inlet pipe 121 is divided, and the first flow flows through the first hollow conductor wire 221 of the first coil 231, and flows into the liquid heat carrier outlet pipe 122 via the fourth hollow conductor wire 224 of the fourth coil 234 or the tenth hollow conductor wire 2210 of the tenth coil 2310. In addition, another flow flows through the seventh hollow conductor wire 2207 of the seventh coil 2307, and flows into the liquid heat carrier outlet pipe 122 via the tenth hollow conductor wire 2210 of the tenth coil 2310 or the fourth hollow conductor wire 224 of the fourth coil 234.

In addition, another flow flows through the second hollow conductor wire 222 of the second coil 232, and flows into the liquid heat carrier outlet pipe 122 via the fifth hollow conductor wire 225 of the fifth coil 235 or the eleventh hollow conductor wire 2211 of the eleventh coil 2311. In addition, another flow flows through the eighth hollow conductor wire 2208 of the eighth coil 2308, and flows into the liquid heat carrier outlet pipe 122 via the eleventh hollow conductor wire 2211 of the eleventh coil 2311 or the fifth hollow conductor wire 225 of the fifth coil 235.

Furthermore, another flow flows through the third hollow conductor wire 223 of the third coil 233, and flows into the liquid heat carrier outlet pipe 122 via the sixth hollow conductor wire 226 of the sixth coil 236 or the twelfth hollow conductor wire 2212 of the twelfth coil 2312. In addition, another flow flows through the ninth hollow conductor wire 2209 of the ninth coil 2309, and flows into the liquid heat carrier outlet pipe 122 via the twelfth hollow conductor wire 2212 of the twelfth coil 2312 or the sixth hollow conductor wire 226 of the sixth coil 236.

Figure 21:
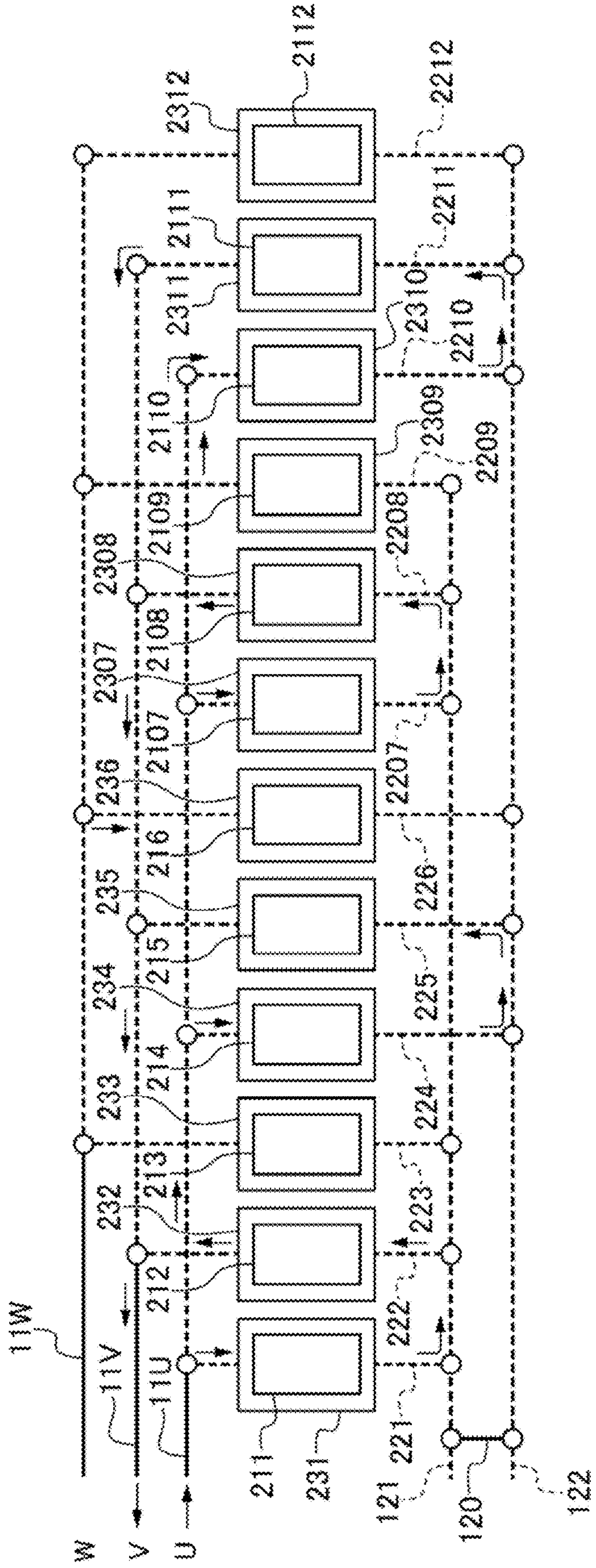
FIG. 21 is a diagram for explaining how the current flows from the U phase line 11U to the V phase line 11V with reference to the exploded diagram shown in FIG. 14.

FIG. 21 is a diagram for explaining how the current flows from the U phase line 11U to the V phase line 11V with reference to the exploded diagram shown in FIG. 14. Here, the arrows indicate the flow direction of the current.

As one stream, the current that has been input from the U phase line 11U flows through the first hollow conductor wire 221, passes through the liquid heat carrier inlet pipe 121, flows through the second hollow conductor wire 222, and reaches the V phase line 11V. In addition, another stream of the current that has been input from the U phase line 11U flows through the fourth hollow conductor wire 224, passes through the liquid heat carrier outlet pipe 122, flows through the fifth hollow conductor wire 225, and reaches the V phase line 11V. Furthermore, another flow of the current that has been input from the U phase line 11U flows through the seventh hollow conductor wire 2207, passes through the liquid heat carrier outlet pipe 122, flows through the eighth hollow conductor wire 2208, and reaches the V phase line 11V. Furthermore, yet another flow of the current that has been input from the U phase line 11U flows through the tenth hollow conductor wire 2210, passes through the liquid heat carrier outlet pipe 122, flows through the eleventh hollow conductor wire 2211, and reaches the V phase line 11V.

As described above, even with the rotating electrical machine of the 12-slot type, it is possible to achieve the same operational advantages as the 6-slot type of the first embodiment. In other words, because the liquid heat carrier (the heat carrier) flows through the inside of the hollow conductor wire and the liquid heat carrier (the heat carrier) is cooled by the radiator 61, excellent cooling performance is achieved for the electrical energy-mechanical energy converter.

In addition, because the liquid heat carrier inlet pipe 121 and the liquid heat carrier outlet pipe 122 are electrically connected by the solid connection conductor wire 120, the connection conductor wire 120 forms the neutral point, and so, it is possible to achieve high safety performance.

In addition, as apparent from the comparison between FIG. 5 (6-slot type) and FIG. 15 (12-slot type), when the number of slots is to be increased, it suffices to connect the required number of sets of the configuration shown in FIG. 5 in parallel. For example, if a 18-slot type is required, it suffices to connect three sets of the configuration shown in FIG. 5 in parallel. If a 24-slot type is required, it suffices to connect four sets of the configuration shown in FIG. 5 in parallel.

Figures 22A, 22B:
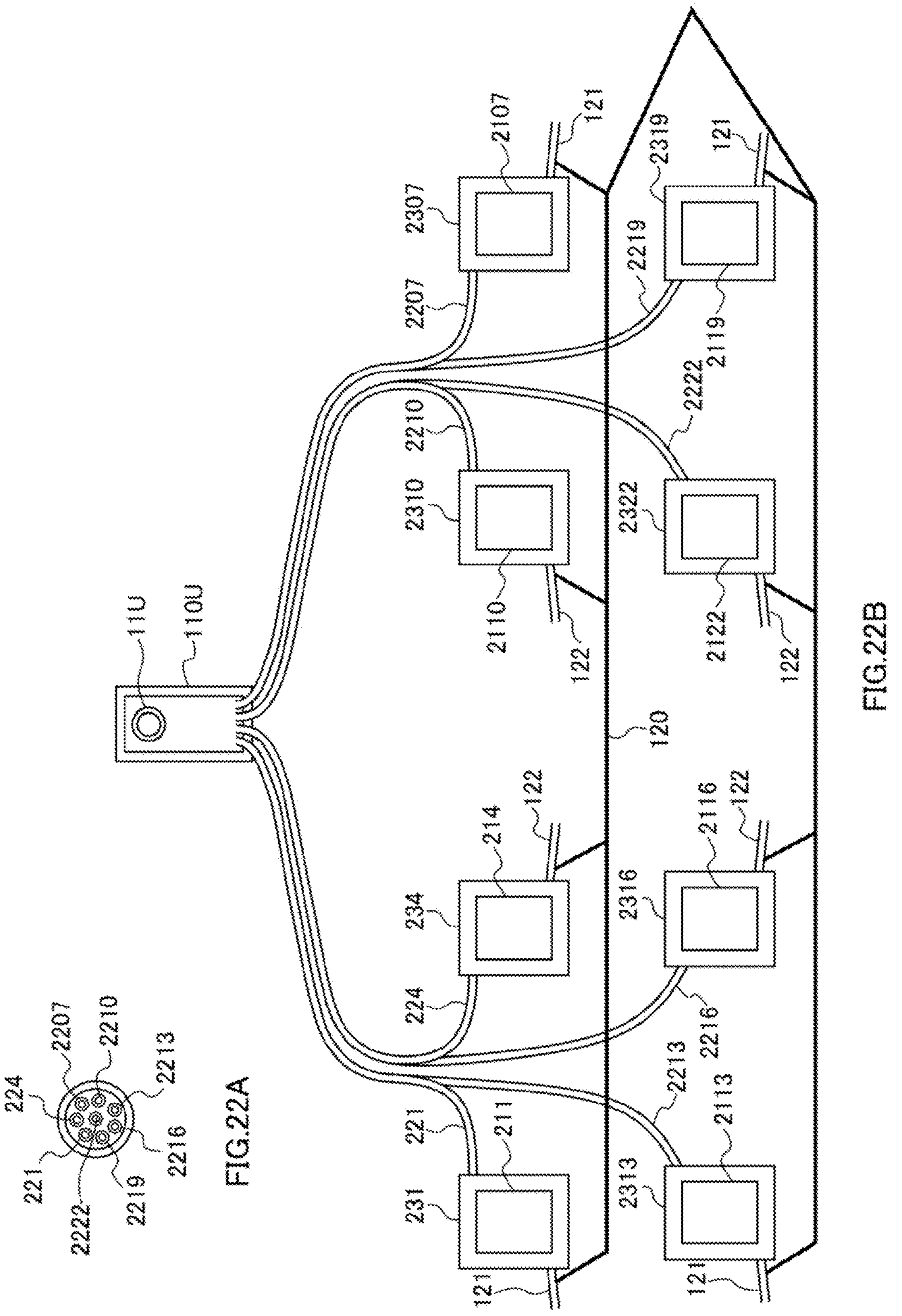
FIG. 22A is a planar cross-sectional view of the U phase connection 110U for explaining the U phase connection.
FIG. 22B is a simplified diagram of the vicinity of the U phase connection.

Then, as shown in FIG. 22B, it suffices to connect the hollow conductor wires of the respective phases to the connections of the respective phases and to connect electric wires of the respective phases to the connections thereof. In FIG. 22B, the first hollow conductor wire 221 of the first coil 231, the fourth hollow conductor wire 224 of the fourth coil 234, the seventh hollow conductor wire 2207 of the seventh coil 2307, the tenth hollow conductor wire 2210 of the tenth coil 2310, a thirteenth hollow conductor wire 2213 of a thirteenth coil 2313, a sixteenth hollow conductor wire 2216 of a sixteenth coil 2316, a nineteenth hollow conductor wire 2219 of a nineteenth coil 2319, and a twenty-second hollow conductor wire 2222 of a twenty-second coil 2322 are connected to the U phase connection 110U, and the U phase line 11U is connected to the U phase connection 110U.

In addition, in FIG. 22B, although four liquid heat carrier inlet pipes 121 and four liquid heat carrier outlet pipes 122 are shown in order to avoid complexity in the drawings, in reality, there is only one of each.

As described above, when the number of slots is to be increased, it suffices to connect the required number of sets of the configuration shown in FIG. 5 in parallel.

Fourth Embodiment

Figure 23:
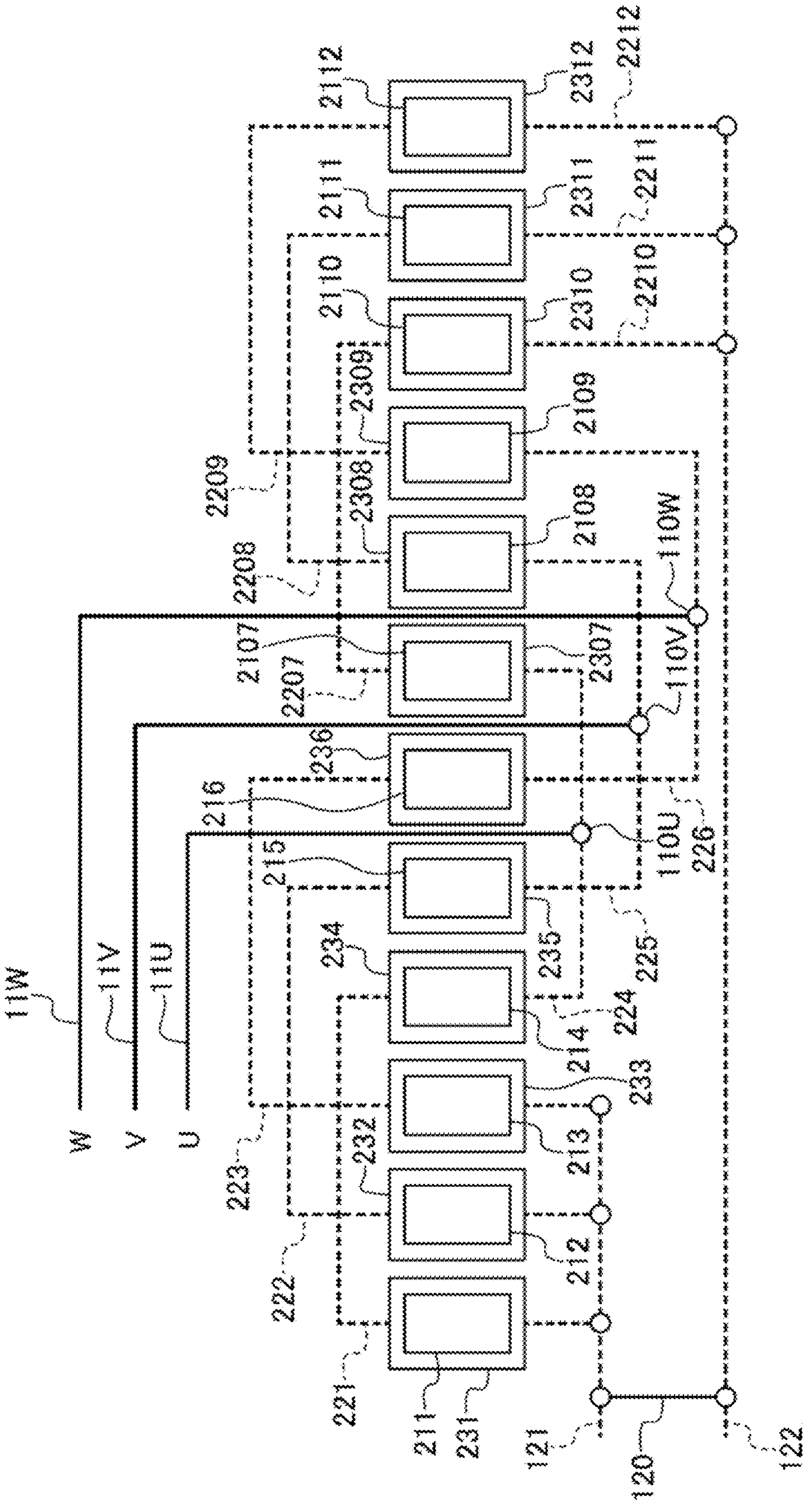
FIG. 23 is a diagram showing the simplified configuration of the coil of the rotating electrical machine of a fourth embodiment.
Figure 24:
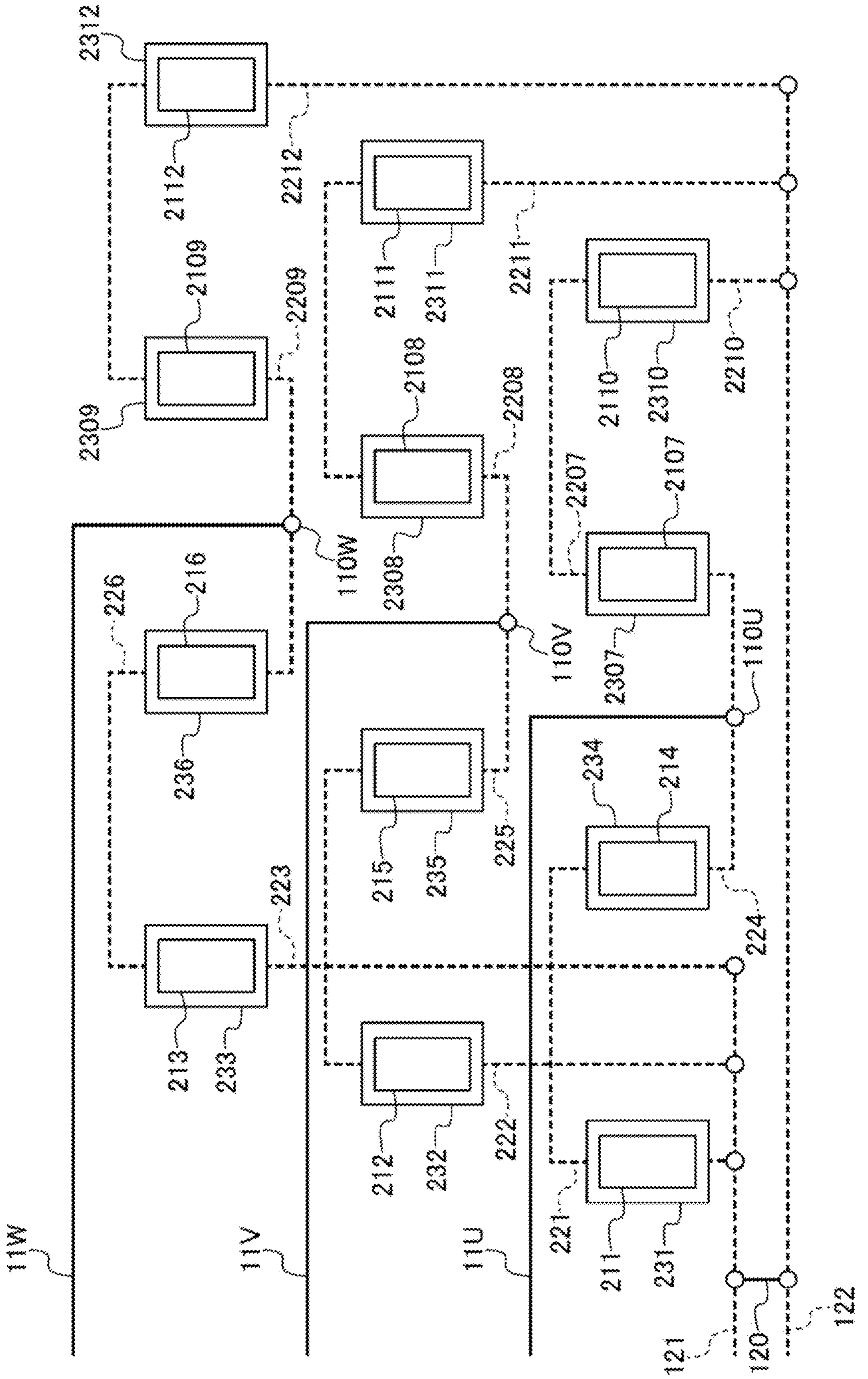
FIG. 24 is a diagram showing, for ease of understanding FIG. 23, the configuration diagram of FIG. 23 divided vertically into the U phase, the V phase, and the W phase.

FIG. 23 is a diagram showing the simplified configuration of the coil of the rotating electrical machine of a fourth embodiment. FIG. 24 is a diagram showing, for ease of understanding FIG. 23, the configuration diagram of FIG. 23 divided vertically into the U phase, the V phase, and the W phase.

In the third embodiment (12-slot type), by connecting a plurality of sets of the configuration of the first embodiment (6-slot type) in parallel, the number of slots is increased. In this embodiment, the number of slots is increased by connection different from the above.

The U phase will be described first.

The first coil 231 is formed by winding the first hollow conductor wire 221 in the first slot 211. The first hollow conductor wire 221 is formed to have the hollow shape through which the liquid heat carrier can flow. The one end (the liquid heat carrier inlet) of the first hollow conductor wire 221 is connected to the liquid heat carrier inlet pipe 121. The liquid heat carrier inlet pipe 121 is branched into three paths on the downstream side in the liquid heat carrier flow direction, and the one end (the liquid heat carrier inlet) of the first hollow conductor wire 221 is connected to one of them. The other end (the liquid heat carrier outlet) of the first hollow conductor wire 221 communicates with the one end (the liquid heat carrier inlet) of the fourth hollow conductor wire 224 that is wound in the fourth slot 214.

The fourth coil 234 is formed by winding the fourth hollow conductor wire 224 in the fourth slot 214. The fourth hollow conductor wire 224 is formed to have the hollow shape through which the liquid heat carrier can flow. The one end (the liquid heat carrier inlet) of the fourth hollow conductor wire 224 communicates with the other end (the liquid heat carrier outlet) of the first hollow conductor wire 221. The other end (the liquid heat carrier outlet) of the fourth hollow conductor wire 224 is connected to the U phase connection 110U, as described below. The fourth hollow conductor wire 224 is the same as the first hollow conductor wire 221, and it is formed as the fourth hollow conductor wire 224 by also winding the first hollow conductor wire 221 in the fourth slot 214. In addition, the fourth hollow conductor wire 224 may be formed of the hollow conductor wire different from the first hollow conductor wire 221 so as to be continuous with the first hollow conductor wire 221.

In the seventh slot 2107, the seventh coil 2307 is formed by winding the seventh hollow conductor wire 2207. The seventh hollow conductor wire 2207 is formed to have the hollow shape through which the liquid heat carrier can flow. As described below, the one end (the liquid heat carrier inlet) of the seventh hollow conductor wire 2207 is connected to the U phase connection 110U. The other end (the liquid heat carrier outlet) of the seventh hollow conductor wire 2207 communicates with the one end (the liquid heat carrier inlet) of the tenth hollow conductor wire 2210 that is wound in the tenth slot 2110.

In the tenth slot 2110, the tenth coil 2310 is formed by winding the tenth hollow conductor wire 2210. The tenth hollow conductor wire 2210 is formed to have the hollow shape through which the liquid heat carrier can flow. The one end (the liquid heat carrier inlet) of the tenth hollow conductor wire 2210 communicates with the other end (the liquid heat carrier outlet) of the seventh hollow conductor wire 2207. The other end (the liquid heat carrier outlet) of the tenth hollow conductor wire 2210 communicates with the liquid heat carrier outlet pipe 122. The liquid heat carrier outlet pipe 122 is branched into three paths on the upstream side in the liquid heat carrier flow direction, and the other end (the liquid heat carrier outlet) of the tenth hollow conductor wire 2210 is connected to one of them. The tenth hollow conductor wire 2210 is the same as the seventh hollow conductor wire 2207, and it is formed as the tenth hollow conductor wire 2210 by also winding the seventh hollow conductor wire 2207 in the tenth slot 2110. In addition, the tenth hollow conductor wire 2210 may be formed of the hollow conductor wire different from the seventh hollow conductor wire 2207 so as to be continuous with the seventh hollow conductor wire 2207.

The U phase line 11U is connected to the U phase connection 110U.

The same applies to the V phase.

In other words, the second coil 232 is formed by winding the second hollow conductor wire 222 in the second slot 212. The second hollow conductor wire 222 is formed to have the hollow shape through which the liquid heat carrier can flow. The one end (the liquid heat carrier inlet) of the second hollow conductor wire 222 is connected to the liquid heat carrier inlet pipe 121. The other end (the liquid heat carrier outlet) of the second hollow conductor wire 222 communicates with the one end (the liquid heat carrier inlet) of the fifth hollow conductor wire 225 that is wound in the fifth slot 215.

The fifth coil 235 is formed by winding the fifth hollow conductor wire 225 in the fifth slot 215. The fifth hollow conductor wire 225 is formed to have the hollow shape through which the liquid heat carrier can flow. The one end (the liquid heat carrier inlet) of the fifth hollow conductor wire 225 communicates with the other end (the liquid heat carrier outlet) of the second hollow conductor wire 222. The other end (the liquid heat carrier outlet) of the fifth hollow conductor wire 225 is connected to the V phase connection 110V. The fifth hollow conductor wire 225 is the same as the second hollow conductor wire 222, and it is formed as the fifth hollow conductor wire 225 by also winding the second hollow conductor wire 222 in the fifth slot 215. In addition, the fifth hollow conductor wire 225 may be formed of the hollow conductor wire different from the second hollow conductor wire 222 so as to be continuous with the second hollow conductor wire 222.

In the eighth slot 2108, the eighth coil 2308 is formed by winding the eighth hollow conductor wire 2208. The eighth hollow conductor wire 2208 is formed to have the hollow shape through which the liquid heat carrier can flow. The one end (the liquid heat carrier inlet) of the eighth hollow conductor wire 2208 is connected to the V phase connection 110V. The other end (the liquid heat carrier outlet) of the eighth hollow conductor wire 2208 communicates with the one end (the liquid heat carrier inlet) of the eleventh hollow conductor wire 2211 that is wound in the eleventh slot 2111.

In the eleventh slot 2111, the eleventh coil 2311 is formed by winding the eleventh hollow conductor wire 2211. The eleventh hollow conductor wire 2211 is formed to have the hollow shape through which the liquid heat carrier can flow. The one end (the liquid heat carrier inlet) of the eleventh hollow conductor wire 2211 communicates with the other end (the liquid heat carrier outlet) of the eighth hollow conductor wire 2208. The other end (the liquid heat carrier outlet) of the eleventh hollow conductor wire 2211 is connected to the liquid heat carrier outlet pipe 122. The eleventh hollow conductor wire 2211 is the same as the eighth hollow conductor wire 2208, and it is formed as the eleventh hollow conductor wire 2211 by also winding the eighth hollow conductor wire 2208 in the eleventh slot 2111. In addition, the eleventh hollow conductor wire 2211 may be formed of the hollow conductor wire different from the eighth hollow conductor wire 2208 so as to be continuous with the eighth hollow conductor wire 2208.

The V phase line 11V is connected to the V phase connection 110V.

The same applies to the W phase.

In other words, the third coil 233 is formed by winding the third hollow conductor wire 223 in the third slot 213. The third hollow conductor wire 223 is formed to have the hollow shape through which the liquid heat carrier can flow. The one end (the liquid heat carrier inlet) of the third hollow conductor wire 223 is connected to the liquid heat carrier inlet pipe 121. The other end (the liquid heat carrier outlet) of the third hollow conductor wire 223 communicates with the one end (the liquid heat carrier inlet) of the sixth hollow conductor wire 226 that is wound in the sixth slot 216.

The sixth coil 236 is formed by winding the sixth hollow conductor wire 226 in the sixth slot 216. The sixth hollow conductor wire 226 is formed to have the hollow shape through which the liquid heat carrier can flow. The one end (the liquid heat carrier inlet) of the sixth hollow conductor wire 226 communicates with the other end (the liquid heat carrier outlet) of the third hollow conductor wire 223. The other end (the liquid heat carrier outlet) of the sixth hollow conductor wire 226 is connected to the W phase connection 110W. The sixth hollow conductor wire 226 is the same as the third hollow conductor wire 223, and it is formed as the sixth hollow conductor wire 226 by also winding the third hollow conductor wire 223 in the sixth slot 216. In addition, the sixth hollow conductor wire 226 may be formed of the hollow conductor wire different from the third hollow conductor wire 223 so as to be continuous with the third hollow conductor wire 223.

In the ninth slot 2109, the ninth coil 2309 is formed by winding the ninth hollow conductor wire 2209. The ninth hollow conductor wire 2209 is formed to have the hollow shape through which the liquid heat carrier can flow. The one end (the liquid heat carrier inlet) of the ninth hollow conductor wire 2209 is connected to the W phase connection 110W. The other end (the liquid heat carrier outlet) of the ninth hollow conductor wire 2209 communicates with the one end (the liquid heat carrier inlet) of the twelfth hollow conductor wire 2212 that is wound in the twelfth slot 2112.

In the twelfth slot 2112, the twelfth coil 2312 is formed by winding the twelfth hollow conductor wire 2212. The twelfth hollow conductor wire 2212 is formed to have the hollow shape through which the liquid heat carrier can flow. The one end (the liquid heat carrier inlet) of the twelfth hollow conductor wire 2212 communicates with the other end (the liquid heat carrier outlet) of the ninth hollow conductor wire 2209. The other end (the liquid heat carrier outlet) of the twelfth hollow conductor wire 2212 is connected to the liquid heat carrier outlet pipe 122. The twelfth hollow conductor wire 2212 is the same as the ninth hollow conductor wire 2209, and it is formed as the twelfth hollow conductor wire 2212 by also winding the ninth hollow conductor wire 2209 in the twelfth slot 2112. In addition, the twelfth hollow conductor wire 2212 may be formed of the hollow conductor wire different from the ninth hollow conductor wire 2209 so as to be continuous with the ninth hollow conductor wire 2209.

The W phase line 11W is connected to the W phase connection 110W.

Figure 25A:
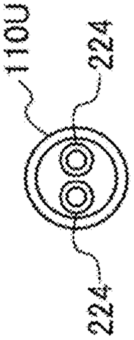
FIG. 25A is a planar cross-sectional view of the U phase connection 110U for explaining the U phase connection.
Figure 25B:
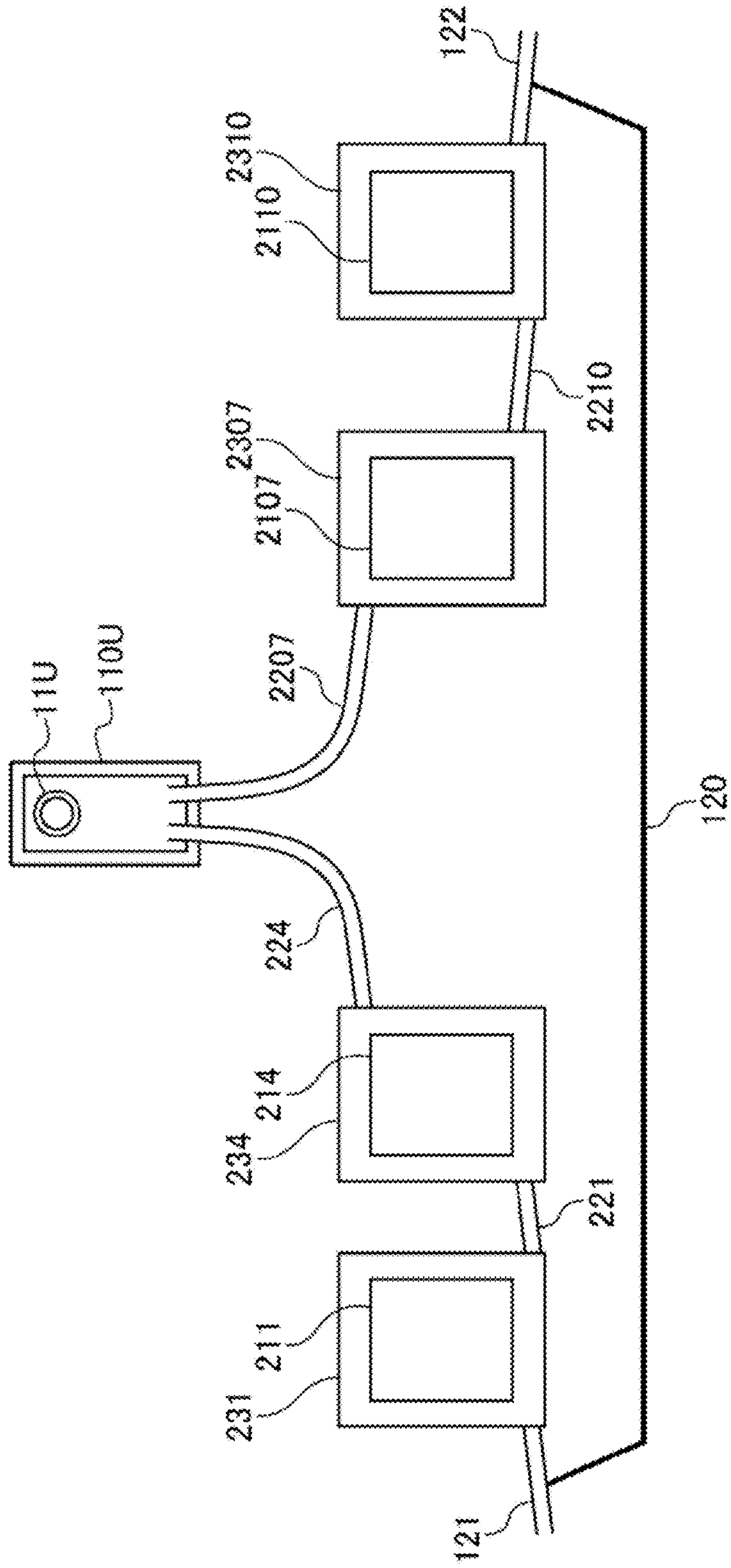
FIG. 25B is a simplified diagram of the vicinity of the U phase connection.

FIGS. 25A and 25B are each a diagram for explaining the U phase connection. Here, FIG. 25A is a planar cross-sectional view of the U phase connection 110U, and FIG. 25B is a diagram for explaining the vicinity of the U phase connection in a simplified manner.

As described above, the other end (the liquid heat carrier outlet) of the first hollow conductor wire 221 communicates with the one end (the liquid heat carrier inlet) of the fourth hollow conductor wire 224. Therefore, it can be said that the first coil 231 (the first hollow conductor wire 221) and the fourth coil 234 (the fourth hollow conductor wire 224) are connected in series. The fourth hollow conductor wire 224 may be the same as the first hollow conductor wire 221. In other words, the first hollow conductor wire 221 may be wound in the first slot 211 to form the first coil 231, and it may also be wound in the fourth slot 214 to form the fourth coil 234.

In addition, the other end (the liquid heat carrier outlet) of the seventh hollow conductor wire 2207 communicates with the one end (the liquid heat carrier inlet) of the tenth hollow conductor wire 2210. Therefore, it can be said that the seventh coil 2307 (the seventh hollow conductor wire 2207) and the tenth coil 2310 (the tenth hollow conductor wire 2210) are also connected in series. The tenth hollow conductor wire 2210 may be the same as the seventh hollow conductor wire 2207. In other words, the seventh hollow conductor wire 2207 may be wound in the seventh slot 2107 to form the seventh coil 2307, and it may also be wound in the tenth slot 2110 to form the tenth coil 2310.

In addition, the other end (the liquid heat carrier outlet) of the fourth hollow conductor wire 224 is connected to the U phase connection 110U. In addition, the one end (the liquid heat carrier inlet) of the seventh hollow conductor wire 2207 is also connected to the U phase connection 110U. Therefore, it can be said that the first coil 231 and the fourth coil 234, which are connected in series, and the seventh coil 2307 and the tenth coil 2310, which are connected in series, are connected in parallel.

The U phase connection 110U is formed to have the tubular shape and has the liquid-tight structure in which the liquid heat carrier that has flown through the fourth hollow conductor wire 224 flows into the seventh hollow conductor wire 2207 without causing the leakage. The U phase line 11U is connected to this U phase connection 110U. The electrical distance from the U phase connection 110U to the fourth coil 234 and the electrical distance from the U phase connection 110U to the seventh coil 2307 are set to be equal or substantially equal. In addition, the electrical distance from the U phase connection 110U to the first coil 231 and the electrical distance from the U phase connection 110U to the tenth coil 2310 are also set to be equal or substantially equal.

In addition, as described above, the one end (the liquid heat carrier inlet) of the first hollow conductor wire 221 is connected to the liquid heat carrier inlet pipe 121, and the other end (the liquid heat carrier outlet) of the tenth hollow conductor wire 2210 is connected to the liquid heat carrier outlet pipe 122. The liquid heat carrier inlet pipe 121 and the liquid heat carrier outlet pipe 122 are electrically connected by the solid connection conductor wire 120.

Although FIGS. 25A and 25B illustrate the U phase connection, because the V phase connection 110V and the W phase connection 110W have the same configurations, the description thereof will be omitted.

Figure 26A:
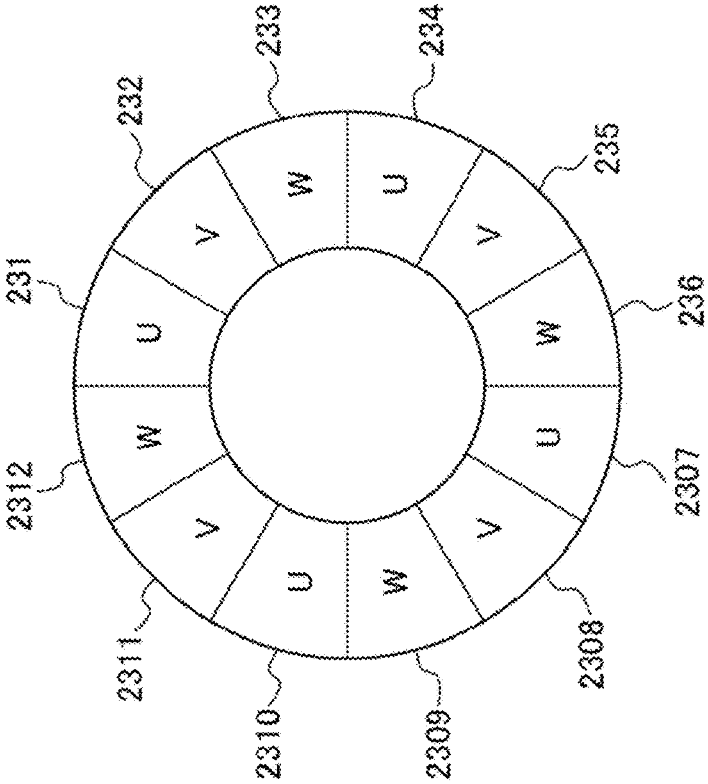
FIG. 26A is a diagram showing an example of the arrangement of each coil in the rotating electrical machine of the inner rotor type with twelve slots and eight poles (12N8P)
Figure 26B:
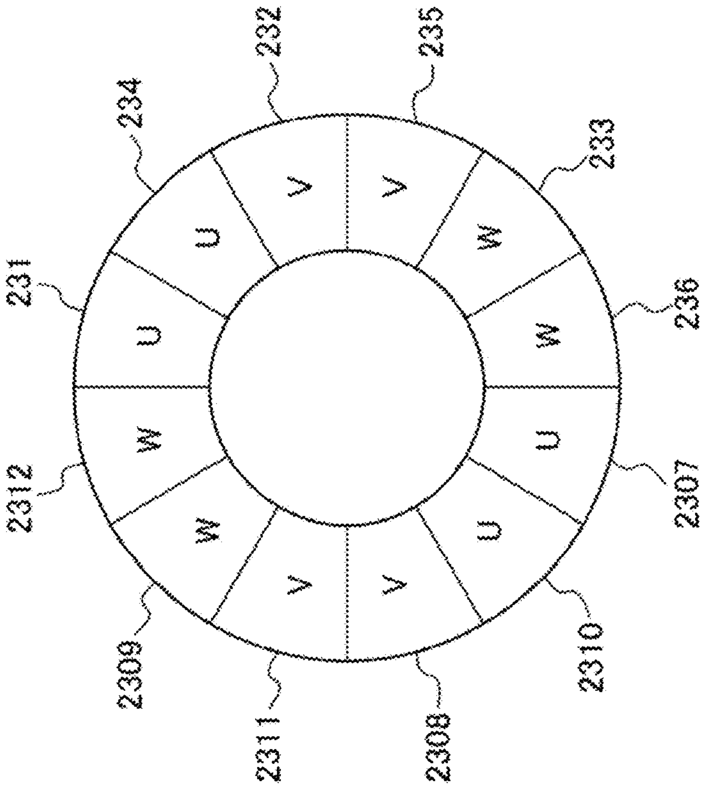
FIG. 26B is a diagram showing an example of the arrangement of each coil in the rotating electrical machine of the outer rotor type with twelve slots and eight poles (12N8P)
Figure 26C:
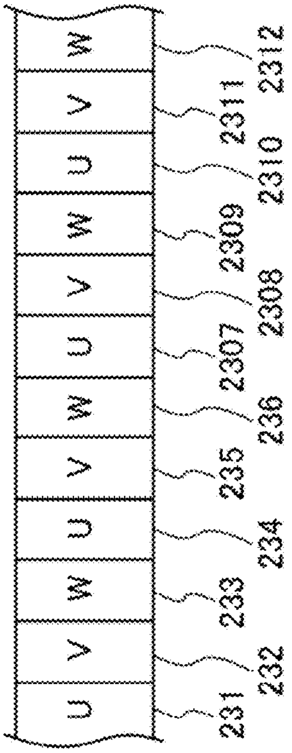
FIG. 26C is a diagram showing an example of the arrangement of each coil in a linear motor.

FIGS. 26A, 26B, and 26C are each a diagram showing an example of the arrangement of each coil.

Although the respective coils are shown exploded and arranged in a single row in FIG. 23 in order to show the simplified configuration, for the rotating electrical machine of the inner rotor type with twelve slots and eight poles (12N8P), the respective coils are arranged in the arrangement as shown in FIG. 26A. In other words, the second coil 232, which is the V phase coil, is positioned next to the first coil 231, which is the U phase coil, in the clockwise direction. The third coil 233, which is the W phase coil, is positioned next to the second coil 232. The fourth coil 234, which is the U phase coil, is positioned next to the third coil 233. The fifth coil 235, which is the V phase coil, is positioned next to the fourth coil 234. The sixth coil 236, which is the W phase coil, is positioned next to the fifth coil 235. The seventh coil 2307, which is the U phase coil, is positioned next to the sixth coil 236. The eighth coil 2308, which is the V phase coil, is positioned next to the seventh coil 2307. The ninth coil 2309, which is the W phase coil, is positioned next to the eighth coil 2308. The tenth coil 2310, which is the U phase coil, is positioned next to the ninth coil 2309. The eleventh coil 2311, which is the V phase coil, is positioned next to the tenth coil 2310. The twelfth coil 2312, which is the W phase coil, is positioned next to the eleventh coil 2311.

As apparent from referring to FIG. 17A, such an arrangement is the same as that of the third embodiment. Also in a case of the rotating electrical machine of the outer rotor type with twelve slots and eight poles (12N8P), the arrangement is the same as the third embodiment shown in FIG. 17B, and so, a detailed description thereof will be omitted.

In addition, in a case of the rotating electrical machine of the inner rotor type with twelve slots and fourteen poles (12N14P), the respective coils are arranged in the same order as shown in FIG. 26B. In other words, the fourth coil 234, which is the U phase coil, is positioned next to the first coil 231, which is the U phase coil, in the clockwise direction. The second coil 232, which is the V phase coil, is positioned next to the fourth coil 234. The fifth coil 235, which is the V phase coil, is positioned next to the second coil 232. The third coil 233, which is the W phase coil, is positioned next to the fifth coil 235. The sixth coil 236, which is the W phase coil, is positioned next to the third coil 233. The seventh coil 2307, which is the U phase coil, is positioned next to the sixth coil 236. The tenth coil 2310, which is the U phase coil, is positioned next to the seventh coil 2307. The eighth coil 2308, which is the V phase coil, is positioned next to the tenth coil 2310. The eleventh coil 2311, which is the V phase coil, is positioned next to the eighth coil 2308. The ninth coil 2309, which is the W phase coil, is positioned next to the eleventh coil 2311. The twelfth coil 2312, which is the W phase coil, is positioned next to the ninth coil 2309.

As apparent from referring to FIG. 18A, such an arrangement is the same as that of the third embodiment. Also in a case of the rotating electrical machine of the outer rotor type with twelve slots and fourteen poles (12N14P), the arrangement is the same as the third embodiment shown in FIG. 18B, and so, a detailed description thereof will be omitted.

Furthermore, in a case in which the electrical energy-mechanical energy converter is the linear motor, the respective coils are arranged in the same order as shown in FIG. 26C. In other words, the second coil 232, which is the V phase coil, is positioned next to the first coil 231, which is the U phase coil. The third coil 233, which is the W phase coil, is positioned next to the second coil 232. The fourth coil 234, which is the U phase coil, is positioned next to the third coil 233. The fifth coil 235, which is the V phase coil, is positioned next to the fourth coil 234. The sixth coil 236, which is the W phase coil, is positioned next to the fifth coil 235. The seventh coil 2307, which is the U phase coil, is positioned next to the sixth coil 236. The eighth coil 2308, which is the V phase coil, is positioned next to the seventh coil 2307. The ninth coil 2309, which is the W phase coil, is positioned next to the eighth coil 2308. The tenth coil 2310, which is the U phase coil, is positioned next to the ninth coil 2309. The eleventh coil 2311, which is the V phase coil, is positioned next to the tenth coil 2310. The twelfth coil 2312, which is the W phase coil, is positioned next to the eleventh coil 2311.

As apparent from referring to FIG. 19, such an arrangement is the same as that of the third embodiment.

Figure 27:
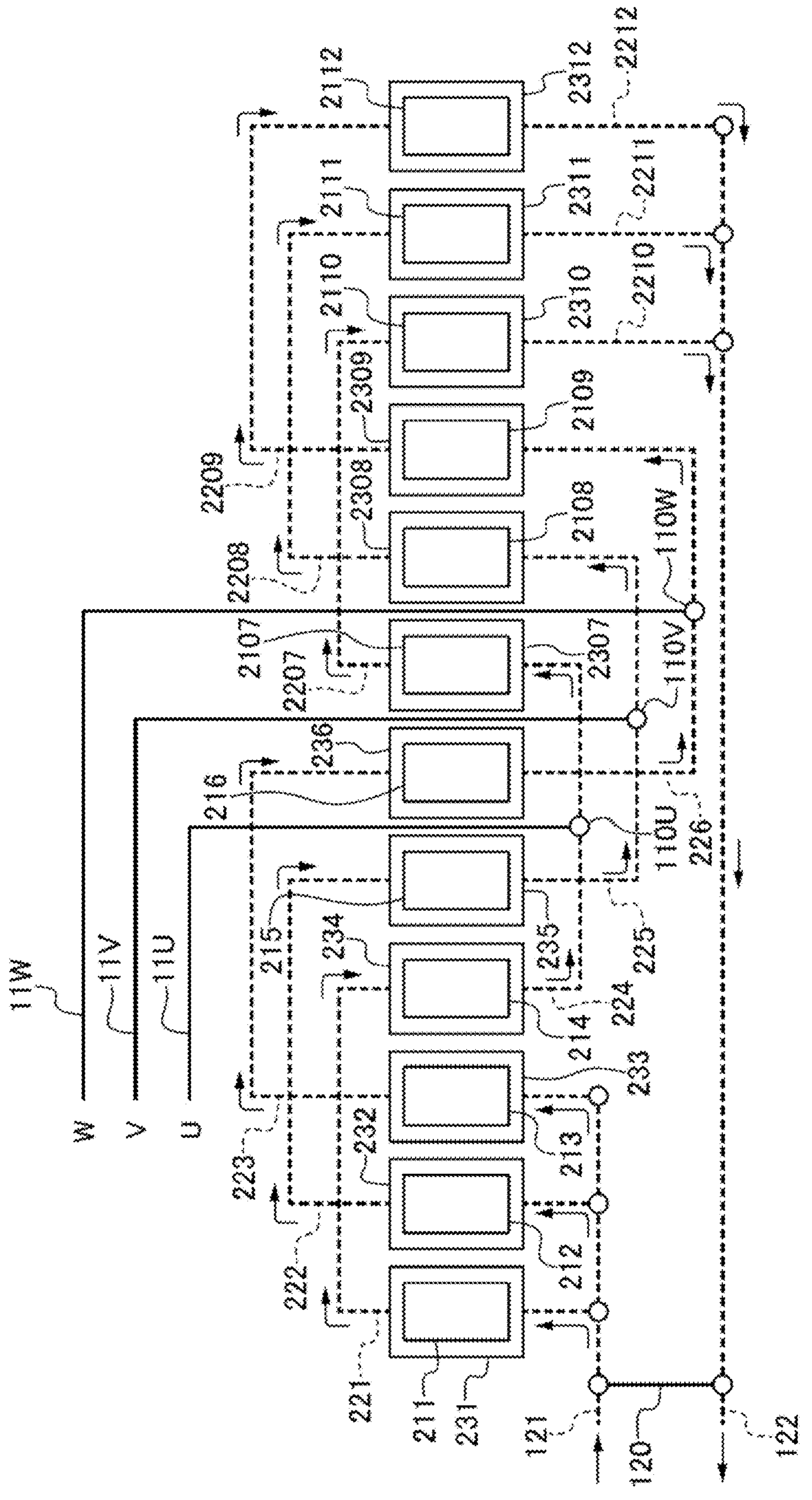
FIG. 27 is a diagram for explaining the flow of the liquid heat carrier in FIG. 23.

FIG. 27 is a diagram for explaining the flow of the liquid heat carrier in FIG. 23. Here, the arrows indicate the flow direction of the liquid heat carrier.

The flow of the liquid heat carrier that has flown through the liquid heat carrier inlet pipe 121 is divided, and the first flow flows as follows: the first coil 231→2192 the fourth coil 234→the seventh coil 2307→the tenth coil 2310→the liquid heat carrier outlet pipe 122.

In addition, another flow flows as follows: the second hollow conductor wire 222 of the second coil 232→the fifth hollow conductor wire 225 of the fifth coil 235→the eighth hollow conductor wire 2208 in the eighth slot 2108→the eleventh hollow conductor wire 2211 in the eleventh slot 2111→the liquid heat carrier outlet pipe 122.

Furthermore, another flow flows as follows: the third hollow conductor wire 223 of the third coil 233→the sixth hollow conductor wire 226 of the sixth coil 236→the ninth hollow conductor wire 2209 of the ninth coil 2309→the twelfth hollow conductor wire 2212 of the twelfth coil 2312→the liquid heat carrier outlet pipe 122.

Figure 28:
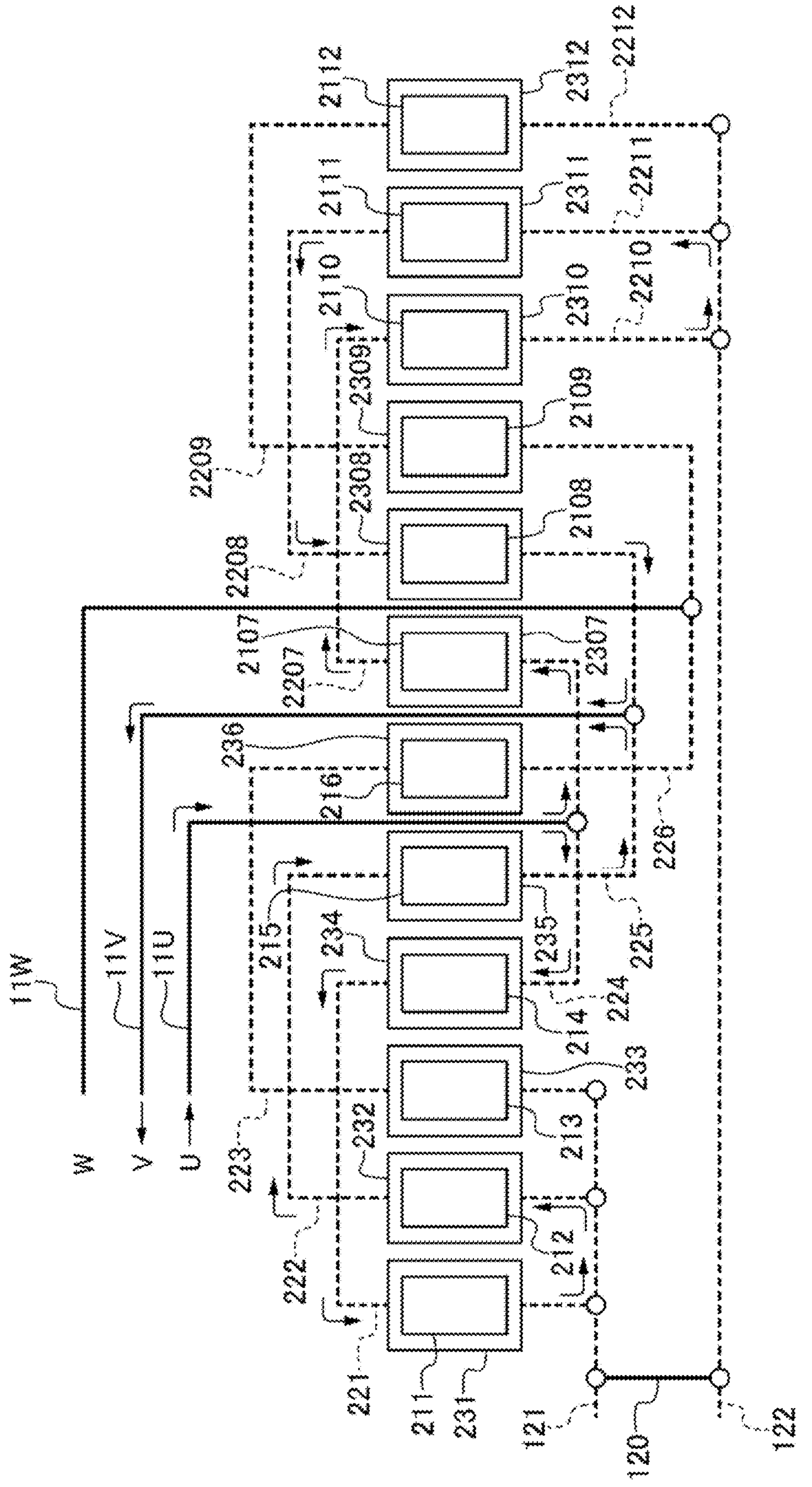
FIG. 28 is a diagram for explaining how the current flows from the U phase line 11U to the V phase line 11V with reference to the exploded diagram shown in FIG. 23.

FIG. 28 is a diagram for explaining how the current flows from the U phase line 11U to the V phase line 11V with reference to the exploded diagram shown in FIG. 23. Here, the arrows indicate the flow direction of the current.

As one stream, the current that has been input from the U phase line 11U flows as follows: the fourth coil 234→the first coil 231→the liquid heat carrier inlet pipe 121→the second coil 232→the fifth coil 235→the V phase line 11V.

In addition, another stream of the current that has been input from the U phase line 11U flows as follows: the seventh coil 2307→the tenth coil 2310→the liquid heat carrier outlet pipe 122→the eleventh coil 2311→the eighth coil 2308→the V phase line 11V.

As described above, even in a case of a type in which the hollow conductor wire, which is connected in series, is further connected in parallel as in the fourth embodiment, it is possible to achieve the same operational advantages as those achieved with the type in which the hollow conductor wire is connected in parallel as in the third embodiment. In other words, because the liquid heat carrier (the heat carrier) flows through the inside of the hollow conductor wire and the liquid heat carrier (the heat carrier) is cooled by the radiator 61, excellent cooling performance is achieved for the electrical energy-mechanical energy converter.

In addition, because the liquid heat carrier inlet pipe 121 and the liquid heat carrier outlet pipe 122 are electrically connected by the solid connection conductor wire 120, the connection conductor wire 120 forms the neutral point, and so, it is possible to achieve high safety performance.

Figure 29A:
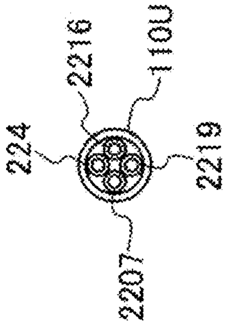
FIG. 29A is a planar cross-sectional view of the U phase connection 110U for explaining the U phase connection in the case of twenty-four slots.
Figure 29B:
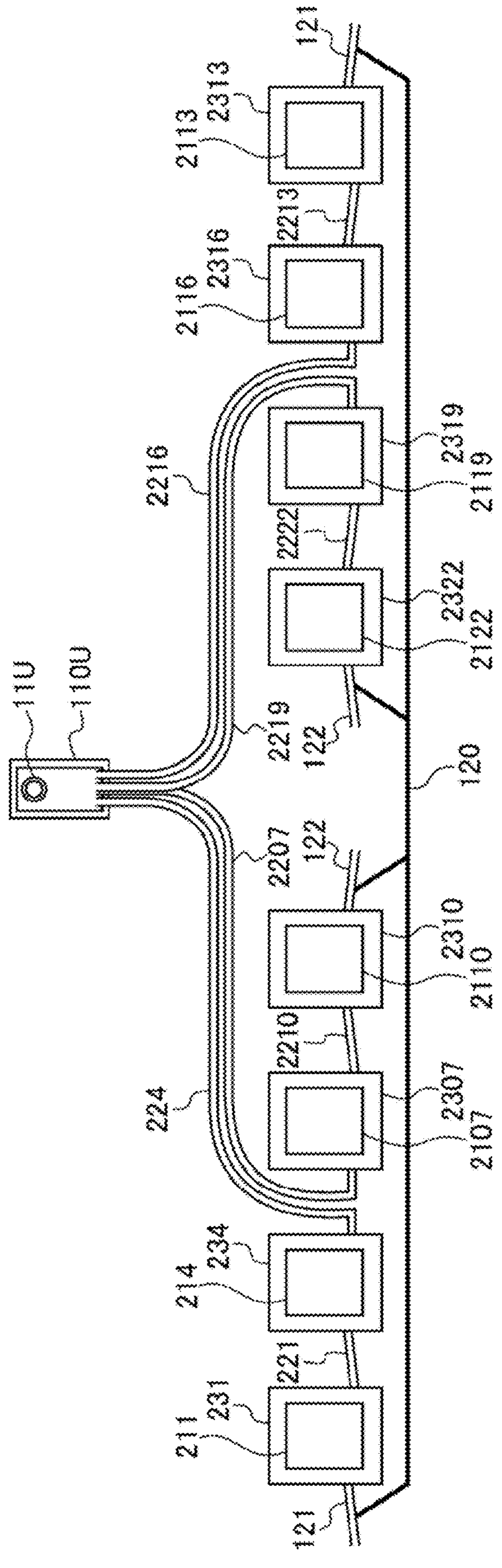
FIG. 29B is a simplified diagram of the vicinity of the U phase connection.

When the number of slots is to be increased, for example, in the case of twenty-four slots, the configuration of the U phase will be as shown in FIG. 29B. In other words, the following configuration is added to the configuration shown in FIG. 25B. The thirteenth coil 2313 and the sixteenth coil 2316 are configured in series. One end (the liquid heat carrier inlet) of the thirteenth hollow conductor wire 2213 of the thirteenth coil 2313 is connected to the liquid heat carrier inlet pipe 121. In addition, other end (the liquid heat carrier outlet) of the sixteenth hollow conductor wire 2216 of the sixteenth coil 2316 is connected to the U phase connection 110U. In addition, the nineteenth coil 2319 and the twenty-second coil 2322 are configured in series. One end (the liquid heat carrier inlet) of the nineteenth hollow conductor wire 2219 of the nineteenth coil 2319 is connected to the U phase connection 110U. Other end (the liquid heat carrier outlet) of the twenty-second hollow conductor wire 2222 of the twenty-second coil 2322 is connected to the liquid heat carrier outlet pipe 122.

In FIG. 29B, although two liquid heat carrier inlet pipes 121 and two liquid heat carrier outlet pipes 122 are shown in order to avoid complexity in the drawings, in reality, there is only one of each.

The liquid heat carrier inlet pipe 121 and the liquid heat carrier outlet pipe 122 are electrically connected by the solid connection conductor wire 120.

The electrical distance from the U phase connection 110U to the fourth coil 234, the electrical distance from the U phase connection 110U to the seventh coil 2307, the electrical distance from the U phase connection 110U to the sixteenth coil 2316, and the electrical distance from the U phase connection 110U to the nineteenth coil 2319 are set to be equal or substantially equal.

In addition, the electrical distance from the U phase connection 110U to the first coil 231, the electrical distance from the U phase connection 110U to the tenth coil 2310, the electrical distance from the U phase connection 110U to the thirteenth coil 2313, and the electrical distance from the U phase connection 110U to the twenty-second coil 2322 are also set to be equal or substantially equal.

Although FIGS. 29A and 29B illustrate the U phase, because the V phase and the W phase also have the same configurations, the description thereof will be omitted.

By configuring in this manner, the 24-slot type is allowed.

Figure 30A:
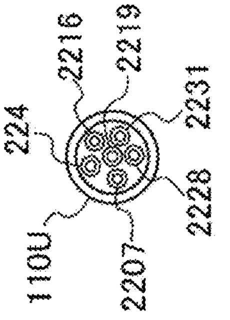
FIG. 30A is a planar cross-sectional view of the U phase connection 110U for explaining the U phase connection in the case of thirty-six slots.
Figure 30B:
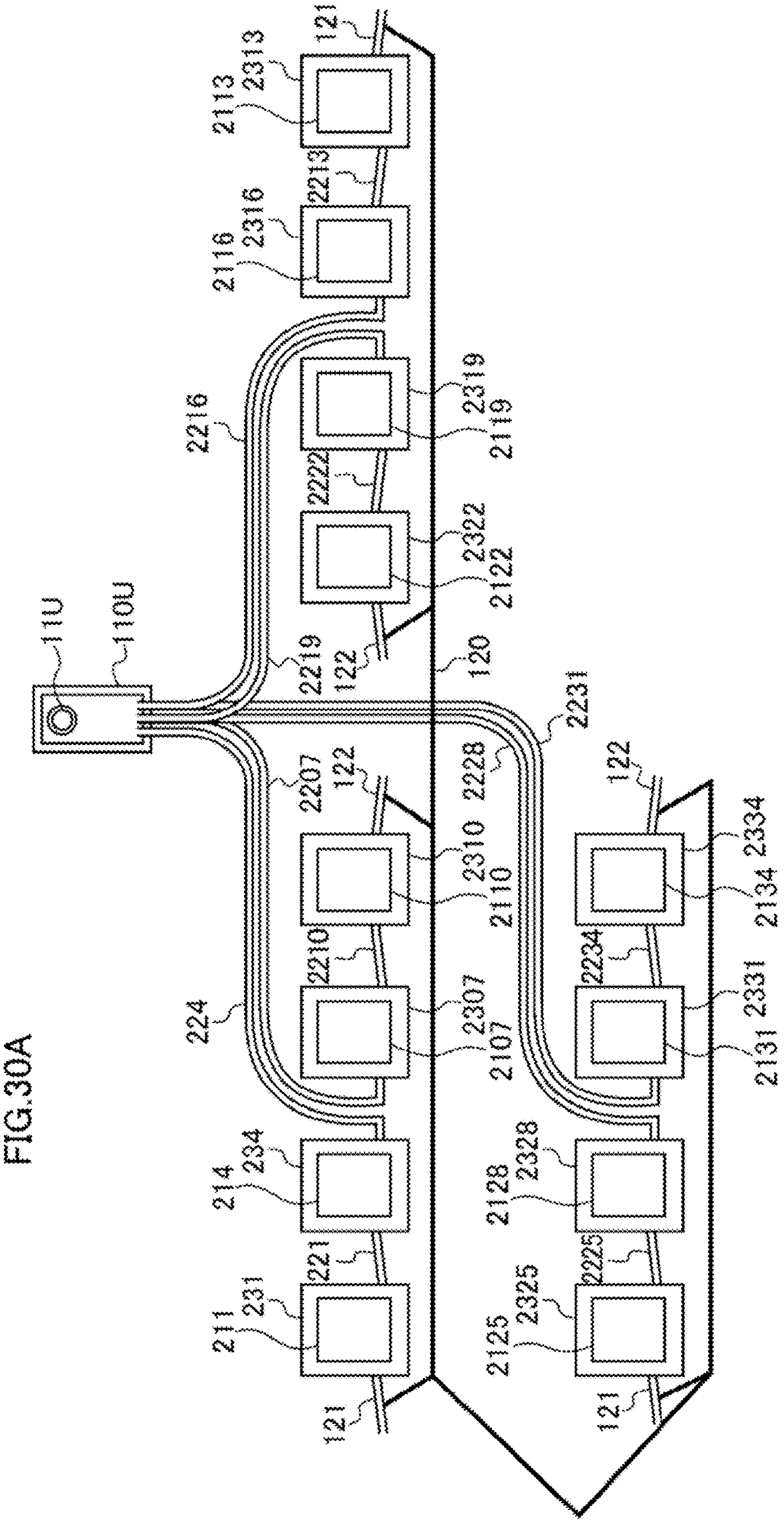
FIG. 30B is a simplified diagram of the vicinity of the U phase connection.

In addition, in the case of thirty-six slots, the configuration of the U phase will be as shown in FIG. 30B. In other words, the following configuration is added to the configuration shown in FIG. 29B. A twenty-fifth coil 2325 and a twenty-eighth coil 2328 are configured in series. One end (the liquid heat carrier inlet) of a twenty-fifth hollow conductor wire 2225 of the twenty-fifth coil 2325 is connected to the liquid heat carrier inlet pipe 121. In addition, other end (the liquid heat carrier outlet) of a twenty-eighth hollow conductor wire 2228 of the twenty-eighth coil 2328 is connected to the U phase connection 110U. Furthermore, a thirty-first coil 2331 and a thirty-fourth coil 2334 are configured in series. One end (the liquid heat carrier inlet) of a thirty-first hollow conductor wire 2231 of the thirty-first coil 2331 is connected to the U phase connection 110U. In addition, other end (the liquid heat carrier outlet) of a thirty-fourth hollow conductor wire 2234 of the thirty-fourth coil 2334 is connected to the liquid heat carrier outlet pipe 122.

In FIG. 30B, although three liquid heat carrier inlet pipes 121 and three liquid heat carrier outlet pipes 122 are shown in order to avoid complexity in the drawings, in reality, there is only one of each.

The liquid heat carrier inlet pipe 121 and the liquid heat carrier outlet pipe 122 are electrically connected by the solid connection conductor wire 120.

The electrical distance from the U phase connection 110U to the fourth coil 234, the electrical distance from the U phase connection 110U to the seventh coil 2307, the electrical distance from the U phase connection 110U to the sixteenth coil 2316, the electrical distance from the U phase connection 110U to the nineteenth coil 2319, the electrical distance from the U phase connection 110U to the twenty-eighth coil 2328, and the electrical distance from the U phase connection 110U to the thirty-first coil 2331 are set to be equal or substantially equal.

In addition, the electrical distance from the U phase connection 110U to the first coil 231, the electrical distance from the U phase connection 110U to the tenth coil 2310, the electrical distance from the U phase connection 110U to the thirteenth coil 2313, the electrical distance from the U phase connection 110U to the twenty-second coil 2322, the electrical distance from the U phase connection 110U to the twenty-fifth coil 2325, and the electrical distance from the U phase connection 110U to the thirty-fourth coil 2334 are also set to be equal or substantially equal.

Although FIGS. 30A and 30B illustrate the U phase, because the V phase and the W phase also have the same configurations, the description thereof will be omitted.

By configuring in this manner, the 36-slot type is allowed.

Figure 31A:
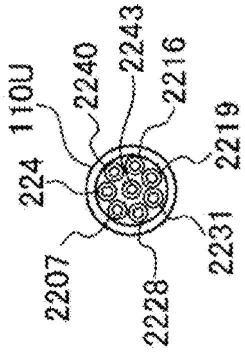
FIG. 31A is a planar cross-sectional view of the U phase connection 110U for explaining the U phase connection in the case of forty-eight slots.
Figure 31B:
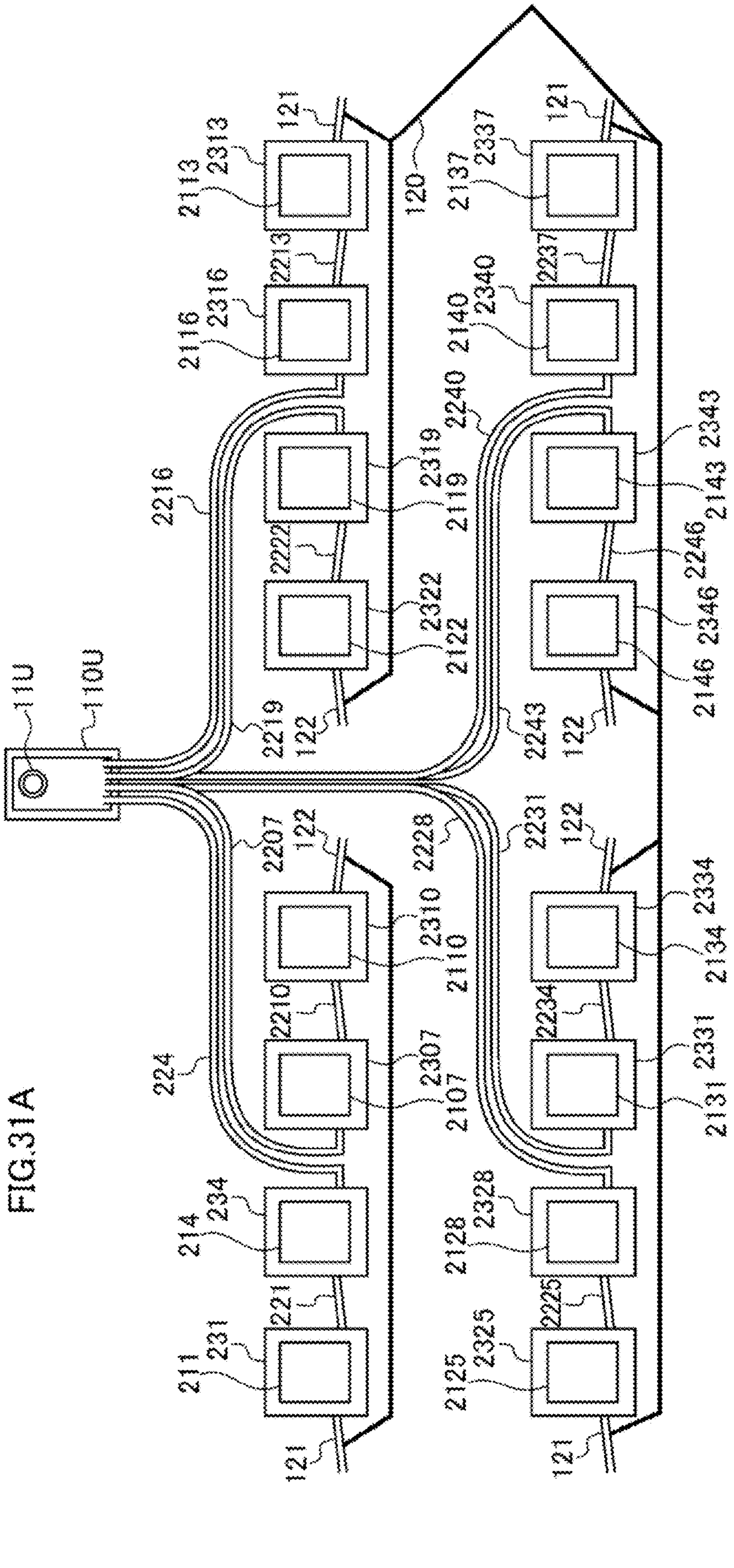
FIG. 31B is a simplified diagram of the vicinity of the U phase connection.

In addition, in the case of forty-eight slots, the configuration of the U phase will be as shown in FIG. 31B. In other words, the following configuration is added to the configuration shown in FIG. 30B. A thirty-seventh coil 2337 and a fortieth coil 2340 are configured in series. In addition, one end (the liquid heat carrier inlet) of a thirty-seventh hollow conductor wire 2237 of the thirty-seventh coil 2337 is connected to the liquid heat carrier inlet pipe 121. Other end (the liquid heat carrier outlet) of a fortieth hollow conductor wire 2240 of the fortieth coil 2340 is connected to the U phase connection 110U. Furthermore, a forty-third coil 2343 and a forty-sixth coil 2346 are configured in series. In addition, one end (the liquid heat carrier inlet) of a forty-third conductor wire 2243 of the forty-third coil 2343 is connected to the U phase connection 110U. In addition, other end (the liquid heat carrier outlet) of a forty-sixth hollow conductor wire 2246 of the forty-sixth coil 2346 is connected to the liquid heat carrier outlet pipe 122.

In FIG. 31B, although four liquid heat carrier inlet pipes 121 and four liquid heat carrier outlet pipes 122 are shown in order to avoid complexity in the drawings, in reality, there is only one of each.

The liquid heat carrier inlet pipe 121 and the liquid heat carrier outlet pipe 122 are electrically connected by the solid connection conductor wire 120.

The electrical distance from the U phase connection 110U to the fourth coil 234, the electrical distance from the U phase connection 110U to the seventh coil 2307, the electrical distance from the U phase connection 110U to the sixteenth coil 2316, the electrical distance from the U phase connection 110U to the nineteenth coil 2319, the electrical distance from the U phase connection 110U to the twenty-eighth coil 2328, the electrical distance from the U phase connection 110U to the thirty-first coil 2331, the electrical distance from the U phase connection 110U to the fortieth coil 2340, and the electrical distance from the U phase connection 110U to the forty-third coil 2343 are set to be equal or substantially equal.

In addition, the electrical distance from the U phase connection 110U to the first coil 231, the electrical distance from the U phase connection 110U to the tenth coil 2310, the electrical distance from the U phase connection 110U to the thirteenth coil 2313, the electrical distance from the U phase connection 110U to the twenty-second coil 2322, the electrical distance from the U phase connection 110U to the twenty-fifth coil 2325, the electrical distance from the U phase connection 110U to the thirty-fourth coil 2334, the electrical distance from the U phase connection 110U to the thirty-seventh coil 2337, and the electrical distance from the U phase connection 110U to the forty-sixth coil 2346 are also set to be equal or substantially equal.

Although FIGS. 31A and 31B illustrate the U phase, because the V phase and the W phase also have the same configurations, the description thereof will be omitted.

By configuring in this manner, the 48-slot type is allowed.

Fifth Embodiment

Figure 32A:
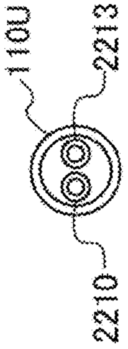
FIG. 32A is a planar cross-sectional view of the U phase connection 110U for explaining the U phase connection of a fifth embodiment.
Figure 32B:
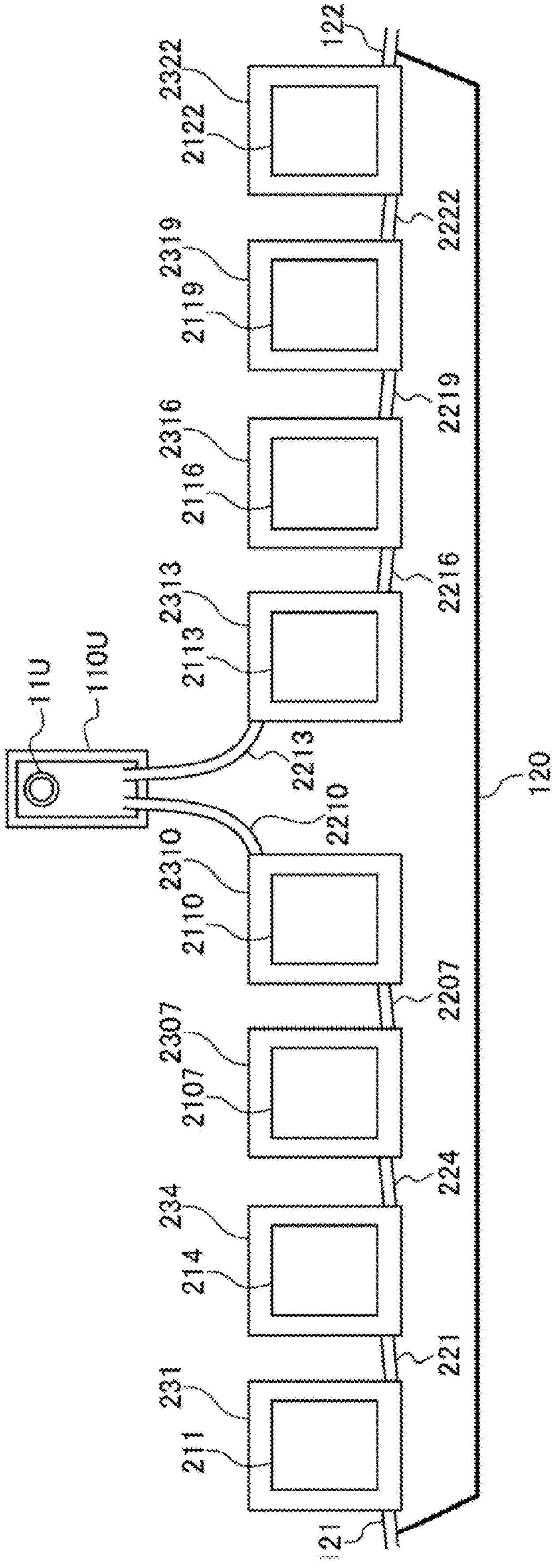
FIG. 32B is a simplified diagram of the vicinity of the U phase connection.

FIGS. 32A and 32B are each a diagram for explaining the U phase connection of a fifth embodiment. Here, FIG. 32A is a planar cross-sectional view of the U phase connection 110U, and FIG. 32B is a diagram for explaining the vicinity of the U phase connection in a simplified manner.

In the fourth embodiment, two coils are connected in series, and one end (the liquid heat carrier inlet) of the hollow conductor wire of the first coil is connected to the liquid heat carrier inlet pipe 121 and other end (the liquid heat carrier outlet) of the hollow conductor wire of the second coil is connected to the connection of the U phase, etc. Furthermore, other two coils are also connected in series, and one end (the liquid heat carrier inlet) of the hollow conductor wire of the first coil is connected to the connection of the U phase, etc. and other end (the liquid heat carrier outlet) of the hollow conductor wire of the second coil is connected to the liquid heat carrier outlet pipe 122. A plurality of groups of the coils with such a configuration are prepared, and they are connected to the connections of the U phase, etc., thereby adapting to the increase in the number of slots. Therefore, because the number of slots is increased and the number of groups of the coils is increased, the connections of the U phase, etc. require a relatively large space.

In contrast, this embodiment is configured as described below. In other words, the first coil 231, the fourth coil 234, and the seventh coil 2307, the tenth coil 2310 are connected in series. The one end (the liquid heat carrier inlet) of the first hollow conductor wire 221 of the first coil 231 is connected to the liquid heat carrier inlet pipe 121. In addition, the other end (the liquid heat carrier outlet) of the tenth hollow conductor wire 2210 of the tenth coil 2310 is connected to the U phase connection 110U. Furthermore, the thirteenth coil 2313, the sixteenth coil 2316, the nineteenth coil 2319, and the twenty-second coil 2322 are connected in series. The one end (the liquid heat carrier inlet) of the thirteenth hollow conductor wire 2213 of the thirteenth coil 2313 is connected to the U phase connection 110U. In addition, other end (the liquid heat carrier outlet) of the twenty-second hollow conductor wire 2222 of the twenty-second coil 2322 is connected to the liquid heat carrier outlet pipe 122.

The liquid heat carrier inlet pipe 121 and the liquid heat carrier outlet pipe 122 are electrically connected by the solid connection conductor wire 120.

The electrical distance from the U phase connection 110U to the tenth coil 2310 and the electrical distance from the U phase connection 110U to the thirteenth coil 2313 are set to be equal or substantially equal. In addition, the electrical distance from the U phase connection 110U to the seventh coil 2307 and the electrical distance from the U phase connection 110U to the sixteenth coil 2316 are set to be equal or substantially equal. Furthermore, the electrical distance from the U phase connection 110U to the fourth coil 234 and the electrical distance from the U phase connection 110U to the nineteenth coil 2319 are set to be equal or substantially equal. Furthermore, the electrical distance from the U phase connection 110U to the first coil 231 and the electrical distance from the U phase connection 110U to the twenty-second coil 2322 are set to be equal or substantially equal.

Although FIGS. 32A and 32B illustrate the U phase, because the V phase and the W phase also have the same configurations, the description thereof will be omitted.

In this embodiment, as described above, by increasing the number of coils connected in series, it is possible to adapt to the increase in the number of slots. By also configuring in this manner, the 24-slot type is allowed. By configuring as in this embodiment, even if the number of slots is increased, it is possible to reduce the space for the U phase, etc. In addition, at a state of designing the coil, in accordance with an internal space and the respective parameters, it is possible to appropriately select the optimal shape by selecting which coil winding forms of the fourth embodiment and the fifth embodiment is to be used.

Sixth Embodiment

Figure 33:
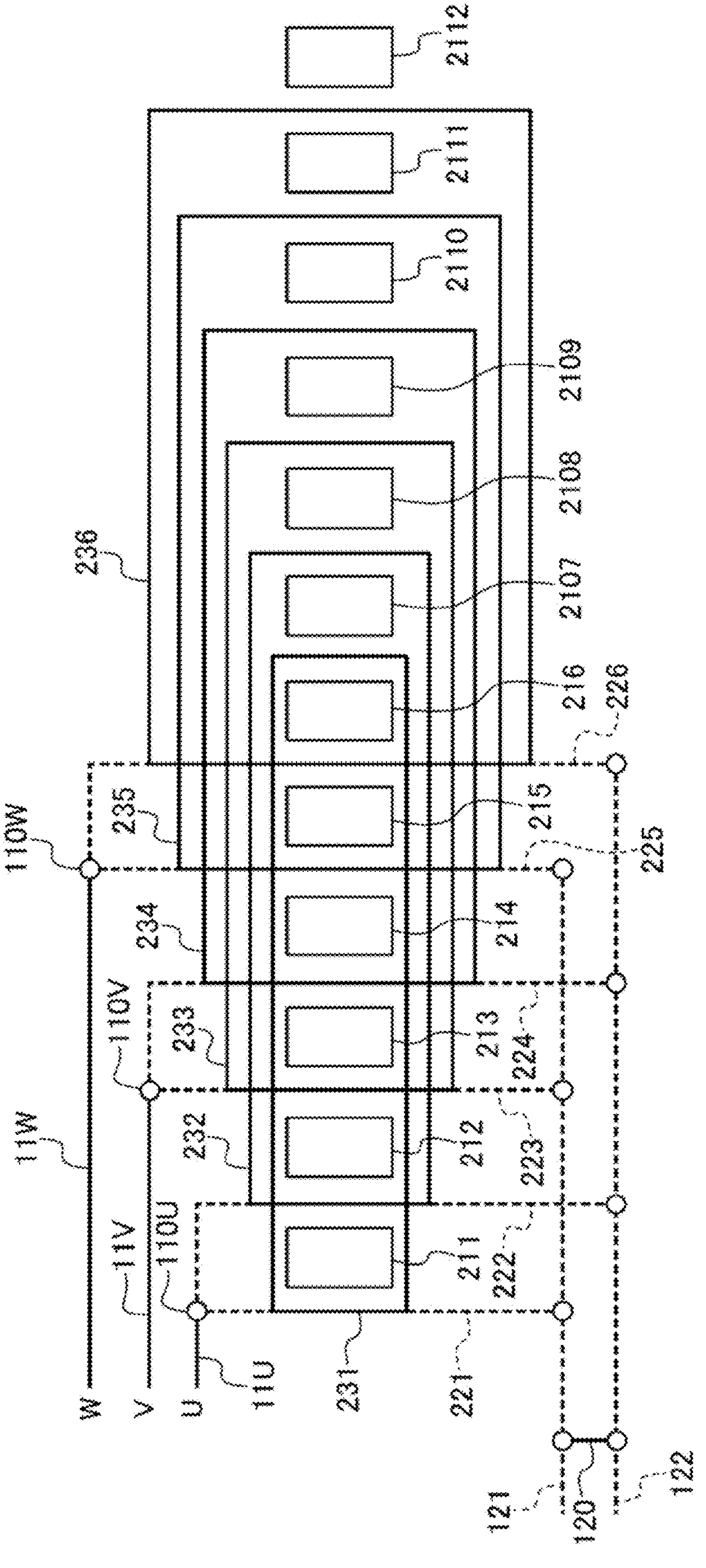
FIG. 33 is a diagram showing the simplified configuration of the coil in the electrical energy-mechanical energy converter system of a sixth embodiment.
Figure 34:
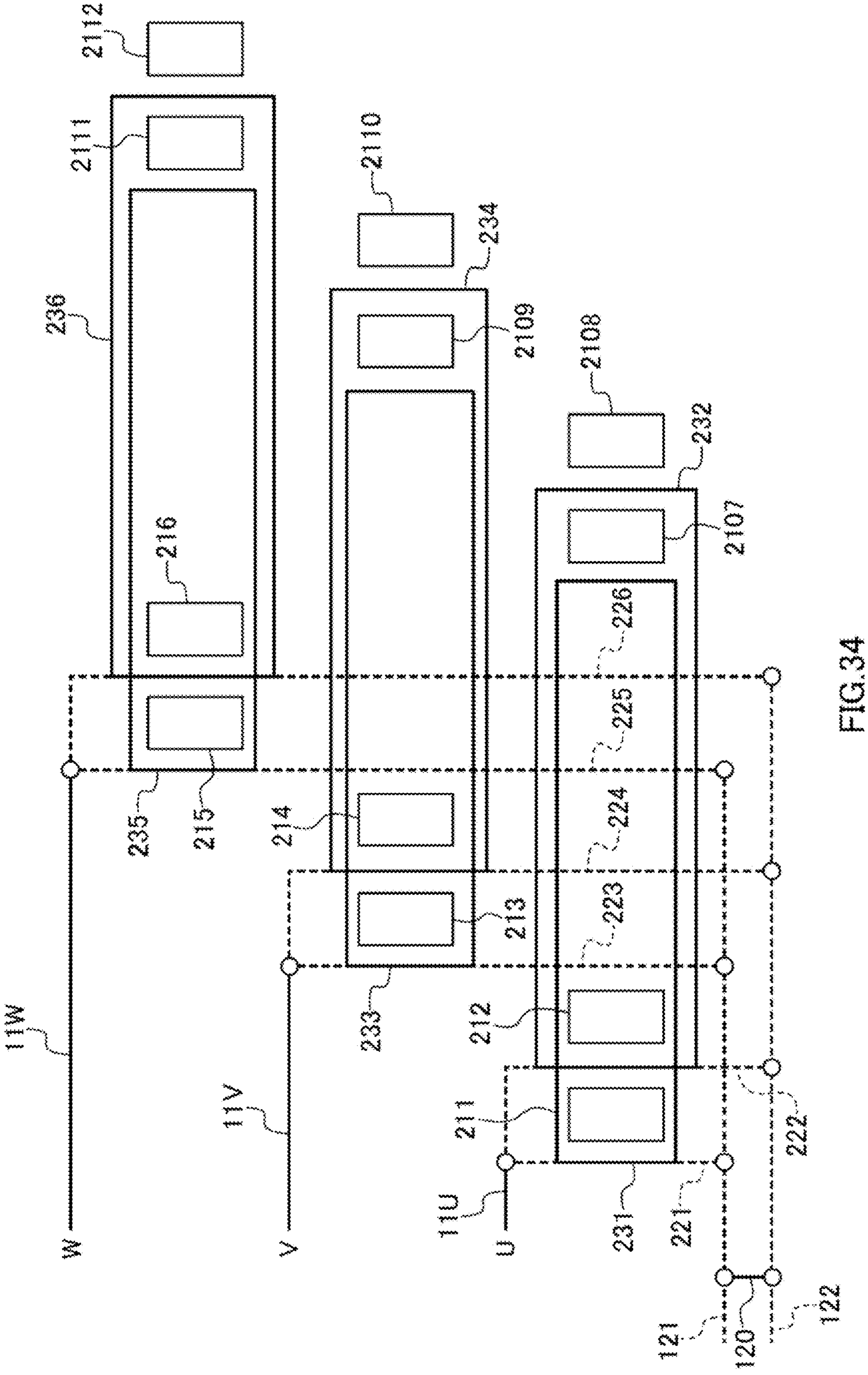
FIG. 34 is a diagram showing, for ease of understanding FIG. 33, the configuration diagram of FIG. 33 divided vertically into the U phase, the V phase, and the W phase.
Figure 35:
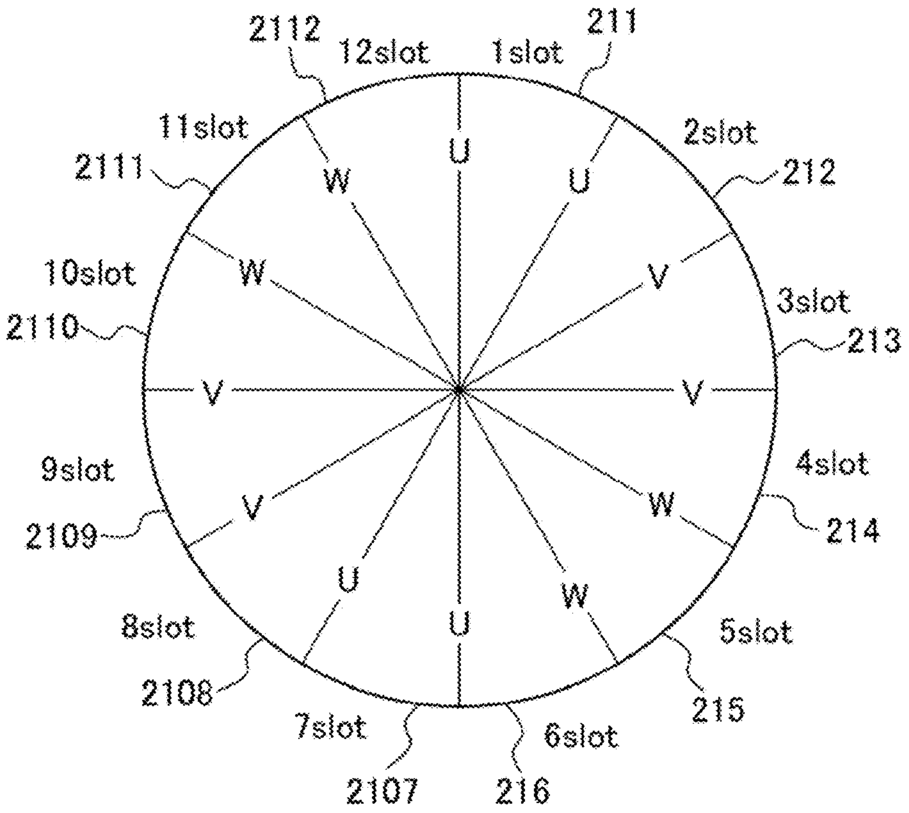
FIG. 35 is a phase arrangement diagram of the coil.

FIG. 33 is a diagram showing the simplified configuration of the coil of the electrical energy-mechanical energy converter system of a sixth embodiment. FIG. 34 is a diagram showing, for ease of understanding FIG. 33, the configuration diagram of FIG. 33 divided vertically into the U phase, the V phase, and the W phase. FIG. 35 is a phase arrangement diagram of the coil.

In the respective embodiments described above, although the concentrated winding type, in which the coils are formed by winding the hollow conductor wire for each of the slots, is employed, the present invention is not limited thereto. It may be possible to employ a distributed winding type in which the coils are formed by winding the hollow conductor wire over a plurality of slots.

The electrical energy-mechanical energy converter system shown in FIG. 33 is the electrical energy-mechanical energy converter with twelve slots and two poles (12N2P). In addition, the coils are of the distributed winding type.

The stator core 21 of the stator 2 in this embodiment is formed with twelve slots. Specifically, the stator core 21 is formed with the first slot 211, the second slot 212, the third slot 213, the fourth slot 214, the fifth slot 215, the sixth slot 216, the seventh slot 2107, the eighth slot 2108, the ninth slot 2109, the tenth slot 2110, the eleventh slot 2111, and the twelfth slot 2112.

The first coil 231 is formed by winding the first hollow conductor wire 221 so as to pass through between the first slot 211 and the twelfth slot 2112 and to pass through between the sixth slot 216 and the seventh slot 2107. The first hollow conductor wire 221 is formed to have the hollow shape through which the liquid heat carrier can flow. The one end (the liquid heat carrier inlet) of the first hollow conductor wire 221 is connected to the liquid heat carrier inlet pipe 121. The other end (the liquid heat carrier outlet) of the first hollow conductor wire 221 is connected to the U phase connection 110U.

The second coil 232 is formed by winding the second hollow conductor wire 222 so as to pass through between the first slot 211 and the second slot 212 and to pass through between the seventh slot 2107 and the eighth slot 2108. The second hollow conductor wire 222 is formed to have the hollow shape through which the liquid heat carrier can flow. The one end (the liquid heat carrier inlet) of the second hollow conductor wire 222 is connected to the U phase connection 110U. The other end (the liquid heat carrier outlet) of the second hollow conductor wire 222 is connected to the liquid heat carrier outlet pipe 122.

The third coil 233 is formed by winding the third hollow conductor wire 223 so as to pass through between the second slot 212 and the third slot 213 and to pass through between the eighth slot 2108 and the ninth slot 2109. The third hollow conductor wire 223 is formed to have the hollow shape through which the liquid heat carrier can flow. The one end (the liquid heat carrier inlet) of the third hollow conductor wire 223 is connected to the liquid heat carrier inlet pipe 121. The other end (the liquid heat carrier outlet) of the third hollow conductor wire 223 is connected to the V phase connection 110V.

The fourth coil 234 is formed by winding the fourth hollow conductor wire 224 so as to pass through between the third slot 213 and the fourth slot 214 and to pass through between the ninth slot 2109 and the tenth slot 2110. The fourth hollow conductor wire 224 is formed to have the hollow shape through which the liquid heat carrier can flow. The one end (the liquid heat carrier inlet) of the fourth hollow conductor wire 224 is connected to the V phase connection 110V. The other end (the liquid heat carrier outlet) of the fourth hollow conductor wire 224 is connected to the liquid heat carrier outlet pipe 122.

The fifth coil 235 is formed by winding the fifth hollow conductor wire 225 so as to pass through between the fourth slot 214 and the fifth slot 215 and to pass through between the tenth slot 2110 and the eleventh slot 2111. The fifth hollow conductor wire 225 is formed to have the hollow shape through which the liquid heat carrier can flow. The one end (the liquid heat carrier inlet) of the fifth hollow conductor wire 225 is connected to the liquid heat carrier inlet pipe 121. The other end (the liquid heat carrier outlet) of the fifth hollow conductor wire 225 is connected to the W phase connection 110W.

The sixth coil 236 is formed by winding the sixth hollow conductor wire 226 so as to pass through between the fifth slot 215 and the sixth slot 216 and to pass through between the eleventh slot 2111 and the twelfth slot 2112. The sixth hollow conductor wire 226 is formed to have the hollow shape through which the liquid heat carrier can flow. The one end (the liquid heat carrier inlet) of the sixth hollow conductor wire 226 is connected to the W phase connection 110W. The other end (the liquid heat carrier outlet) of the sixth hollow conductor wire 226 is connected to the liquid heat carrier outlet pipe 122.

The liquid heat carrier inlet pipe 121 and the liquid heat carrier outlet pipe 122 are formed to have the hollow shape through which the liquid heat carrier can flow. The liquid heat carrier inlet pipe 121 and the liquid heat carrier outlet pipe 122 are electrically connected via the solid connection conductor wire 120.

The U phase line 11U is connected to the U phase connection 110U. The V phase line 11V is connected to the V phase connection 110V. The W phase line 11W is connected to the W phase connection 110W.

Although the illustrations in FIGS. 33 and 34 are simplified in order to avoid complexity in the drawings, the electrical distance from the U phase connection 110U to the first coil 231 and the electrical distance from the U phase connection 110U to the second coil 232 are set to be equal or substantially equal.

In addition, the electrical distance from the V phase connection 110V to the third coil 233 and the electrical distance from the V phase connection 110V to the fourth coil 234 are set to be equal or substantially equal.

Furthermore, the electrical distance from the W phase connection 110W to the fifth coil 235 and the electrical distance from the W phase connection 110W to the sixth coil 236 are set to be equal or substantially equal.

By employing such a configuration, it is possible to achieve the rotating electrical machine of the distributed winding type with twelve slots and two poles (12N2P).

The flow of the liquid heat carrier will be described.

Figure 36:
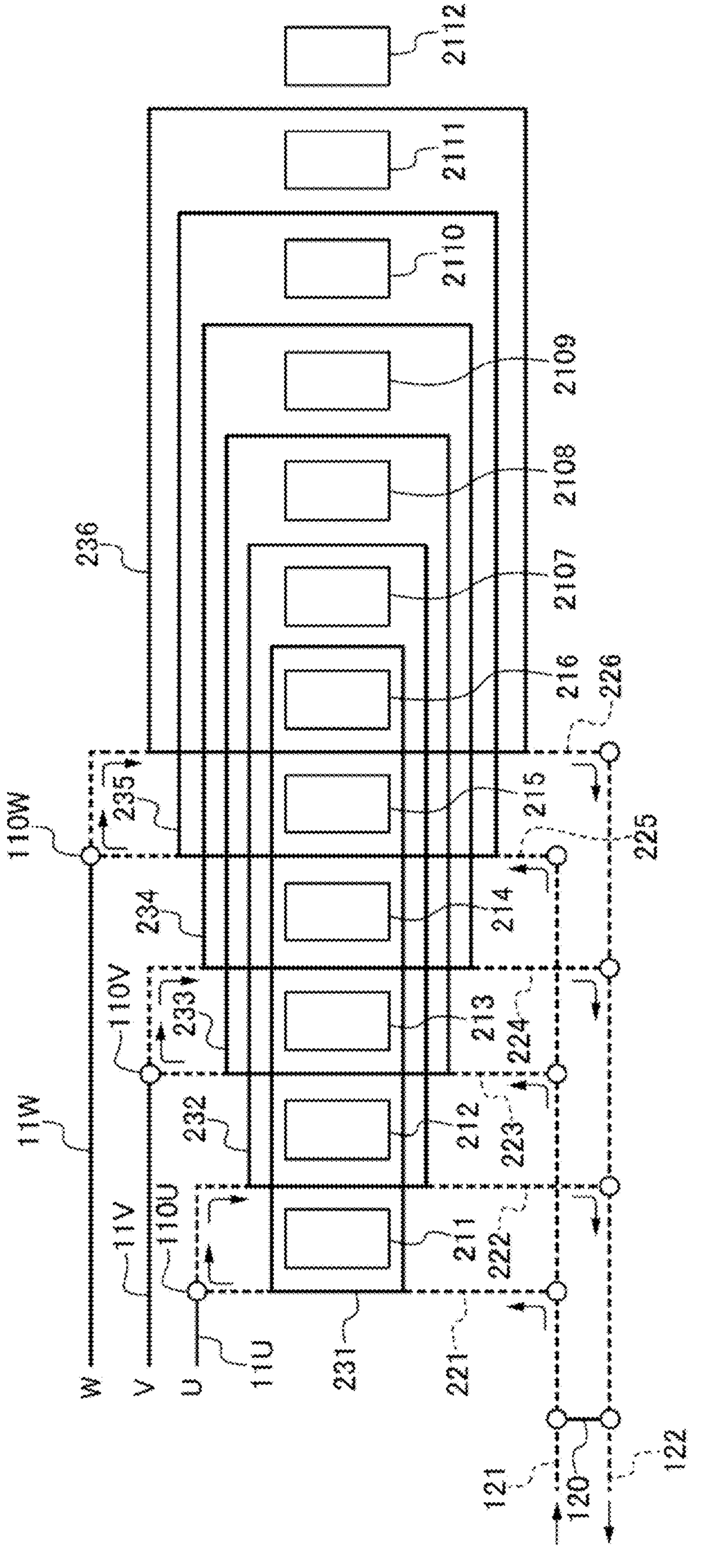
FIG. 36 is a diagram for explaining the flow of the liquid heat carrier in FIG. 33.

FIG. 36 is a diagram for explaining the flow of the liquid heat carrier in FIG. 33. Here, the arrows indicate the flow direction of the liquid heat carrier.

The liquid heat carrier that has flown through the liquid heat carrier inlet pipe 121 is branched into three flows.

The first flow flows through the first hollow conductor wire 221 of the first coil 231, and flows into the liquid heat carrier outlet pipe 122 via the second hollow conductor wire 222 of the second coil 232.

The second flow flows through the third hollow conductor wire 223 of the third coil 233, and flows into the liquid heat carrier outlet pipe 122 via the fourth hollow conductor wire 224 of the fourth coil 234.

The third flow flows through the fifth hollow conductor wire 225 of the fifth coil 235, and flows into the liquid heat carrier outlet pipe 122 via the sixth hollow conductor wire 226 in the sixth slot 216.

Next, the flow of the current will be described.

Figure 37:
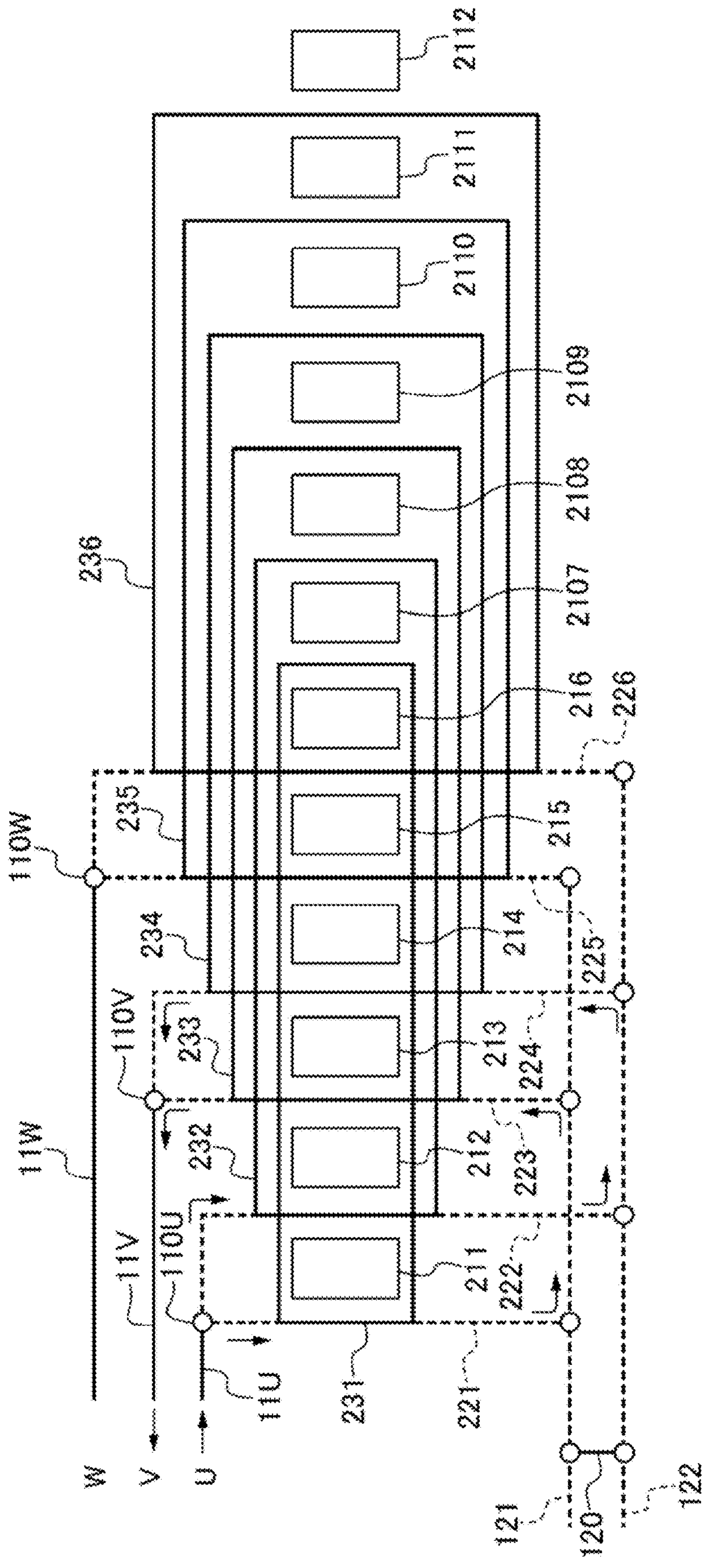
FIG. 37 is a diagram for explaining how the current flows from the U phase line 11U to the V phase line 11V in FIG. 33.

FIG. 37 is a diagram for explaining how the current flows from the U phase line 11U to the V phase line 11V in FIG. 33. Here, the arrows indicate the flow direction of the current.

As one stream, the current that has been input from the U phase line 11U flows through the first hollow conductor wire 221, passes through the liquid heat carrier inlet pipe 121, flows through the third hollow conductor wire 223, and reaches the V phase line 11V. In addition, another stream of the current that has been input from the U phase line 11U flows through the second hollow conductor wire 222, passes through the liquid heat carrier outlet pipe 122, flows through the fourth hollow conductor wire 224, and reaches the V phase line 11V.

As described above, even with the distributed winding type, in which the coil is formed by winding the hollow conductor wire over a plurality of slots, it is possible to achieve the operational advantages same as those achieved for the concentrated winding type. In other words, because the liquid heat carrier (the heat carrier) flows through the inside of the hollow conductor wire and the liquid heat carrier (the heat carrier) is cooled by the radiator 61, excellent cooling performance is achieved for the electrical energy-mechanical energy converter.

In addition, because the liquid heat carrier inlet pipe 121 and the liquid heat carrier outlet pipe 122 are electrically connected by the solid connection conductor wire 120, the connection conductor wire 120 forms the neutral point, and so, it is possible to achieve high safety performance.

Figure 38B:
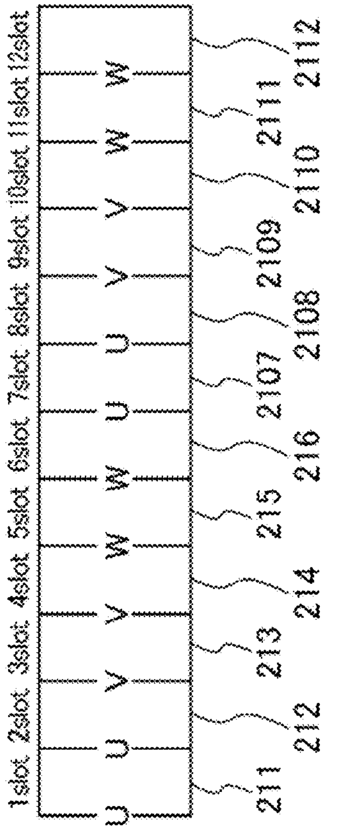
FIG. 38B is a phase arrangement diagram of the coil in the linear motor of the distributed winding type.
Figure 38A:
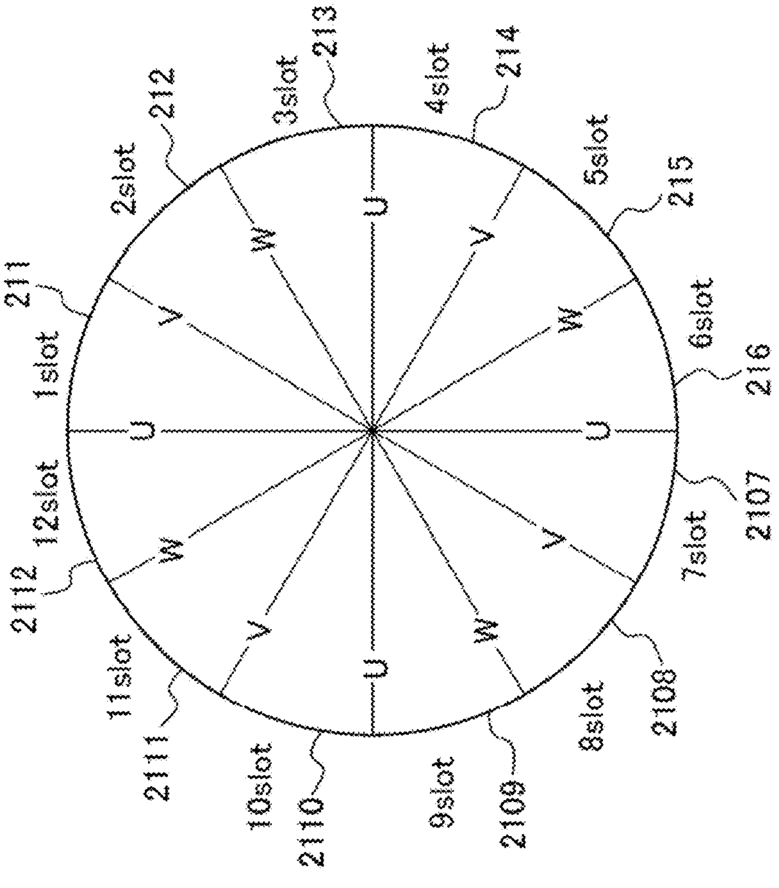
FIG. 38A is a phase arrangement diagram of the coil in the rotating electrical machine of a distributed winding type with twelve slots and four poles (12N4P)

In addition, in order to obtain the rotating electrical machine of the distributed winding type with twelve slots and four poles (12N4P), the phase arrangement of the coil should be as shown in the phase arrangement diagram of the coil in FIG. 38A. In other words, the first coil 231 is formed by winding the first hollow conductor wire 221 so as to pass through between the first slot 211 and the twelfth slot 2112 and to pass through between the third slot 213 and the fourth slot 214.

The second coil 232 is formed by winding the second hollow conductor wire 222 so as to pass through between the first slot 211 and the second slot 212 and to pass through between the fourth slot 214 and the fifth slot 215.

The third coil 233 is formed by winding the third hollow conductor wire 223 so as to pass through between the second slot 212 and the third slot 213 and to pass through between the fifth slot 215 and the sixth slot 216.

The fourth coil 234 is formed by winding the fourth hollow conductor wire 224 so as to pass through between the sixth slot 216 and the seventh slot 2107 and to pass through between the ninth slot 2109 and the tenth slot 2110.

The fifth coil 235 is formed by winding the fifth hollow conductor wire 225 so as to pass through between the seventh slot 2107 and the eighth slot 2108 and to pass through between the tenth slot 2110 and the eleventh slot 2111.

The sixth coil 236 is formed by winding the sixth hollow conductor wire 226 so as to pass through between the eighth slot 2108 and the ninth slot 2109 and to pass through between the eleventh slot 2111 and the twelfth slot 2112.

By employing such a configuration, it is possible to achieve the rotating electrical machine of the distributed winding type with twelve slots and four poles (12N4P).

In addition, if the electrical energy-mechanical energy converter is the linear motor, the respective coils are arranged in the same order as shown in FIG. 38B. In other words, the first coil 231 is formed by winding the first hollow conductor wire 221 so as to pass through between the first slot 211 and the twelfth slot 2112 and to pass through between the sixth slot 216 and the seventh slot 2107.

The second coil 232 is formed by winding the second hollow conductor wire 222 so as to pass through between the first slot 211 and the second slot 212 and to pass through between the seventh slot 2107 and the eighth slot 2108.

The third coil 233 is formed by winding the third hollow conductor wire 223 so as to pass through between the second slot 212 and the third slot 213 and to pass through between the eighth slot 2108 and the ninth slot 2109.

The fourth coil 234 is formed by winding the fourth hollow conductor wire 224 so as to pass through between the third slot 213 and the fourth slot 214 and to pass through between the ninth slot 2109 and the tenth slot 2110.

The fifth coil 235 is formed by winding the fifth hollow conductor wire 225 so as to pass through between the fourth slot 214 and the fifth slot 215 and to pass through between the tenth slot 2110 and the eleventh slot 2111.

The sixth coil 236 is formed by winding the sixth hollow conductor wire 226 so as to pass through between the fifth slot 215 and the sixth slot 216 and to pass through between the eleventh slot 2111 and the twelfth slot 2112.

By employing such a configuration, it is possible to achieve the linear motor of the distributed winding type.

Seventh Embodiment

Figure 39A:
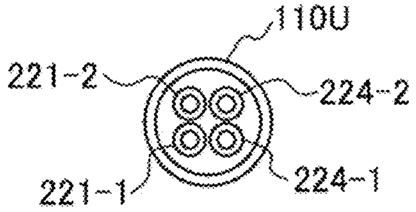
FIG. 39A is a planar cross-sectional view of the U phase connection 110U showing the seventh embodiment of the rotating electrical machine.
Figure 39B:
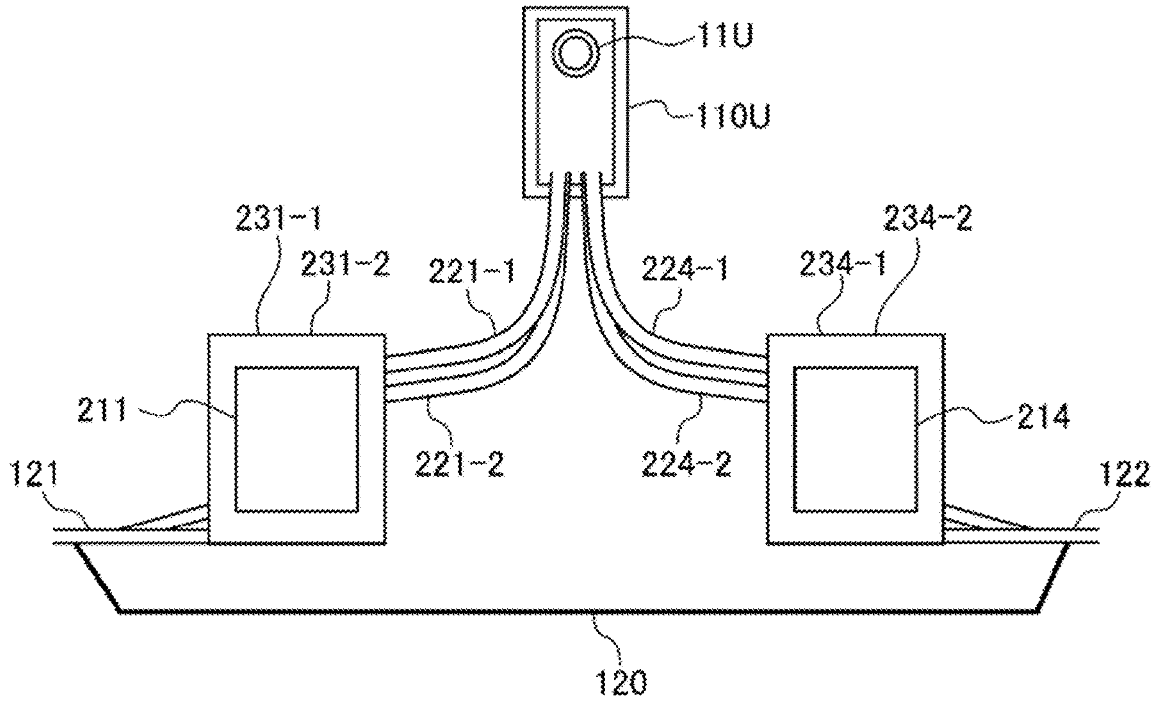
FIG. 39B is a simplified diagram of the vicinity of the U phase connection.

FIGS. 39A and 39B are each a diagram showing a seventh embodiment of the rotating electrical machine and is a diagram for explaining the U phase connection. Here, FIG. 39A is a planar cross-sectional view of the U phase connection 110U, and FIG. 39B is a diagram for explaining the vicinity of the U phase connection in a simplified manner.

In the first embodiment, the coil is formed by winding the single hollow conductor wire in the stator slot. In contrast, in this seventh embodiment, the coil is formed by winding two hollow conductor wires together in the stator slot.

In the first slot 211, coils 231-1 and 231-2 are formed by winding two hollow conductor wires 221-1 and 221-2. In other words, in this embodiment, the single hollow conductor wire in the first embodiment is formed of two wires.

In JP2004-135386A, because a specialized hollow conductor wire, which is turned at an intermediate position so as to be doubled, is wound in the stator core, a specialized manufacturing device was required. In contrast, in the rotating electrical machine in this embodiment, because the two hollow conductor wires are wound together in the stator slot, a specialized manufacturing device is not required and an excellent productivity is achieved.

However, in the conventional electric machine described above, because the stator coil is formed by winding the single hollow conductor wire, which has been doubled by folding it at an intermediate position, in the stator core, a special hollow conductor wire manufacturing device and a winding device are required, and productivity was deteriorated. In addition, even in a case in which a plurality of hollow conductor wires are wound in a bundle, in order to secure both flow paths for forward and return flows, it was necessary to perform the winding by using a pair of hollow conductor wires.

Furthermore, when Bernoulli theorem is used to calculate the required pressure of the cooling water, if the calculation is performed by assuming constant length and cross-sectional area of the hollow conductor wire of the coil, in a case of JP2004-135386A, because the forward and return passages (two passages) of the cooling water are required for a single conductor wire or a single slot, for the hollow conductor wire having the same length and the same cross-sectional area, compared with the hollow conductor wire with a single passage, the inner diameter of each piping of the forward and return passages results in half or less passage cross-sectional area, and thus, at the same cooling water flow rate, the required pressure of the pump becomes five times or higher, that is, the required pressure is proportional to 2.3 power of the value obtained by division of the cross-sectional area. In a case in which the same cooling water pressure is used, the flow rate of the cooling water becomes one-third, and then, the amount of heat removed for the heat generated from the coil also becomes one-third, and so, the pump motive force required for the cooling becomes five times or more, which is not desirable from the perspective of power loss. In addition, if the cooling system with the same upper pressure limit and the same upper temperature limit is used, the output that can be obtained from the rotating electrical machine becomes approximately half or less. In other words, in order to achieve the same cooling capacity, it is necessary to double the cross-sectional area of the hollow conductor wire, as a result, the volume and weight of the rotating electrical machine, etc. are increased.

One ends (the liquid heat carrier inlets) of the hollow conductor wire 221-1 and the hollow conductor wire 221-2 communicate with the liquid heat carrier inlet pipe 121. Other ends (the liquid heat carrier outlets) of the hollow conductor wire 221-1 and the hollow conductor wire 221-2 are connected to the U phase connection 110U.

In the fourth slot 214, coils 234-1 and 234-2 are formed by winding two hollow conductor wires 224-1 and 224-2.

One ends (the liquid heat carrier inlets) of the hollow conductor wire 224-1 and the hollow conductor wire 224-2 are connected to the U phase connection 110U. Other ends (the liquid heat carrier outlets) of the hollow conductor wire 224-1 and the hollow conductor wire 224-2 are connected to the liquid heat carrier outlet pipe 122.

The U phase line 11U is connected to the U phase connection 110U. The electrical distance from the U phase connection 110U to the coils 231-1 and 231-2 and the electrical distance from the U phase connection 110U to the coils 234-1 and 234-2 are set to be equal or substantially equal. The liquid heat carrier inlet pipe 121 and the liquid heat carrier outlet pipe 122 are electrically connected via the solid connection conductor wire 120.

Although FIGS. 39A and 39B illustrate the U phase connection, because the V phase connection 110V and the W phase connection 110W have the same configurations, the description thereof will be omitted. In addition, because the flow of the liquid heat carrier and the flow of the electricity are the same as those in the first embodiment, description thereof will be omitted.

By employing such a configuration, it becomes possible to use the hollow conductor wire that is thinner than the first embodiment, and so, it is possible to increase a winding density.

Eighth Embodiment

Figure 40A:
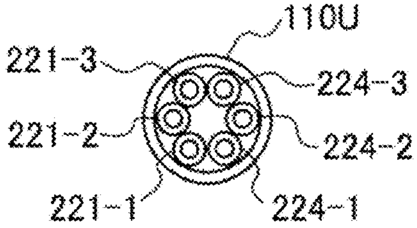
FIG. 40A is a planar cross-sectional view of the U phase connection 110U showing an eighth embodiment of the rotating electrical machine.
Figure 40B:
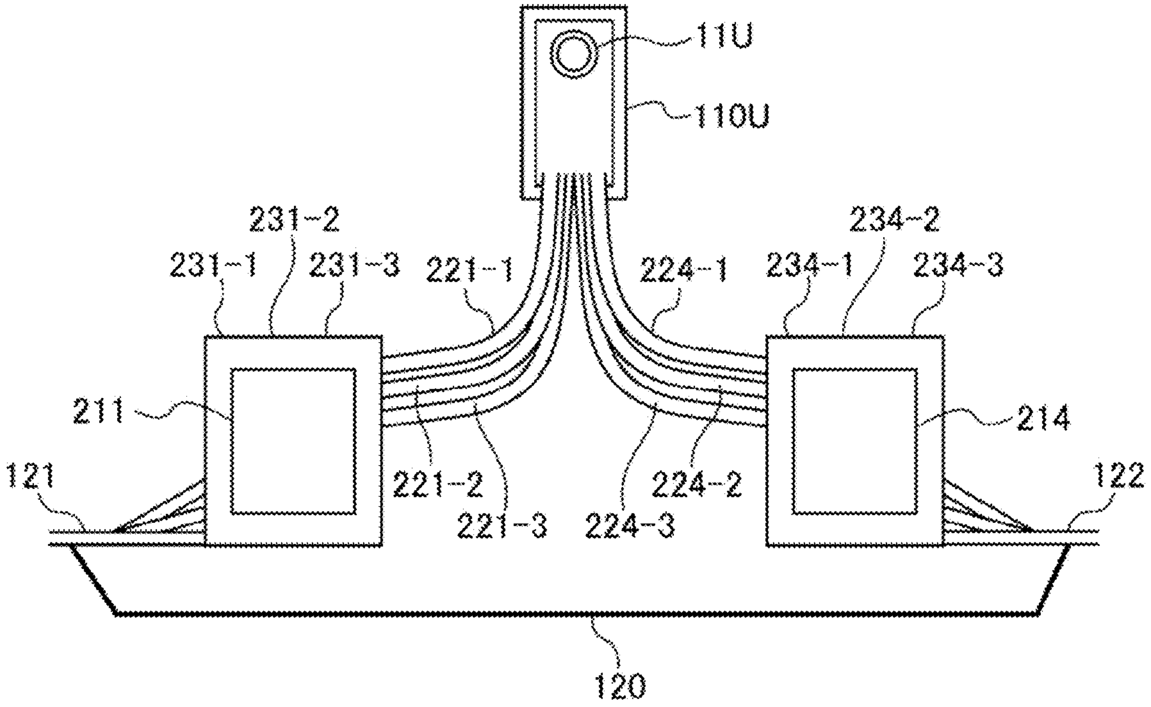
FIG. 40B is a simplified diagram of the vicinity of the U phase connection.

FIGS. 40A and 40B are each a diagram showing an eighth embodiment of the rotating electrical machine and a diagram for explaining the U phase connection. Here, FIG. 40A is a planar cross-sectional view of the U phase connection 110U, and FIG. 40B is a diagram for explaining the vicinity of the U phase connection in a simplified manner.

In the seventh embodiment, the coil is formed by winding the two hollow conductor wires together in the stator slot. In contrast, in this eighth embodiment, the coil is formed by winding three hollow conductor wire together in the stator slot.

In the first slot 211, coils 231-1, 231-2, and 231-3 are formed by winding three hollow conductor wires 221-1, 221-2, and 221-3. In other words, in this embodiment, the single hollow conductor wire in the first embodiment is formed of three wires.

One ends (the liquid heat carrier inlets) of the hollow conductor wire 221-1, the hollow conductor wire 221-2, and the hollow conductor wire 221-3 communicate with the liquid heat carrier inlet pipe 121. Other ends (the liquid heat carrier outlets) of the hollow conductor wire 221-1, the hollow conductor wire 221-2, and the hollow conductor wire 221-3 are connected to the U phase connection 110U.

In the fourth slot 214, coils 234-1, 234-2, and 234-3 are formed by winding three hollow conductor wires 224-1, 224-2, and 224-3.

One ends (the liquid heat carrier inlets) of the hollow conductor wire 224-1, the hollow conductor wire 224-2, and the hollow conductor wire 224-3 are connected to the U phase connection 110U. Other ends (the liquid heat carrier outlets) of the hollow conductor wire 224-1, the hollow conductor wire 224-2, and the hollow conductor wire 224-3 are connected to the liquid heat carrier outlet pipe 122.

The U phase line 11U is connected to the U phase connection 110U. The electrical distance from the U phase connection 110U to the coils 231-1, 231-2, and 231-3 and the electrical distance from the U phase connection 110U to the coils 234-1, 234-2, and 234-3 are set to be equal or substantially equal. The liquid heat carrier inlet pipe 121 and the liquid heat carrier outlet pipe 122 are electrically connected via the solid connection conductor wire 120.

Although FIGS. 40A and 40B illustrate the U phase connection, because the V phase connection 110V and the W phase connection 110W have the same configurations, the description thereof will be omitted. In addition, because the liquid heat carrier and the electrical flow are the same as the first embodiment, description thereof will be omitted.

By employing such a configuration, for a structure, to which the single hollow conductor wire cannot be adopted, by winding a greater number of conductor wires in parallel than those in the first and seventh embodiments, it is possible to achieve further higher output owing to the reduction in the current density and cooling water pressure. Regarding the number of the hollow conductor wire to be wound, there is no upper limit, and the number of bundles is determined during the design stage.

As described above, it is possible to form the coil by bundling the plurality of hollow conductor wires and winding them in the stator slot, and so, it is possible to achieve the winding without significantly altering the existing design specification of the rotating electrical machine, thereby increasing a design flexibility.

Second Embodiment of Electrical Energy-Mechanical Energy Converter System

Figure 41:
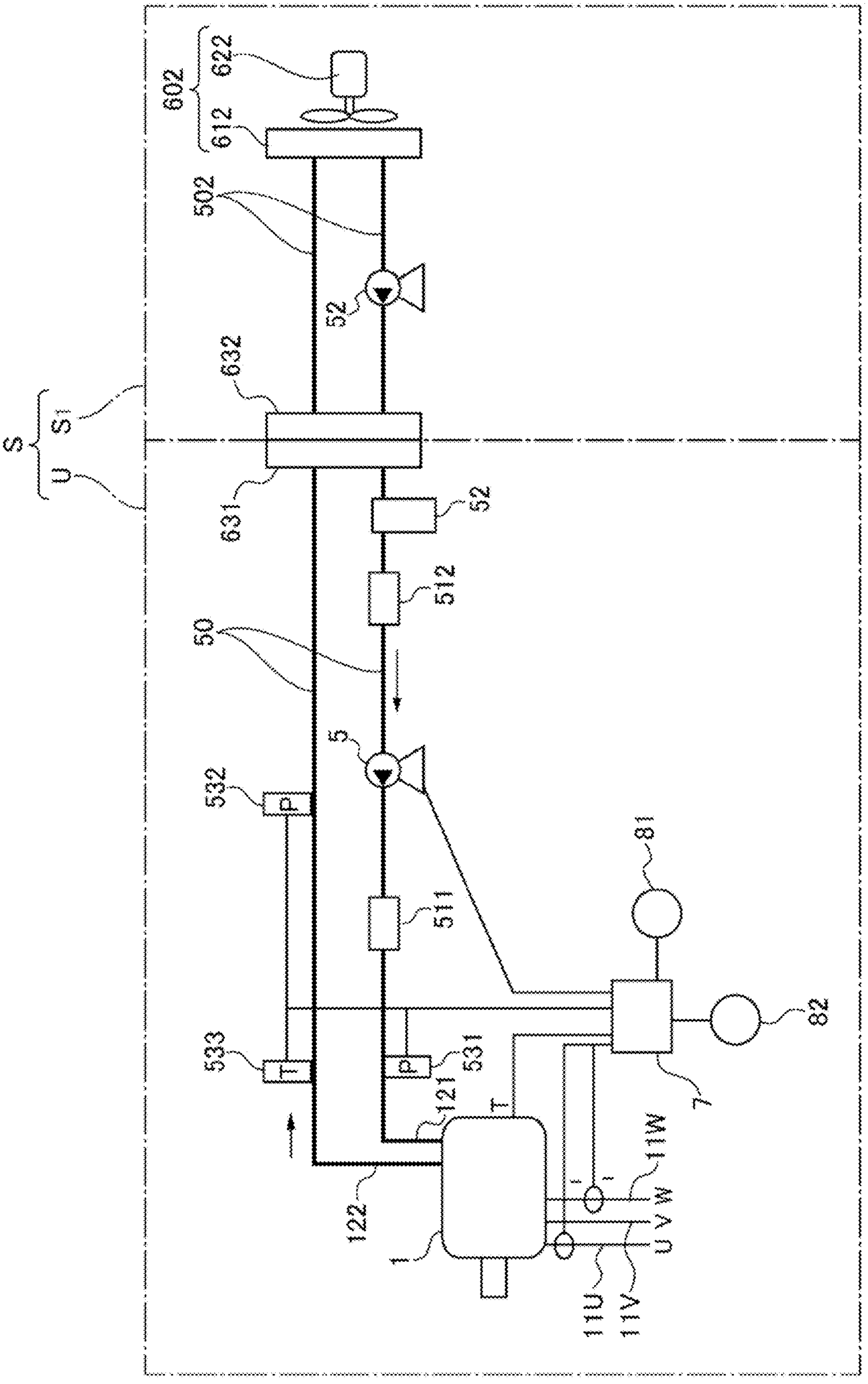
FIG. 41 is a diagram showing yet another example of the electrical energy-mechanical energy converter system.

FIG. 41 is a diagram showing yet another example of the electrical energy-mechanical energy converter system.

FIG. 12 shows the electrical energy-mechanical energy converter system S of the type that promotes decrease in the temperature of the liquid heat carrier flowing in the radiator 61 by providing the radiator 61 on the liquid heat carrier circulation path 50, and by causing the cooling fan 62 to send the wind to the radiator 61.

In contrast, the electrical energy-mechanical energy converter system S shown in FIG. 41 has an electrical energy-mechanical energy converter unit U and a cooling system S1.

The electrical energy-mechanical energy converter unit U is provided with the rotating electrical machine (the electrical energy-mechanical energy converter) 1, the circulation pump 5, a plate-fin heat exchanger 631, and the controller 7. Because the basic configuration is same as that of the electrical energy-mechanical energy converter system shown in FIG. 1, components that achieve the same functions are assigned the same reference numerals, and duplicate explanations are omitted as appropriate.

However, in the electrical energy-mechanical energy converter unit U, the plate-fin heat exchanger 631 is provided on the liquid heat carrier circulation path 50. The rotating electrical machine (the electrical energy-mechanical energy converter) 1, the circulation pump 5, the plate-fin heat exchanger 631, and the controller 7 are integrated into a single unit.

The cooling system S1 is provided with a plate-fin heat exchanger 632, a circulation pump 52, and a heat exchange unit 602.

The plate-fin heat exchanger 632 is paired with the plate-fin heat exchanger 631, and is set in the plate-fin heat exchanger 631.

The circulation pump 52 is provided on a liquid heat carrier circulation path 502. Specifically, the circulation pump 52 is provided on the upstream side of the plate-fin heat exchanger 632 in the liquid heat carrier flow direction in the liquid heat carrier circulation path 502.

The heat exchange unit 602 is provided with a radiator 612 and a cooling fan 622. The radiator 612 is provided on the liquid heat carrier circulation path 502. Specifically, the radiator 612 is provided on the downstream side of the plate-fin heat exchanger 632 in the liquid heat carrier flow direction in the liquid heat carrier circulation path 502 and on the upstream side of the circulation pump 52 in the liquid heat carrier flow direction in the liquid heat carrier circulation path 502. The cooling fan 622 sends the wind to the radiator 612 and promotes decrease in the temperature of the liquid heat carrier flowing in the radiator 612.

As described above, if the electrical energy-mechanical energy converter 1 is integrated with the circulation pump 5 and the plate-fin heat exchanger 631 into the single unit, a conventional system can be utilized as the cooling system S1. For example, in the case of a conversion EV that is obtained by converting an internal combustion engine vehicle into an electric vehicle, the electrical energy-mechanical energy converter unit U may be mounted instead of an internal combustion engine, and at the same time, the radiator, etc. conventionally mounted on the vehicle may be utilized to achieve the cooling system S1.

In this way, it is possible to keep the manufacturing cost of the electrical energy-mechanical energy converter system S low.

Although the embodiments of the present invention have been described in the above, the above-mentioned embodiments merely illustrate a part of application examples of the present invention, and the technical scope of the present invention is not intended to be limited to the specific configurations in the above-mentioned embodiments. In addition, the type of the rotating electrical machine is not limited. For example, the present invention can also be applied to a rotating electrical machine of an axial flux type, an SR rotating electrical machine, an induction rotating electrical machine, a synchronous rotating electrical machine, and so forth.

For example, by using liquid nitrogen or liquid helium as the heat carrier, it is possible to achieve a superconducting rotating electrical machine.

In addition, in the above description, although a description has been given of a case in which the electrical energy-mechanical energy converter system is mounted on the machine whose output is adjusted, the present invention is not limited thereto. The electrical energy-mechanical energy converter system may be used in electric generators such as windmills, waterwheels, and so forth. In this case, it is possible to achieve reduction in the size and weight. In addition, the electrical energy-mechanical energy converter system may be used for portable electric generators. In addition, the electrical energy-mechanical energy converter system may be used for the rotating electrical machine s for robots.

The above-mentioned embodiments can be combined appropriately.

The present application claims priority to Japanese Patent Application No. 2022-027272, filed in the Japan Patent Office on Feb. 24, 2022, and the contents of this application are incorporated herein by reference in their entirety.

The invention claimed is:

1. An electrical energy-mechanical energy converter comprising:

a heat carrier inlet pipe having an electrically conductive property, the heat carrier inlet pipe being configured such that a heat carrier flows in from a tip-end side thereof;

a stator core having a plurality of slots;

a U phase heat carrier inlet coil connected to the heat carrier inlet pipe, the U phase heat carrier inlet coil being formed by winding a hollow conductor wire, through which the heat carrier that has flown the heat carrier inlet pipe flows, in the stator core;

a U phase heat carrier outlet coil formed by winding the hollow conductor wire, through which the heat carrier that has flown the U phase heat carrier inlet coil flows, in the stator core;

a V phase heat carrier inlet coil connected to the heat carrier inlet pipe, the V phase heat carrier inlet coil being formed by winding the hollow conductor wire, through which the heat carrier that has flown the heat carrier inlet pipe flows, in the stator core;

a V phase heat carrier outlet coil formed by winding the hollow conductor wire, through which the heat carrier that has flown the V phase heat carrier inlet coil flows, in the stator core;

a W phase heat carrier inlet coil connected to the heat carrier inlet pipe, the W phase heat carrier inlet coil being formed by winding the hollow conductor wire, through which the heat carrier that has flown the heat carrier inlet pipe flows, in the stator core;

a W phase heat carrier outlet coil formed by winding the hollow conductor wire, through which the heat carrier that has flown the W phase heat carrier inlet coil flows, in the stator core;

a heat carrier outlet pipe having an electrically conductive property connected to the U phase heat carrier outlet coil, the V phase heat carrier outlet coil, and the W phase heat carrier outlet coil, the heat carrier outlet pipe being configured such that the heat carrier that has flown the U phase heat carrier outlet coil, the heat carrier that has flown the V phase heat carrier outlet coil, and the heat carrier that has flown the W phase heat carrier outlet coil flows therethrough and flows out to a tip-end side;

a connection conductor wire configured to connect the heat carrier inlet pipe and the heat carrier outlet pipe so as to be communicable;

a U phase line connected between the U phase heat carrier inlet coil and the U phase heat carrier outlet coil;

a V phase line connected between the V phase heat carrier inlet coil and the V phase heat carrier outlet coil; and a W phase line connected between the W phase heat carrier inlet coil and the W phase heat carrier outlet coil.

2. The electrical energy-mechanical energy converter according to claim 1, wherein the slots of the stator core are arranged so as to be disposed in a circular pattern, the V phase heat carrier inlet coil is arranged next to the U phase heat carrier inlet coil, the W phase heat carrier inlet coil is arranged next to the V phase heat carrier inlet coil, the U phase heat carrier outlet coil is arranged next to the W phase heat carrier inlet coil, the V phase heat carrier outlet coil is arranged next to the U phase heat carrier outlet coil, and the W phase heat carrier outlet coil is arranged next to the V phase heat carrier outlet coil.

3. The electrical energy-mechanical energy converter according to claim 1, wherein the slots of the stator core are arranged so as to be disposed in a circular pattern, the U phase heat carrier outlet coil is arranged next to the U phase heat carrier inlet coil, the V phase heat carrier inlet coil is arranged next to the U phase heat carrier outlet coil, the V phase heat carrier outlet coil is arranged next to the V phase heat carrier inlet coil, the W phase heat carrier inlet coil is arranged next to the V phase heat carrier outlet coil, and the W phase heat carrier outlet coil is arranged next to the W phase heat carrier inlet coil.

4. The electrical energy-mechanical energy converter according to claim 1, wherein the slots of the stator core are arranged so as to be disposed in a linear pattern, the V phase heat carrier inlet coil is arranged next to the U phase heat carrier inlet coil, the W phase heat carrier inlet coil is arranged next to the V phase heat carrier inlet coil, the U phase heat carrier outlet coil is arranged next to the W phase heat carrier inlet coil, the V phase heat carrier outlet coil is arranged next to the U phase heat carrier outlet coil, and the W phase heat carrier outlet coil is arranged next to the V phase heat carrier outlet coil.

5. The electrical energy-mechanical energy converter according to claim 1, wherein an electrical distance from the U phase line to the U phase heat carrier inlet coil and an electrical distance from the U phase line to the U phase heat carrier outlet coil are equal or substantially equal, an electrical distance from the V phase line to the V phase heat carrier inlet coil and an electrical distance from the V phase line to the V phase heat carrier outlet coil are equal or substantially equal, and an electrical distance from the W phase line to the W phase heat carrier inlet coil and an electrical distance from the W phase line to the W phase heat carrier outlet coil are equal or substantially equal.

6. The electrical energy-mechanical energy converter according to claim 1, further comprising:

a U phase upstream side coil formed by winding the hollow conductor wire, through which the heat carrier that has flown the U phase heat carrier inlet coil flows, in the stator core;

a U phase downstream side coil formed by winding the hollow conductor wire, through which the heat carrier that has flown the U phase upstream side coil flows, in the stator core;

a V phase upstream side coil formed by winding the hollow conductor wire, through which the heat carrier that has flown the V phase heat carrier inlet coil flows, in the stator core;

a V phase downstream side coil formed by winding the hollow conductor wire, through which the heat carrier that has flown the V phase upstream side coil flows, in the stator core;

a W phase upstream side coil formed by winding the hollow conductor wire, through which the heat carrier that has flown the W phase heat carrier inlet coil flows, in the stator core; and a W phase downstream side coil formed by winding the hollow conductor wire, through which the heat carrier that has flown the W phase upstream side coil flows, in the stator core, wherein the hollow conductor wire of the U phase heat carrier outlet coil is configured such that the heat carrier that has flown the U phase heat carrier inlet coil, the U phase upstream side coil, and the U phase downstream side coil flows through the hollow conductor wire, the hollow conductor wire of the V phase heat carrier outlet coil is configured such that the heat carrier that has flown the V phase heat carrier inlet coil, the V phase upstream side coil, and the V phase downstream side coil flows through the hollow conductor wire, and the hollow conductor wire of the W phase heat carrier outlet coil is configured such that the heat carrier that has flown the W phase heat carrier inlet coil, the W phase upstream side coil, and the W phase downstream side coil flows through the hollow conductor wire.

7. The electrical energy-mechanical energy converter according to claim 6, wherein the slots of the stator core are arranged so as to be disposed in a circular pattern, the V phase heat carrier inlet coil is arranged next to the U phase heat carrier inlet coil, the W phase heat carrier inlet coil is arranged next to the V phase heat carrier inlet coil, the U phase upstream side coil is arranged next to the W phase heat carrier inlet coil, the V phase upstream side coil is arranged next to the U phase upstream side coil, the W phase upstream side coil is arranged next to the V phase upstream side coil, the U phase downstream side coil is arranged next to the W phase upstream side coil, the V phase downstream side coil is arranged next to the U phase downstream side coil, the W phase downstream side coil is arranged next to the V phase downstream side coil, the U phase heat carrier outlet coil is arranged next to the W phase downstream side coil, the V phase heat carrier outlet coil is arranged next to the U phase heat carrier outlet coil, and the W phase heat carrier outlet coil is arranged next to the V phase heat carrier outlet coil.

8. The electrical energy-mechanical energy converter according to claim 6, wherein the slots of the stator core are arranged so as to be disposed in a circular pattern, the U phase upstream side coil is arranged next to the U phase heat carrier inlet coil, the V phase heat carrier inlet coil is arranged next to the U phase upstream side coil, the V phase upstream side coil is arranged next to the V phase heat carrier inlet coil, the W phase heat carrier inlet coil is arranged next to the V phase upstream side coil, the W phase upstream side coil is arranged next to the W phase heat carrier inlet coil, the U phase downstream side coil is arranged next to the W phase upstream side coil, the U phase heat carrier outlet coil is arranged next to the U phase downstream side coil, the V phase downstream side coil is arranged next to the U phase heat carrier outlet coil, the V phase heat carrier outlet coil is arranged next to the V phase downstream side coil, the W phase downstream side coil is arranged next to the V phase heat carrier outlet coil, and the W phase heat carrier outlet coil is arranged next to the W phase downstream side coil.

9. The electrical energy-mechanical energy converter according to claim 6, wherein the slots of the stator core are arranged so as to be disposed in a linear pattern, the V phase heat carrier inlet coil is arranged next to the U phase heat carrier inlet coil, the W phase heat carrier inlet coil is arranged next to the V phase heat carrier inlet coil, the U phase upstream side coil is arranged next to the W phase heat carrier inlet coil, the V phase upstream side coil is arranged next to the U phase upstream side coil, the W phase upstream side coil is arranged next to the V phase upstream side coil, the U phase downstream side coil is arranged next to the W phase upstream side coil, the V phase downstream side coil is arranged next to the U phase downstream side coil, the W phase downstream side coil is arranged next to the V phase downstream side coil, the U phase heat carrier outlet coil is arranged next to the W phase downstream side coil, the V phase heat carrier outlet coil is arranged next to the U phase heat carrier outlet coil, and the W phase heat carrier outlet coil is arranged next to the V phase heat carrier outlet coil.

10. The electrical energy-mechanical energy converter according to claim 6, wherein an electrical distance from the U phase line to the U phase upstream side coil and an electrical distance from the U phase line to the U phase downstream side coil are equal or substantially equal, an electrical distance from the V phase line to the V phase upstream side coil and an electrical distance from the V phase line to the V phase downstream side coil are equal or substantially equal, and an electrical distance from the W phase line to the W phase upstream side coil and an electrical distance from the W phase line to the W phase downstream side coil are equal or substantially equal.

11. An electrical energy-mechanical energy converter system comprising:

the electrical energy-mechanical energy converter according to claim 1;

a heat dissipation portion, into which the heat carrier that has flown out from the heat carrier outlet pipe flows in, the heat dissipation portion being configured to promote heat dissipation of the heat carrier;

a circulation pump, into which the heat carrier that has flown out from the heat dissipation portion flows in, the circulation pump being configured to discharge the heat carrier and deliver the heat carrier to the heat carrier inlet pipe; and a controller configured to control an operation of at least one of the heat dissipation portion and the circulation pump.

12. The electrical energy-mechanical energy converter system according to claim 11, wherein the controller is configured to increase a discharge amount of the circulation pump as output requested by the electrical energy-mechanical energy converter becomes higher.

13. The electrical energy-mechanical energy converter system according to claim 11, wherein the controller is configured to increase the discharge amount of the circulation pump as temperature of the heat carrier flown out from the electrical energy-mechanical energy converter becomes higher.

14. The electrical energy-mechanical energy converter system according to claim 11, wherein the heat dissipation portion is provided with a radiator through which the heat carrier flows; and a fan for sending wind to the radiator, and the controller controls an operation of at least one of the fan and the circulation pump.

15. The electrical energy-mechanical energy converter system according to claim 14, wherein the controller is configured to increase the discharge amount of the circulation pump as the output requested by the electrical energy-mechanical energy converter becomes higher.

16. The electrical energy-mechanical energy converter system according to claim 14, wherein the controller is configured to increase the discharge amount of the circulation pump as the temperature of the heat carrier flown out from the electrical energy-mechanical energy converter becomes higher.

17. The electrical energy-mechanical energy converter system according to claim 14, wherein the controller is configured to increase an airflow rate of the fan as the output requested by the electrical energy-mechanical energy converter becomes higher.

18. The electrical energy-mechanical energy converter system according to claim 14, wherein the controller is configured to increase an airflow rate of the fan as the temperature of the heat carrier flown out from the electrical energy-mechanical energy converter becomes higher.

19. The electrical energy-mechanical energy converter system according to claim 11, wherein the heat dissipation portion comprises a heat exchanger through which the heat carrier flows, the heat exchanger being configured such that another heat exchanger is set therein, and the controller is configured to control operation of the circulation pump.

20. The electrical energy-mechanical energy converter system according to claim 19, wherein the controller is configured to increase the discharge amount of the circulation pump as the output requested by the electrical energy-mechanical energy converter becomes higher.

* * * * *